United States Patent
Yamazaki et al.

(10) Patent No.: US 11,563,231 B2
(45) Date of Patent: *Jan. 24, 2023

(54) LITHIUM-ION STORAGE BATTERY AND ELECTRONIC DEVICE

(71) Applicant: Semiconductor Energy Laboratory Co., Ltd., Atsugi (JP)

(72) Inventors: Shunpei Yamazaki, Setagaya (JP); Teppei Oguni, Atsugi (JP); Satoshi Seo, Sagamihara (JP); Hiroshi Kadoma, Sagamihara (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 257 days.

This patent is subject to a terminal disclaimer.

(21) Appl. No.: 16/895,102

(22) Filed: Jun. 8, 2020

(65) Prior Publication Data

US 2020/0365929 A1 Nov. 19, 2020

Related U.S. Application Data

(63) Continuation of application No. 15/195,187, filed on Jun. 28, 2016, now Pat. No. 10,686,207.

(30) Foreign Application Priority Data

Jul. 3, 2015 (JP) .................................. 2015-134671

(51) Int. Cl.
*H01M 10/02* (2006.01)
*H01M 10/052* (2010.01)
(Continued)

(52) U.S. Cl.
CPC ......... *H01M 10/02* (2013.01); *H01M 10/052* (2013.01); *H01M 50/116* (2021.01);
(Continued)

(58) Field of Classification Search
None
See application file for complete search history.

(56) References Cited

U.S. PATENT DOCUMENTS

| | | | |
|---|---|---|---|
| 8,597,830 B2 | 12/2013 | Kawakami et al. | |
| 9,391,329 B2 | 7/2016 | Yoon et al. | |

(Continued)

FOREIGN PATENT DOCUMENTS

| | | |
|---|---|---|
| EP | 3367467 A | 8/2018 |
| EP | 3696881 A | 8/2020 |

(Continued)

OTHER PUBLICATIONS

"Wrap", https://www.merriam-webster.com/dictionary/wrap, Jan. 31, 2015.

*Primary Examiner* — Gregg Cantelmo
(74) *Attorney, Agent, or Firm* — Robinson Intellectual Property Law Office; Eric J. Robinson

(57) ABSTRACT

To provide a storage battery including a carbon-based material. To provide a graphene compound film having desired ion conductivity and mechanical strength while preventing direct contact between electrodes in a storage battery. To achieve long-term reliability. A lithium-ion storage battery includes a positive electrode, a negative electrode, an exterior body, and a separator between the positive electrode and the negative electrode. In the lithium-ion storage battery, one of the positive electrode and the negative electrode is wrapped in a first film, and the positive electrode, the negative electrode, and the separator are stored in the exterior body. The first film may include a first region in which the first film includes a first functional group. The first film may further include a second region in which the first film includes a second functional group different from the first functional group. The first film may be a graphene compound film.

13 Claims, 30 Drawing Sheets

(51) Int. Cl.
  *H01M 50/46* (2021.01)
  *H01M 50/116* (2021.01)
  *H01M 50/431* (2021.01)
  *H01M 50/463* (2021.01)
  *H01M 50/136* (2021.01)

(52) U.S. Cl.
  CPC ....... *H01M 50/136* (2021.01); *H01M 50/431* (2021.01); *H01M 50/46* (2021.01); *H01M 50/463* (2021.01); *Y02E 60/10* (2013.01); *Y02T 10/70* (2013.01)

(56) References Cited

U.S. PATENT DOCUMENTS

| | | |
|---|---|---|
| 9,590,236 B2 | 3/2017 | Xie |
| 9,853,283 B2 | 12/2017 | Xie |
| 2007/0131915 A1 | 6/2007 | Stankovich et al. |
| 2009/0110627 A1 | 4/2009 | Choi et al. |
| 2011/0070146 A1 | 3/2011 | Song et al. |
| 2012/0244430 A1* | 9/2012 | Yamazaki ............ H01M 4/136 429/211 |
| 2012/0308884 A1 | 12/2012 | Oguni et al. |
| 2012/0328923 A1 | 12/2012 | Sawai et al. |
| 2013/0065120 A1* | 3/2013 | Miwa ................ H01M 4/1397 977/734 |
| 2013/0095367 A1 | 4/2013 | Kim |
| 2013/0224562 A1 | 8/2013 | Momo |
| 2013/0266859 A1 | 10/2013 | Todoriki et al. |
| 2013/0337320 A1 | 12/2013 | Yukawa |
| 2014/0017563 A1* | 1/2014 | Wang .................... H01M 4/667 977/734 |
| 2014/0170412 A1 | 6/2014 | Ji et al. |
| 2015/0140396 A1 | 5/2015 | Yamazaki |
| 2015/0140400 A1 | 5/2015 | Yamazaki et al. |
| 2015/0147626 A1 | 5/2015 | Tajima et al. |
| 2015/0155530 A1 | 6/2015 | Takahashi et al. |
| 2016/0118637 A1 | 4/2016 | Narita et al. |
| 2018/0102535 A1 | 4/2018 | Xie |

FOREIGN PATENT DOCUMENTS

| | | |
|---|---|---|
| JP | 2012-009418 A | 1/2012 |
| JP | 2012-151036 A | 8/2012 |
| JP | 2013-145664 A | 7/2013 |
| JP | 2014-118563 A | 6/2014 |
| JP | 2014-517473 | 7/2014 |
| JP | 2015-118926 A | 6/2015 |
| JP | 2015-118930 A | 6/2015 |
| JP | 2015-520926 | 7/2015 |
| WO | WO-2012/158924 | 11/2012 |
| WO | WO-2013/172646 | 11/2013 |
| WO | WO-2015/071805 | 5/2015 |

\* cited by examiner

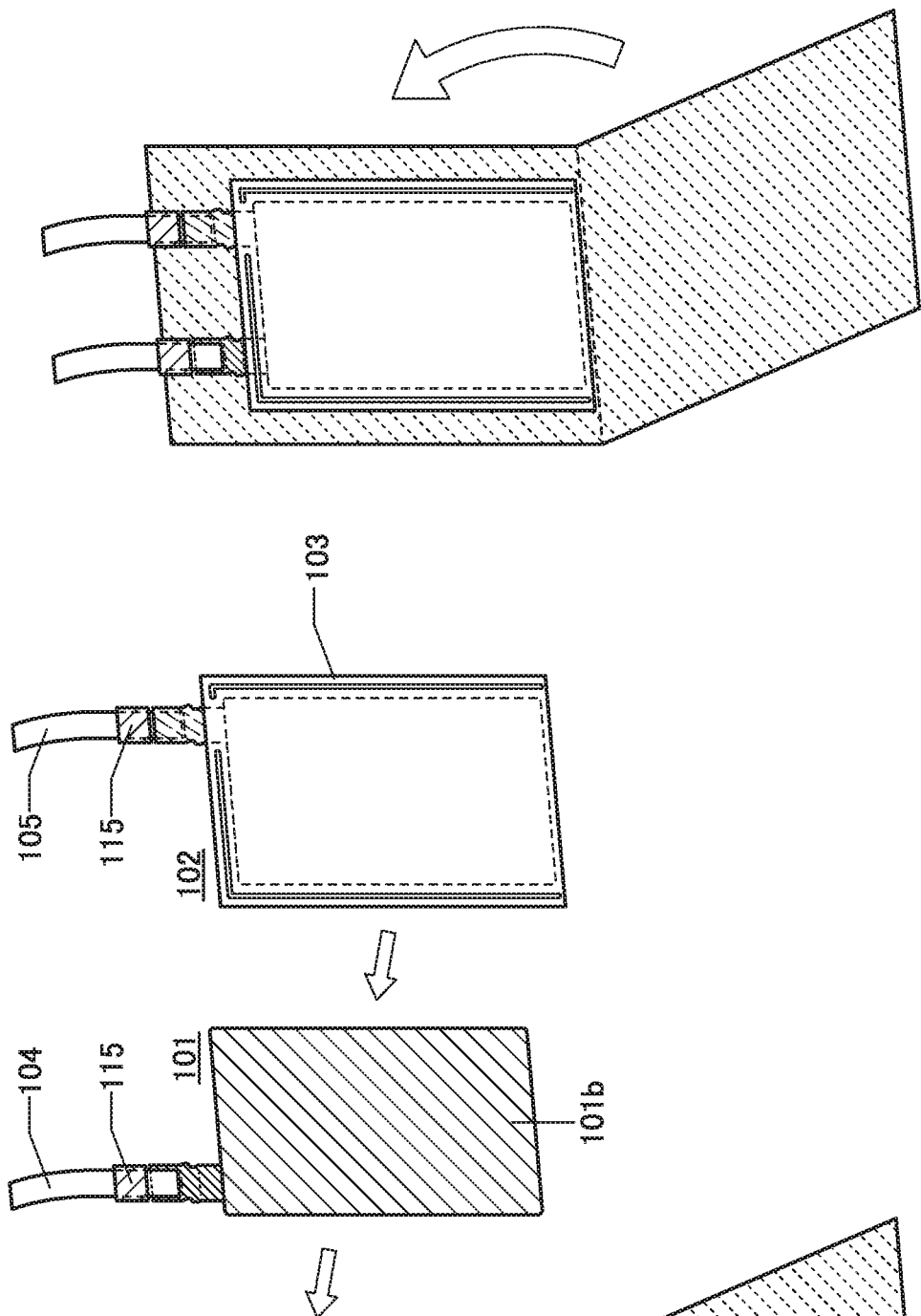

FIG. 15A
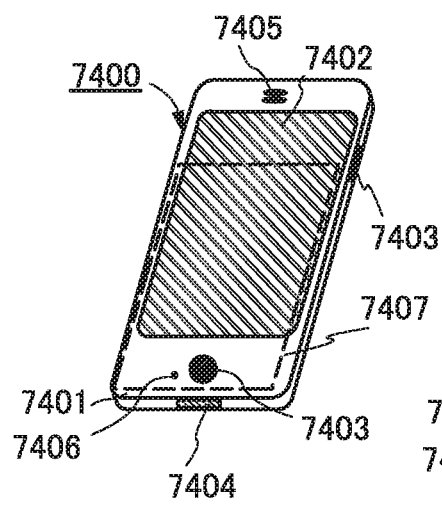
FIG. 15B
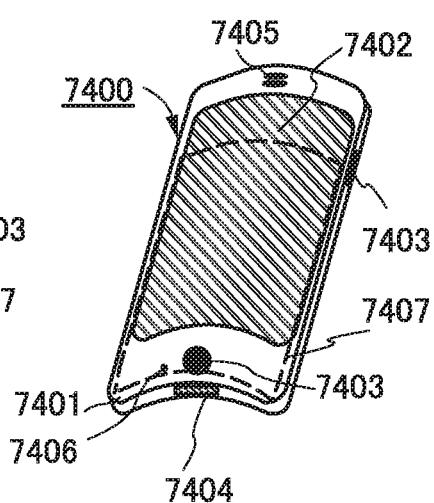
FIG. 15C
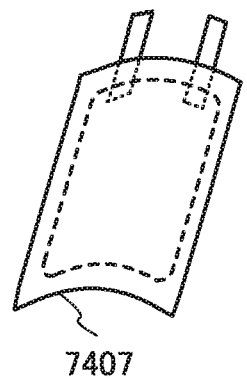
FIG. 15D
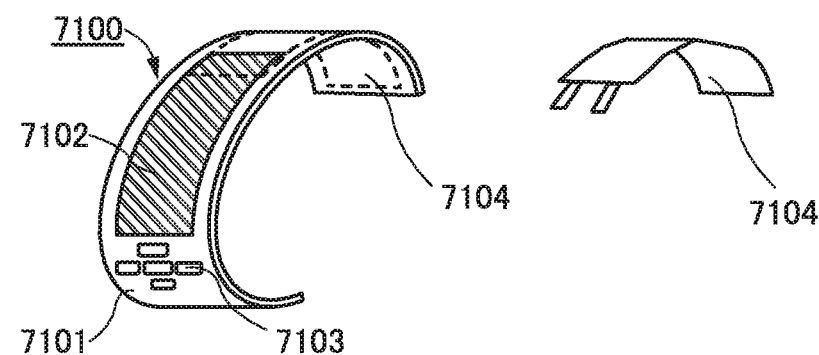
FIG. 15E FIG. 17A1
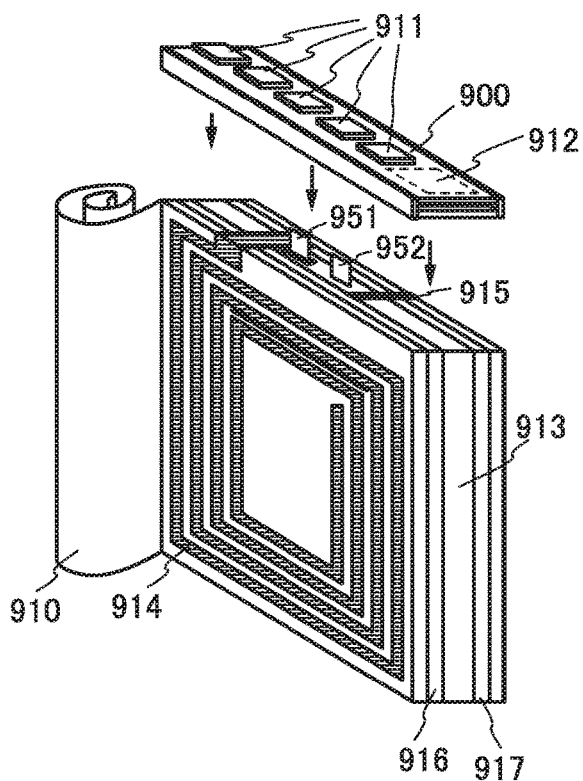
FIG. 17A2
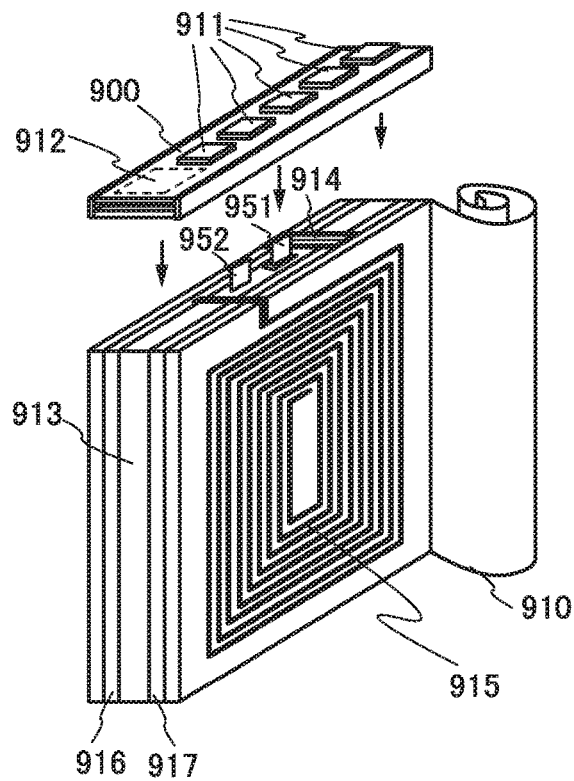
FIG. 17B1
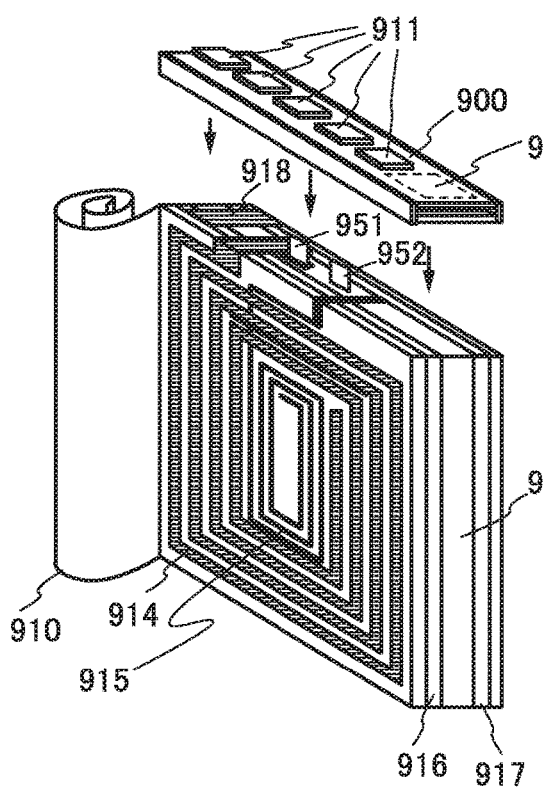
FIG. 17B2
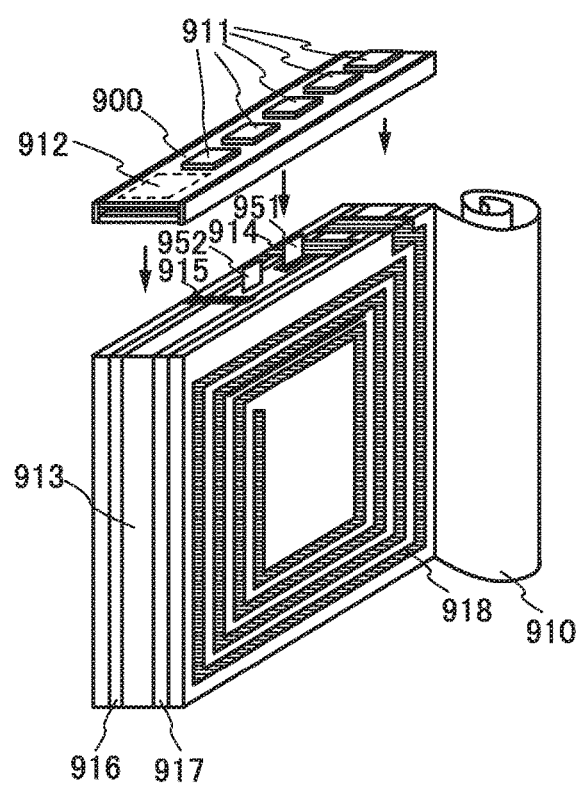

LITHIUM-ION STORAGE BATTERY AND ELECTRONIC DEVICE

BACKGROUND OF THE INVENTION

1. Field of the Invention

One embodiment of the present invention relates to a lithium-ion storage battery and an electronic device.

Note that one embodiment of the present invention is not limited to the above technical field. The technical field of one embodiment of the invention disclosed in this specification and the like relates to an object, a method, or a manufacturing method. In addition, one embodiment of the present invention relates to a process, a machine, manufacture, or a composition of matter. Specifically, examples of the technical field of one embodiment of the present invention disclosed in this specification include a semiconductor device, a display device, a liquid crystal display device, a light-emitting device, a lighting device, a power storage device, a storage device, a method for driving any of them, and a method for manufacturing any of them.

2. Description of the Related Art

In recent years, a variety of power storage devices, for example, storage batteries such as lithium-ion storage batteries, lithium-ion capacitors, and air cells have been actively developed. In particular, demand for lithium-ion storage batteries with a high output and a high energy density has rapidly grown with the development of the semiconductor industry, for electronic devices, for example, portable information terminals such as mobile phones, smartphones, and laptop computers, portable music players, and digital cameras; medical equipment; next-generation clean energy vehicles such as hybrid electric vehicles (HEVs), electric vehicles (EVs), and plug-in hybrid electric vehicles (PHEVs); and the like. The lithium-ion storage batteries are essential as rechargeable energy supply sources for today's information society.

The performance required for the lithium-ion storage batteries includes increased energy density, improved cycle life, safe operation under a variety of environments, and longer-term reliability.

Furthermore, flexible display devices used while being mounted on human bodies or curved surfaces, such as display devices mounted on heads (head-mounted displays), have been proposed in recent years. This has increased demands for flexible storage batteries that can be mounted on curved surfaces to be used together with flexible display devices.

An example of the lithium-ion storage battery includes at least a positive electrode, a negative electrode, and an electrolyte solution (Patent Document 1).

Owing to excellent electric characteristics such as high conductivity or high mobility and excellent physical characteristics such as sufficient flexibility and high mechanical strength, application of graphene to a variety of products has been attempted recently (see Patent Documents 2 to 4).

Here, in a commercially available storage battery, which is a rechargeable power storage device, a carbon-based material such as graphite is used for a negative electrode. Graphite has a crystal structure where sheets of carbons which have $sp^2$ hybrid orbitals and are regularly arranged two-dimensionally are stacked. The storage battery is charged and discharged utilizing occlusion of lithium ions from a positive electrode into a gap between sheets of carbons in the crystal structure.

Carbon-based materials are advantageous in achieving lighter storage batteries and are highly safe as materials, suggesting the necessity of the wider application of carbon-based materials to storage batteries.

REFERENCES

Patent Documents

[Patent Document 1] Japanese Published Patent Application No. 2012-009418

[Patent Document 2] United States Published Patent Application No. 2011/0070146

[Patent Document 3] United States Published Patent Application No. 2009/0110627

[Patent Document 4] United States Published Patent Application No. 2007/0131915

SUMMARY OF THE INVENTION

A separator is provided between a positive electrode and a negative electrode and has a function of separating the electrodes. If the electrodes in the lithium-ion storage battery are short-circuited, an uncontrollable high current flows between the electrodes, and, for example, a large amount of heat is generated, causing a safety hazard in some cases. Even when a safety hazard is not caused, self-discharge occurs to cause deterioration and a function as a battery is impaired.

Furthermore, in a process of manufacturing or charging/discharging the lithium-ion storage battery, some of carrier ions contributing to charging/discharging are deposited on a surface of the negative electrode and becomes an irreversible component, which impairs a function as a battery. When the deposition of lithium on the surface of the negative electrode proceeds greatly, the deposited lithium becomes a whisker-like structure (whisker) and grows in some cases. The structure might pass through a pore in the separator to cause a short-circuit between the electrodes depending on the property of the separator, which also causes a problem.

Furthermore, in a flexible lithium-ion storage battery, various kinds of stress are generated inside the storage battery in accordance with change in the shape of the storage battery. In the case where the storage battery does not have a structure for relieving the stress, shear failure occurs easily at a portion of the storage battery, so that a function as a storage battery is lost.

A carbon-based material potentially has excellent properties as a material. When such a carbon-based material is used, a lightweight and safe storage battery with high quality can be provided.

In view of the above, an object of one embodiment of the present invention is to provide a lithium-ion storage battery including a carbon-based material. Another object of one embodiment of the present invention is to provide a storage battery including a graphene compound film having desired ionic conductivity and mechanical strength while preventing direct contact between electrodes in the storage battery.

Another object of one embodiment of the present invention is to achieve long-term reliability of a storage battery.

Another object of one embodiment of the present invention is to provide a storage battery including a novel graphene compound film. Another object of one embodiment of the present invention is to provide a novel power storage device or the like.

Another object of one embodiment of the present invention is to provide a storage battery that can change in shape, i.e., a storage battery having flexibility.

Another object of one embodiment of the present invention is to provide a novel storage battery having flexibility and including a novel graphene compound film that can resist change in shape.

Note that the descriptions of these objects do not disturb the existence of other objects. In one embodiment of the present invention, there is no need to achieve all the objects. Other objects will be apparent from and can be derived from the description of the specification, the drawings, the claims, and the like.

A structure of one embodiment of the invention disclosed in this specification is a lithium-ion storage battery including a positive electrode, a negative electrode, and an exterior body. At least one of the positive electrode and the negative electrode is at least partly wrapped in a first film. The first film includes a graphene compound. The positive electrode and the negative electrode are stored in the exterior body.

In one embodiment of the invention disclosed in this specification, a graphene compound is a compound where graphene or multilayer graphene is modified with an atom other than carbon or an atomic group with an atom other than carbon. A graphene compound may be a compound where graphene or multilayer graphene is modified with an atomic group composed mainly of carbon, such as an alkyl group or alkylene. For example, graphene and oxygen may be included in a graphene compound, or graphene oxide may be used.

A structure of another embodiment of the invention disclosed in this specification is a lithium-ion storage battery including a positive electrode, a negative electrode, and an exterior body. A separator is located between the positive electrode and the negative electrode. At least one of the positive electrode and the negative electrode is at least partly wrapped in a first film. The first film includes a graphene compound. The positive electrode, the negative electrode, and the separator are stored in the exterior body.

Note that in one embodiment of the present invention, the first film of the lithium-ion storage battery may include a first region in which the first film includes a first functional group. The first film of the lithium-ion storage battery may further include a second region in which the first film includes a second functional group different from the first functional group.

In one embodiment of the present invention, the first film of the lithium-ion storage battery may include a first region in which the first film is subjected to first modification. The first film of the lithium-ion storage battery may further include a second region in which the first film is subjected to second modification different from the first modification. Note that in the lithium-ion storage battery, the first film may be a graphene oxide film.

A structure of another embodiment of the invention disclosed in this specification is a lithium-ion storage battery including a positive electrode, a negative electrode, and an exterior body. The positive electrode is at least partly wrapped in a first film. The negative electrode is at least partly wrapped in a second film. The first film includes a graphene compound. The second film includes a graphene compound. The positive electrode and the negative electrode are stored in the exterior body.

A structure of another embodiment of the invention disclosed in this specification is a lithium-ion storage battery including a positive electrode, a negative electrode, and an exterior body. A separator is located between the positive electrode and the negative electrode. The positive electrode is at least partly wrapped in a first film. The negative electrode is at least partly wrapped in a second film. The first film includes a graphene compound. The second film includes a graphene compound. The positive electrode, the negative electrode, and the separator are stored in the exterior body.

In one embodiment of the present invention, the first film of the lithium-ion storage battery may include a first region in which the first film includes a first functional group. The first film of the lithium-ion storage battery may further include a second region in which the first film includes a second functional group different from the first functional group. The second film of the lithium-ion storage battery may include a third region in which the second film includes a third functional group. The second film of the lithium-ion storage battery may include a fourth region in which the second film includes a fourth functional group different from the third functional group.

In one embodiment of the present invention, the first film of the lithium-ion storage battery may include a first region in which the first film is subjected to first modification. The first film of the lithium-ion storage battery may further include a second region in which the first film is subjected to second modification different from the first modification. The second film of the lithium-ion storage battery may further include a third region in which the second film is subjected to third modification. The second film of the lithium-ion storage battery may further include a fourth region in which the second film is subjected to fourth modification different from the third modification. Note that in the lithium-ion storage battery, the first film may be a graphene oxide film and the second film may be a graphene oxide film.

In one embodiment of the present invention, the lithium-ion storage battery may have flexibility.

One embodiment of the present invention can provide a lithium-ion storage battery including a carbon-based material. One embodiment of the present invention can provide a storage battery including a graphene compound film having desired ionic conductivity and mechanical strength while preventing direct contact between electrodes in the storage battery. One embodiment of the present invention can achieve long-term reliability of a storage battery.

One embodiment of the present invention can provide a lithium-ion storage battery including a novel graphene compound film. One embodiment of the present invention can provide a novel power storage device or the like.

One embodiment of the present invention can provide a storage battery that can change in shape, i.e., a storage battery having flexibility. One embodiment of the present invention can provide a novel graphene compound film that can resist change in shape in a storage battery having flexibility.

Note that the description of these effects does not disturb the existence of other effects. One embodiment of the present invention does not necessarily achieve all the effects listed above. Other effects will be apparent from and can be derived from the description of the specification, the drawings, the claims, and the like.

BRIEF DESCRIPTION OF THE DRAWINGS

FIGS. 6A and 6B illustrate the assembly of a lithium-ion storage battery.

FIGS. 15A to 15E illustrate flexible storage batteries.

FIGS. 17A1, 17A2, 17B1, and 17B2 illustrate examples of a storage battery.

DETAILED DESCRIPTION OF THE INVENTION

Figure 1A:
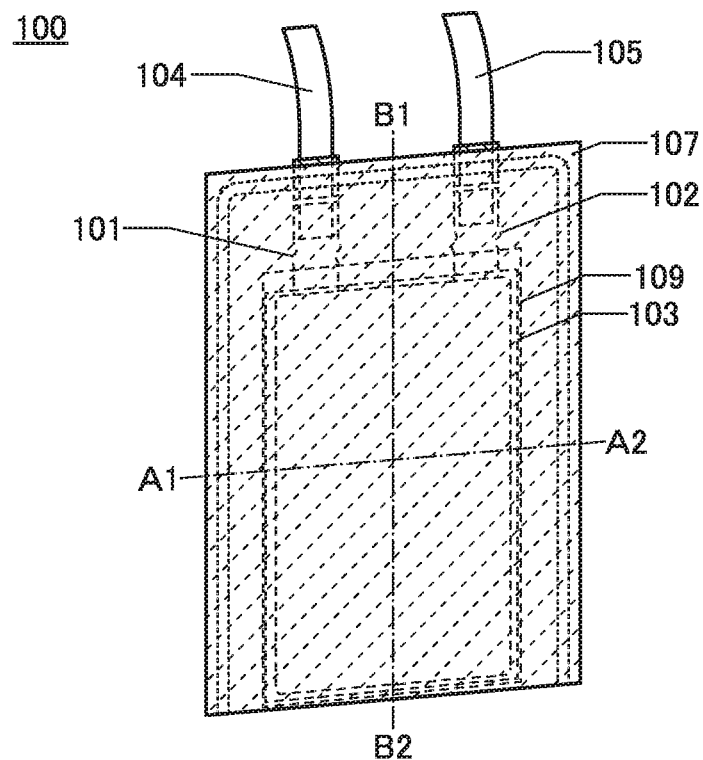
FIGS. 1A and 1B illustrate lithium-ion storage batteries.

Embodiments of the present invention will be described below in detail with reference to the drawings. However, the present invention is not limited to the description below, and it is easily understood by those skilled in the art that modes and details disclosed herein can be modified in various ways. Further, the present invention is not construed as being limited to description of the embodiments.

Note that in each drawing described in this specification, the size, the thickness, or the like of each component such as a positive electrode, a negative electrode, an active material layer, a separator, an exterior body, and the like is exaggerated for clarity in some cases. Therefore, the sizes of the components are not limited to the sizes in the drawings and relative sizes between the components.

In this specification and the like, ordinal numbers such as "first", "second", and "third" are used for convenience and do not denote the order of steps or the stacking order of layers. Therefore, for example, description can be made even when "first" is replaced with "second" or "third", as appropriate. In addition, the ordinal numbers in this specification and the like are not necessarily the same as those which specify one embodiment of the present invention.

Note that in the structures of the present invention described in this specification and the like, the same portions or portions having similar functions in different drawings are denoted by the same reference numerals, and description of such portions is not repeated. Further, the same hatching pattern is applied to portions having similar functions, and the portions are not especially denoted by reference numerals in some cases.

In this specification, flexibility refers to a property of an object being flexible and bendable. In other words, it is a property of an object that can be deformed in response to an external force applied to the object, and elasticity or restorability to the former shape is not taken into consideration. A flexible storage battery can be changed in form in response to an external force. A flexible storage battery can be used with its shape fixed in a state of being changed in form, can be used while repeatedly changed in form, and can be used in a state of not changed in form. In this specification and the like, the inside of an exterior body refers to a region surrounded by the exterior body of a lithium-ion storage battery, in which a structure such as a positive electrode, a negative electrode, an active material layer, and a separator, and an electrolytic solution are stored.

In this specification, modification refers to changing of a function or a property of a graphene oxide film by chemically changing the graphene oxide film. It may refer to addition of a functional group having a certain function or property.

Contents described in Detailed Description of the Invention can be combined with each other as appropriate.

Embodiment 1

In this embodiment, a lithium-ion storage battery 100 of one embodiment of the present invention and a method for fabricating the same will be described. The case of using graphene oxide is described as one embodiment of the present invention. The graphene oxide is an example of a graphene compound.

Figure 1B:
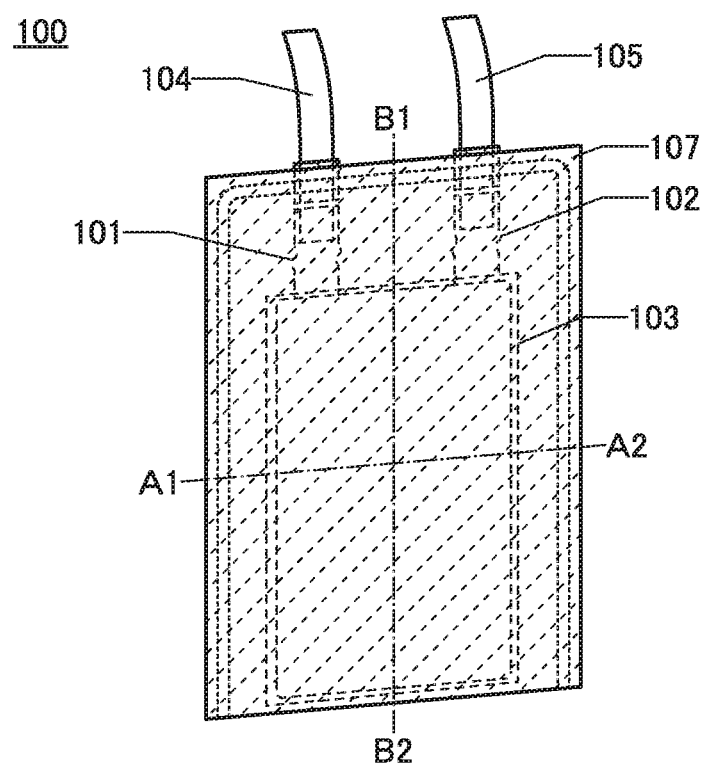

FIG. 1A shows the lithium-ion storage battery 100 of one embodiment of the present invention. The lithium-ion storage battery 100 includes a positive electrode 101, a negative electrode 102, a graphene oxide film 103, and a separator 109 that are stored in an exterior body 107. Note that in the case where the graphene oxide film 103 has a function of a separator, the separator 109 can be omitted. FIG. 1B shows the case where the separator 109 is omitted. The positive electrode 101 is electrically connected to a positive electrode lead 104 and the negative electrode 102 is electrically connected to a negative electrode lead 105.

Figure 2A:
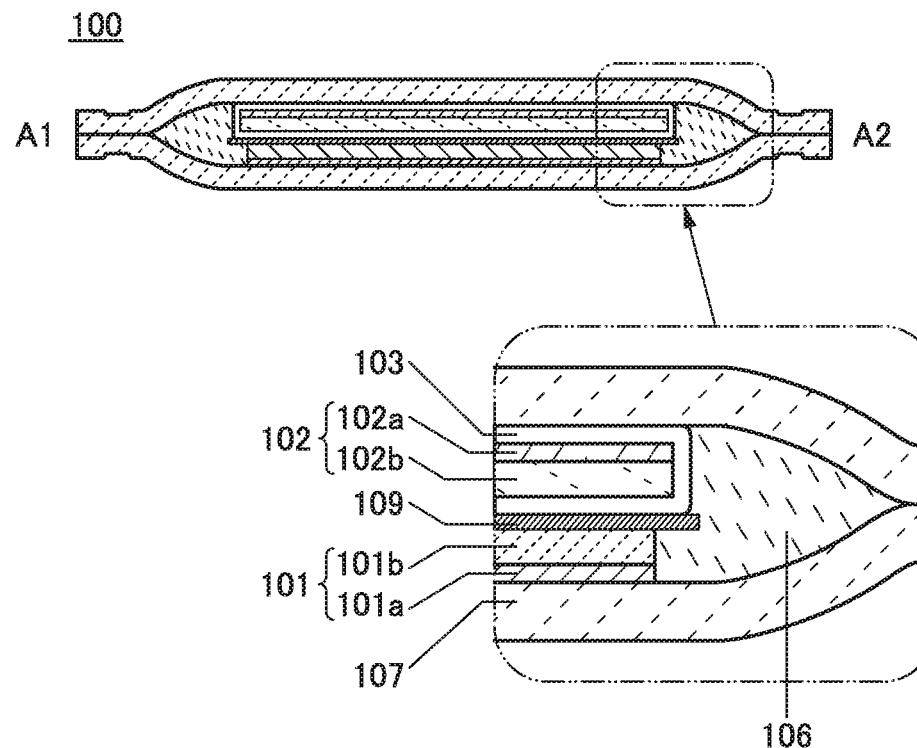
FIGS. 2A and 2B are schematic cross-sectional views of lithium-ion storage batteries.
Figure 29A:
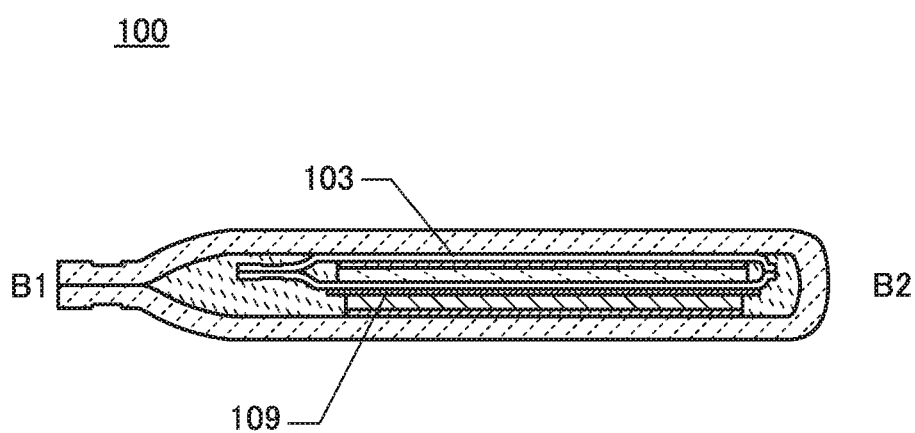
FIGS. 29A and 29B are schematic cross-sectional views of lithium-ion storage batteries.
Figure 29B:
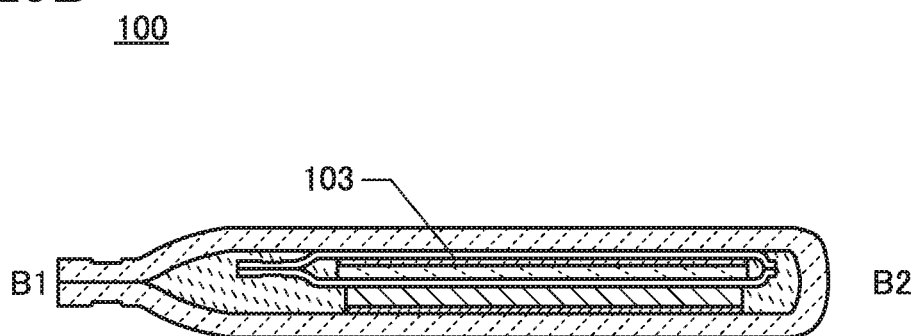

FIG. 2A is a cross-sectional view of the lithium-ion storage battery 100 of one embodiment of the present invention along the line A1-A2 in FIG. 1A and an enlarged view thereof. The lithium-ion storage battery 100 described in this embodiment includes an electrolyte solution 106, the positive electrode 101, the negative electrode 102, the graphene oxide film 103, and the separator 109 as shown in FIG. 2A. Note that the number of positive electrodes, that of negative electrodes, that of graphene oxide films, and that of separators in the lithium-ion storage battery 100 described in this embodiment are each mainly 1, but one embodiment of the present invention is not limited thereto. The positive electrode 101 includes a positive electrode current collector 101a and a positive electrode active material layer 101b, and the negative electrode 102 includes a negative electrode current collector 102a and a negative electrode active material layer 102b. FIG. 29A is a cross-sectional view taken along the line B1-B2 in FIG. 1A. FIG. 29B is a cross-sectional view taken along the line B1-B2 in FIG. 1B.

In the lithium-ion storage battery 100 described in this embodiment, the negative electrode 102 is wrapped in the graphene oxide film 103 as shown in FIG. 2A. However, one embodiment of the present invention is not limited thereto, and the positive electrode 101 may be wrapped in the graphene oxide film 103. Furthermore, each of the positive electrode 101 and the negative electrode 102 may be wrapped in a graphene oxide film. In the lithium-ion storage battery 100 shown in FIG. 3A, each of the positive electrode 101 and the negative electrode 102 is wrapped in a graphene oxide film.

Figure 2B:
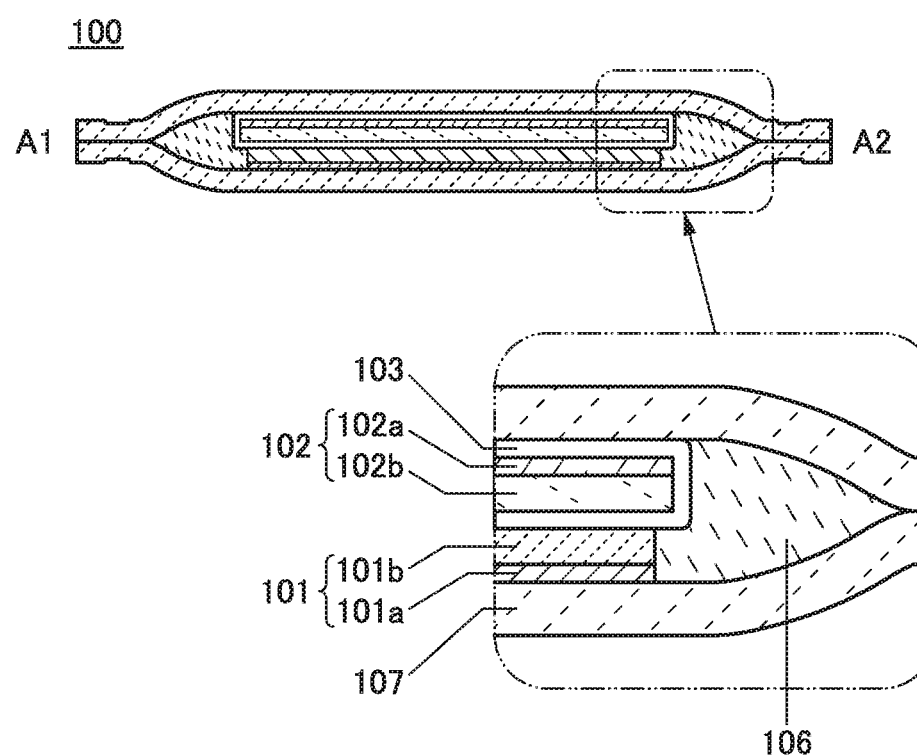

FIG. 2B shows the case where the lithium-ion storage battery 100 of one embodiment of the present invention does not include a separator. A cross section of the storage battery along the line A1-A2 in FIG. 1B and an enlarged view of the cross section are shown in FIG. 2B. In the lithium-ion storage battery 100 described in this embodiment and shown in FIG. 2B, the negative electrode 102 is wrapped in the graphene oxide film 103 as in FIG. 2A. However, one embodiment of the present invention is not limited thereto, and the positive electrode 101 may be wrapped in the graphene oxide film 103. Furthermore, each of the positive electrode 101 and the negative electrode 102 may be wrapped in a graphene oxide film. In the lithium-ion storage battery 100 shown in FIG. 3B, each of the positive electrode 101 and the negative electrode 102 is wrapped in a graphene oxide film.

In one embodiment of the present invention, the graphene oxide film 103 can have a flat surface with a low coefficient of friction. In this case, even when the lithium-ion storage battery 100 is deformed, the components in the lithium-ion storage battery 100 can slide on each other; therefore, damage due to stress is less likely to occur, and the durability of the storage battery is increased. Moreover, when the components slide on each other, one or each of the positive electrode 101 and the negative electrode 102 is wrapped in the graphene oxide film and is thus not exposed. Therefore, the short-circuit between the electrodes can be avoided, which can increase the safety of the lithium-ion storage battery 100.

In the lithium-ion storage battery 100 with flexibility and having a laminated structure of one embodiment of the present invention, when the lithium-ion storage battery 100 is deformed, the exterior body and an inner structure (a structure inside the exterior body) are also deformed, and stress due to the deformation is applied. A state before and after the deformation of the inner structure of the lithium-ion storage battery having a laminated structure is described with reference to FIGS. 4A to 4C.

Figure 4A:
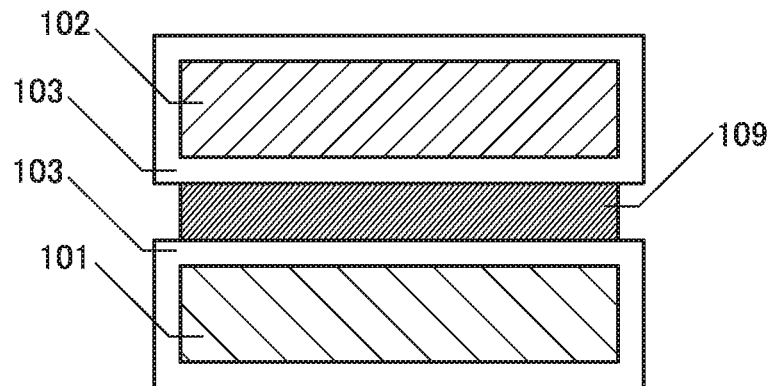
FIGS. 4A to 4C are schematic cross-sectional views of inner structures of lithium-ion storage batteries.
Figure 4B:
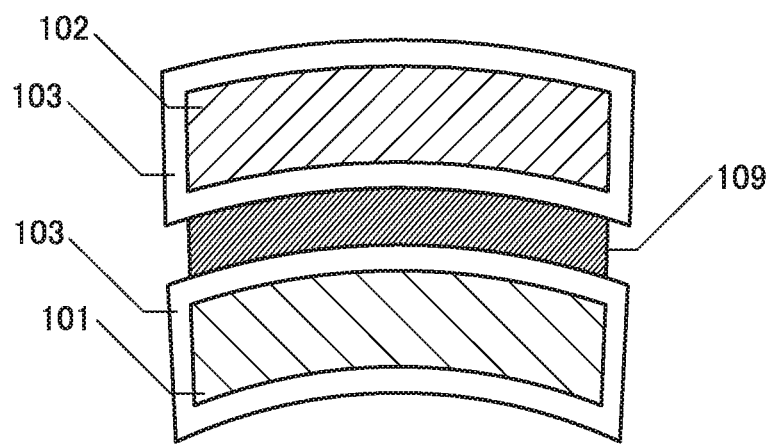

FIG. 4A shows a cross section of the inner structure of the lithium-ion storage battery 100 including the positive electrode 101 wrapped in the graphene oxide film and the negative electrode 102 wrapped in the graphene oxide film. The separator 109 is provided between the positive electrode 101 and the negative electrode 102. FIG. 4B is a cross-sectional view showing a state of an inner structure when the lithium-ion storage battery with flexibility and having a laminated structure is deformed. In FIG. 4B, each of the positive electrode 101 and the negative electrode 102 is wrapped in the graphene oxide film 103, and the surface of the graphene oxide film 103 is smoother and has a lower coefficient of friction than a surface of the electrode over which an active material is formed. Therefore, the positive electrode 101, the negative electrode 102, and the separator 109 can slide on each other easily. Accordingly, stress to be caused by the deformation of the storage battery is relieved between the positive electrode 101, the negative electrode 102, and the separator 109, so that damage due to the stress is less likely to occur. Note that damage to the graphene oxide film 103 due to the stress is less likely to occur because the graphene oxide film 103 itself has elasticity. Furthermore, the positive electrode 101 and the negative electrode 102 can be prevented from being exposed to the electrolyte solution and short-circuited because each of the positive electrode 101 and the negative electrode 102 is wrapped in the graphene oxide film 103.

Thus, the use of the graphene oxide film 103 for wrapping each of the positive electrode 101 and the negative electrode 102 can achieve the lithium-ion storage battery having flexibility and high durability against bending.

Next, a method for fabricating the storage battery of one embodiment of the present invention will be described. Note that in the description below, the lithium-ion storage battery shown in FIG. 2A is mainly described unless otherwise specified. However, needless to say, the description in this embodiment can be referred to for lithium-ion storage batteries shown in other drawings.

[1. Graphene Oxide Film]

Figure 30A:
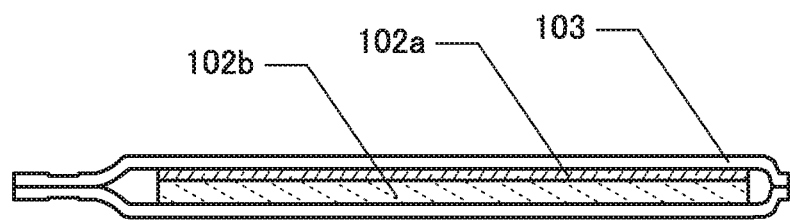
FIGS. 30A to 30C are schematic cross-sectional views of electrodes and graphene oxide films.
Figure 30B:
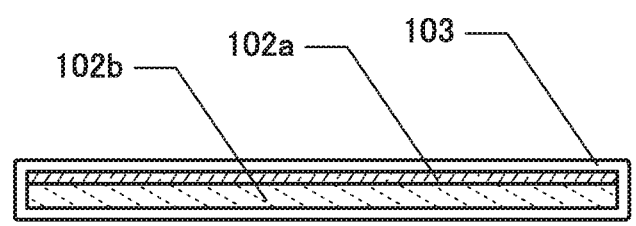
Figure 30C:
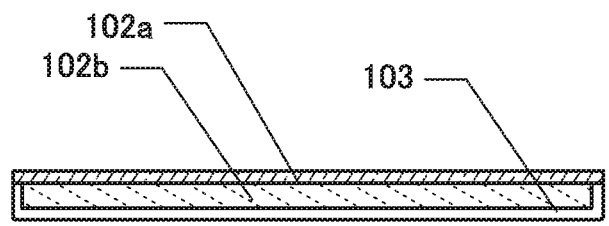

The graphene oxide film 103 may be formed by oxidizing a graphene compound or may be a modified graphene oxide. Alternatively, the graphene oxide film 103 may be obtained by forming a sheet-like graphene oxide and holding an electrode in the sheet-like graphene oxide. FIGS. 5A to 5D show the process. The negative electrode 102 in which a negative electrode active material layer is formed on a negative electrode current collector and to which the lead is attached is prepared in advance. A sheet-like graphene oxide is folded, and in a state where the negative electrode 102 is wrapped in the folded sheet-like graphene oxide, bonding is performed by providing a bonding portion 108 in an outer edge portion of the sheet-like graphene oxide. Thus, the graphene oxide film 103 wrapping the negative electrode 102 can be formed. In this case, at least part of the negative electrode needs to be prevented from being wholly covered with the graphene oxide film 103 to be connected to the lead. Therefore, needless to say, the lithium-ion storage battery of one embodiment of the present invention is not limited to the lithium-ion storage battery in which the negative electrode 102 is wholly wrapped in the graphene oxide film 103. It is sufficient that at least part of the negative electrode 102 is wrapped. In addition, the lithium-ion storage battery of one embodiment of the present invention is not limited to the lithium-ion storage battery in which the graphene oxide film 103 and the negative electrode 102 are directly in contact with each other, and another structure may be provided between the graphene oxide film 103 and the negative electrode 102. Note that when the negative electrode 102 is wrapped in the sheet-like graphene oxide film 103, the bonding portion 108 need not be provided. Examples of a schematic cross-sectional view of the negative electrode wrapped in the graphene oxide film 103 are shown in FIGS. 30A to 30C.

As another method for forming the graphene oxide film 103, the graphene oxide film 103 may be formed in the following manner: an electrode is soaked in and taken out from a liquid disperse medium in which particles of graphene oxide are dispersed, and the disperse medium is removed from a surface of the electrode. Alternatively, a cast method may be used. That is, a liquid disperse medium in which particles of graphene oxide are dispersed is applied to an electrode and spread on a surface of the electrode, and the disperse medium is removed, whereby the graphene oxide film 103 can be formed.

The negative electrode is wrapped in the sheet-like graphene oxide in the above example. In the case of the positive electrode, the positive electrode is wrapped as in the example. In one embodiment of the present invention, one or each of the positive electrode and the negative electrode is wrapped in the graphene oxide film 103. In some cases, graphene that is not oxidized can be used as the graphene oxide film 103. A graphene compound that can be used as the graphene oxide film 103 will be described in detail below.

With repetition of charge of a storage battery including lithium, lithium is deposited on a negative electrode in some cases. Particularly when the deposited lithium has a needle-like shape, a short-circuit is likely to occur between the negative electrode and the positive electrode through the deposited lithium. Meanwhile, the graphene oxide film 103 has a flat surface with a low coefficient of friction. When the negative electrode 102 is covered with the graphene oxide film 103 having the flat surface with the low coefficient of friction, a surface of the negative electrode active material layer 102b and the graphene oxide film 103 slide on each other in bending and stretching operation of the lithium-ion storage battery 100, so that lithium deposited on the surface of the negative electrode active material layer 102b can be removed physically. This can prevent a short-circuit between the positive electrode 101 and the negative electrode 102 and accordingly prevent a function of the lithium-ion storage battery 100 from being degraded. Moreover, the reliability of the lithium-ion storage battery 100 can be improved. Particularly in the case where the negative electrode active material layer 102b is provided on both surfaces of the negative electrode current collector 102a, lithium deposited on the surfaces of the negative electrode active material layer 102b can be removed at the same time by bending and stretching the lithium-ion storage battery 100. When the lithium-ion storage battery 100 is bent and stretched intentionally, the above-described effect can be further increased.

The graphene oxide film 103 has the flat surface with the low coefficient of friction and therefore can easily slide also in a portion where the graphene oxide film 103 contacts with a structure other than the negative electrode active material layer 102b. Therefore, when stress is generated in the structures by the deformation of the storage battery, the structures can easily slide on each other in accordance with the stress, so that the stress is likely to be relieved. Accordingly, the storage battery has high strength against the deformation.

Figure 3A:
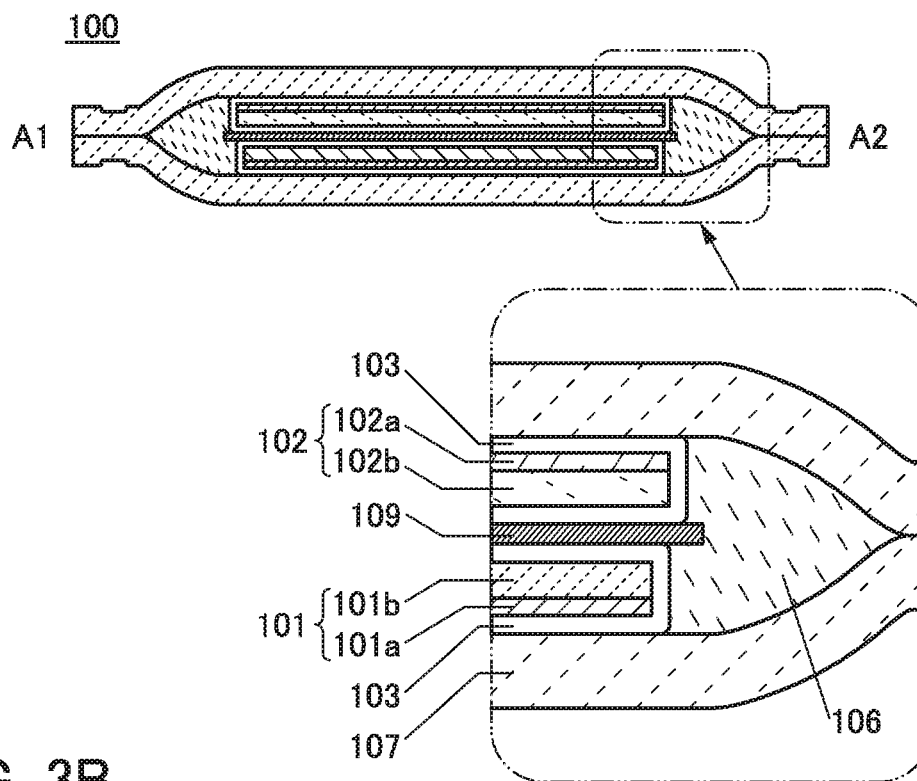
FIGS. 3A and 3B are schematic cross-sectional views of lithium-ion storage batteries.
Figure 3B:
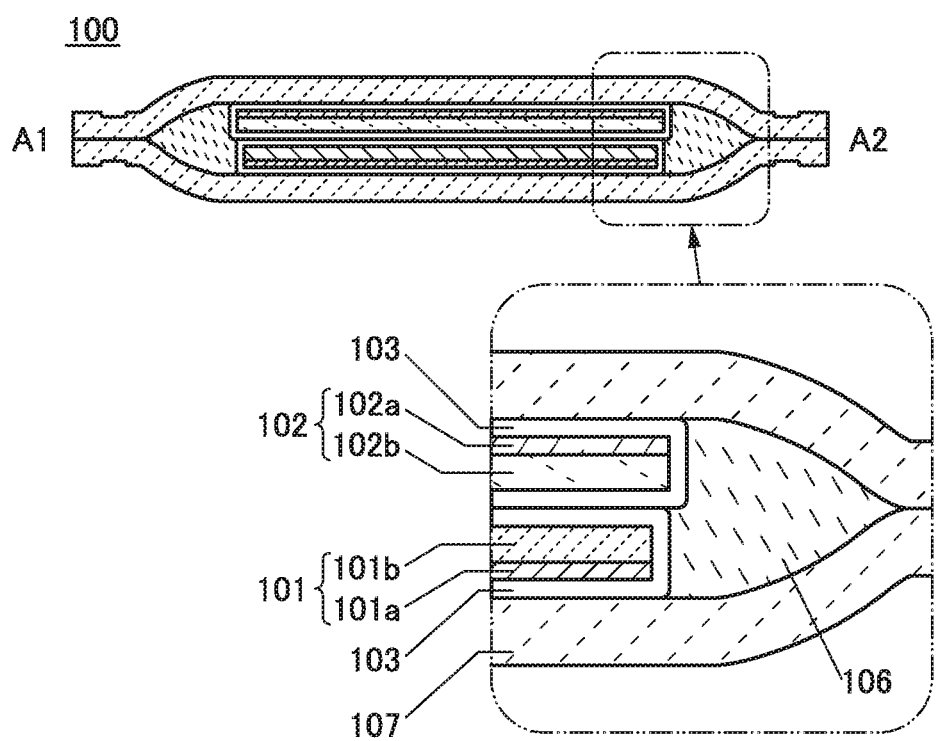

Note that the case where the negative electrode 102 is covered with the graphene oxide film 103 is described here; however, one embodiment of the present invention is not limited thereto. For example, the negative electrode 102 need not be covered with the graphene oxide film 103; the positive electrode 101 may be covered with the graphene oxide film 103 instead of the negative electrode 102. Alternatively, as shown in FIGS. 3A and 3B, the positive electrode 101 may also be covered with the graphene oxide film 103 in a manner similar to that of the negative electrode 102.

At least part of the graphene oxide film 103 may be modified. A structure in which only a certain part of the graphene oxide film 103 is modified and the other part thereof is not modified may be used. A structure in which part and the other part of the graphene oxide film 103 are modified differently may be used. For example, it is desirable that a portion of the graphene oxide film 103 between the positive electrode and the negative electrode can transmit lithium ions easily and the other portion can reliably prevent a short-circuit between the electrodes. Thus, in some cases, it is desirable that modification states of a first region and a second region in the graphene oxide film 103 be different from each other.

Note that in this specification, the expression "modification state" refers to a state of modification for a graphene compound. The expression "two regions are in different modification states" refers to not only the case where the types of modification made on the two regions are different from each other but also the case where the same type of modification is made on the two regions and the strengths of the modification are different from each other. Also in the case where modification is made on one region and modification is not made on another region, the expression "the regions are in different modification states" is used. Thus, in some cases, two regions in different modification states differ in the kind of an atom or an atomic group introduced into a graphene compound, and even in the case where atoms or atomic groups of the same kind are introduced, the introduction amounts are different from each other.

Figure 4C:
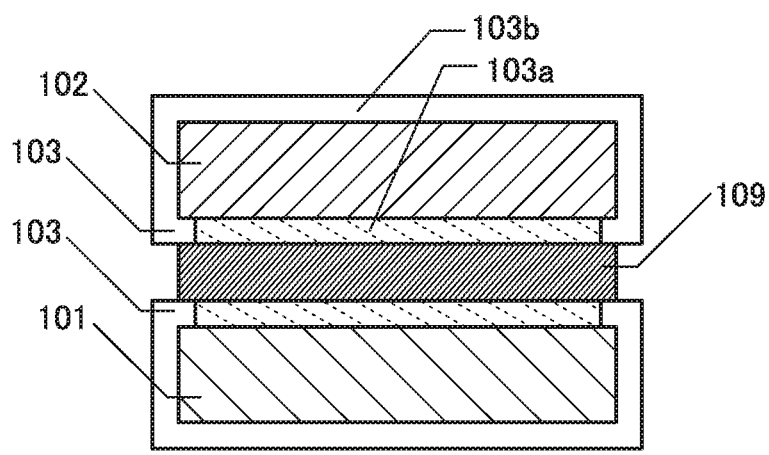
Figure 5A:
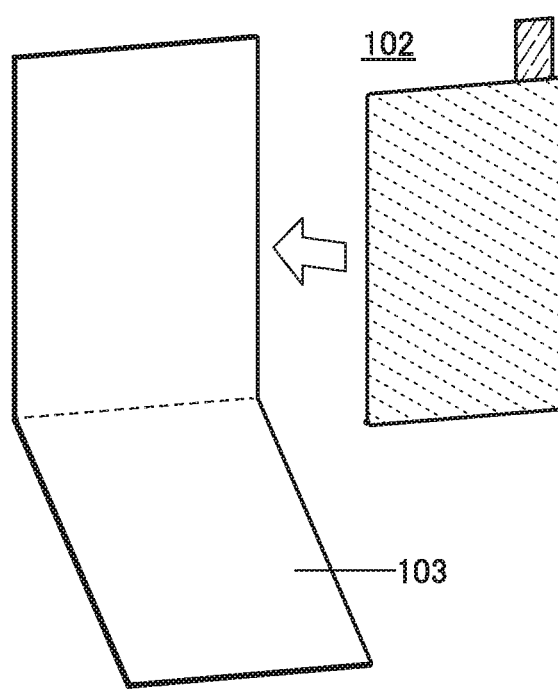
FIGS. 5A to 5D show a negative electrode wrapped in a graphene oxide film.
Figure 5B:
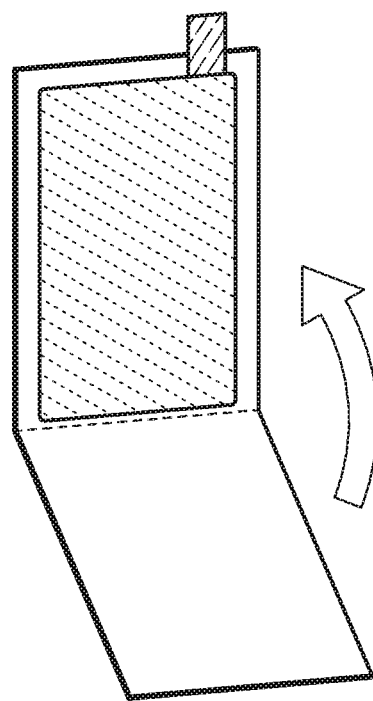
Figure 5C:
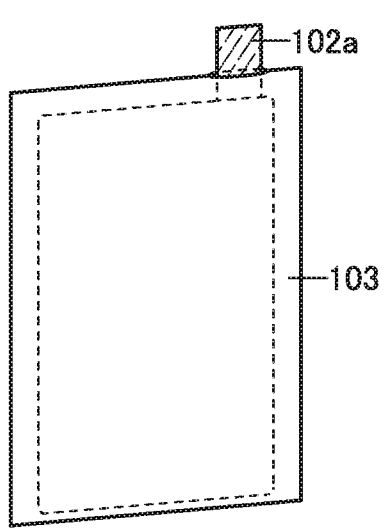
Figure 5D:
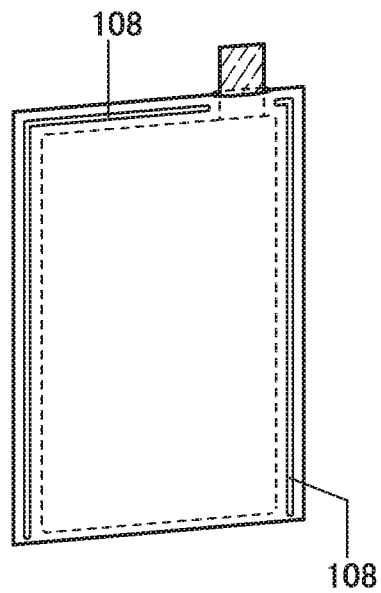

FIG. 4C shows the case where the modification states of a first region and a second region of the graphene oxide film 103 are different from each other. In FIG. 4C, for example, a first region 103a can be in a modification state where lithium ions are transmitted easily, and a second region 103b can be in a modification state where the mechanical strength is high.

Note that the modification of a graphene compound including graphene oxide will be described in detail below.

[2. Graphene Compound]

In one embodiment of the present invention, one or each of the positive electrode and the negative electrode is wrapped in the graphene oxide film 103. However, the graphene oxide film 103 is not limited to graphene oxide, and other graphene compounds can be used in some cases. A graphene compound may be used for a structure other than the graphene oxide film 103. For example, a graphene compound can be included in at least one of the positive electrode current collector 101a, the positive electrode active material layer 101b, the negative electrode current collector 102a, the negative electrode active material layer 102b, the separator 109, the exterior body 107, and the electrolyte solution 106. As described later, when modification is performed, the structure and characteristics of a graphene compound can be selected from a wider range of alternatives. Thus, a preferable property can be exhibited in accordance with a component in which a graphene compound is to be used. Moreover, a graphene compound has high mechanical strength and therefore can be used in a component of a flexible power storage device. Graphene compounds are described below.

Graphene has carbon atoms arranged in one atomic layer. A π bond exists between the carbon atoms. Graphene including two or more and hundred or less layers is referred to as multilayer graphene in some cases. The length in the longitudinal direction or the length of the major axis in a plane in each of graphene and multilayer graphene is greater than or equal to 50 nm and less than or equal to 100 μm or greater than or equal to 800 nm and less than or equal to 50 μm.

In this specification and the like, a compound including graphene or multilayer graphene as a basic skeleton is referred to as a graphene compound. Graphene compounds include graphene and multilayer graphene.

Graphene compounds are detailed below.

A graphene compound is, for example, a compound where graphene or multilayer graphene is modified with an atom other than carbon or an atomic group with an atom other than carbon. A graphene compound may be a compound where graphene or multilayer graphene is modified with an atomic group composed mainly of carbon, such as an alkyl group or alkylene. An atomic group that modifies graphene or multilayer graphene is referred to as a substituent, a functional group, a characteristic group, or the like in some cases. Modification in this specification and the like refers to introduction of an atom other than carbon, an atomic group with an atom other than carbon, or an atomic group composed mainly of carbon to graphene, multilayer graphene, a graphene compound, or graphene oxide (described later) by a substitution reaction, an addition reaction, or other reactions.

Note that the surface side and the rear surface side of graphene may be modified with different atoms or atomic groups. In multilayer graphene, multiple layers may be modified with different atoms or atomic groups.

An example of the above-described graphene modified with an atom or an atomic group is graphene or multilayer graphene that is modified with oxygen or a functional group containing oxygen. Examples of a functional group containing oxygen include an epoxy group, a carbonyl group such as a carboxyl group, and a hydroxyl group. A graphene compound modified with oxygen or a functional group containing oxygen is referred to as graphene oxide in some cases. In this specification, graphene oxides include multilayer graphene oxides.

As an example of modification of graphene oxide, silylation of graphene oxide is described. First, in a nitrogen atmosphere, graphene oxide is put in a container, n-butylamine ($C_4H_9NH_2$) is added to the container, and stirring is performed for one hour with the temperature kept at 60° C. Then, toluene is added to the container, alkyltrichlorosilane is added thereto as a silylating agent, and stirring is performed in a nitrogen atmosphere for five hours with the temperature kept at 60° C. Then, toluene is further added to the container, and the resulting solution is suction-filtrated to give a solid powder. The powder is dispersed in ethanol, and the resulting solution is suction-filtered to give a solid powder. The powder is dispersed in acetone, and the resulting solution is suction-filtered to give a solid powder. A liquid of the solid powder is vaporized to give silylated graphene oxide.

Note that silylation is described as an example of the modification performed on graphene oxide, but silylation is not limited to the modification performed on graphene oxide. In some cases, silylation can be performed on graphene that is not oxidized. Furthermore, modification in this embodiment is not limited to the modification performed on graphene oxide and can be performed on graphene compounds in some cases. The modification is not limited to silylation, and silylation is not limited to the above-described method.

The modification is not limited to introduction of an atom or an atomic group of one kind, and the modification of two or more types may be performed to introduce atoms or atomic groups of two or more kinds. As modification, a reaction of adding hydrogen, a halogen atom, a hydrocarbon group, an aromatic series hydrocarbon group, and/or a heterocyclic compound group may be performed. As a reaction of introducing an atomic group to graphene, an addition reaction, a substitution reaction, or the like are given. Alternatively, a Friedel-Crafts reaction, a Bingel reaction, or the like may be performed. A radical addition reaction may be performed on graphene, and a ring may be formed between graphene and an atomic group by a cycloaddition reaction.

By introducing a given atomic group to a graphene compound, the physical property of the graphene compound can be changed. Therefore, by performing desirable modification in accordance with the application of a graphene compound, a desired property of the graphene compound can be exhibited intentionally.

A formation method example of graphene oxide is described below. Graphene oxide can be obtained by oxidizing the aforementioned graphene or multilayer graphene. Alternatively, graphene oxide can be obtained by being separated from graphite oxide. Graphite oxide can be obtained by oxidizing graphite. The graphene oxide may be further modified with the above-mentioned atom or atomic group.

A compound that can be obtained by reducing graphene oxide is referred to as reduced graphene oxide (RGO) in some cases. In RGO, in some cases, all oxygen atoms contained in the graphene oxide are not extracted and part of them remains in a state of bonded oxygen or atomic group containing oxygen. In some cases, RGO includes a functional group, e.g., an epoxy group, a carbonyl group such as a carboxyl group, or a hydroxyl group.

A graphene compound may have a sheet-like shape where a plurality of graphene compounds overlap each other. Such a graphene compound is referred to as graphene compound sheet in some cases. The graphene compound sheet has, for example, an area with a thickness larger than or equal to 0.33 nm and smaller than or equal to 10 mm, preferably larger than or equal to 0.34 nm and smaller than or equal to 10 μm. The graphene compound sheet may be modified with an atom other than carbon, an atomic group containing an atom other than carbon, an atomic group composed mainly of carbon such as an alkyl group, or the like. A plurality of layers in the graphene compound sheet may be modified with different atoms or atomic groups.

A graphene compound may have a five-membered ring composed of carbon atoms or a poly-membered ring that is a seven- or more-membered ring composed of carbon atoms, in addition to a six-membered ring composed of carbon atoms. In the neighborhood of a poly-membered ring which is a seven- or more-membered ring, a region through which a lithium ion can pass may be generated.

A plurality of graphene compounds may be gathered to form a sheet-like shape. A graphene compound has a planar shape, thereby enabling surface contact.

In some cases, a graphene compound has high conductivity even when it is thin. The contact area between graphene compounds or between a graphene compound and an active material can be increased by surface contact. Thus, even with a small amount of a graphene compound per volume, a conductive path can be formed efficiently.

In contrast, a graphene compound may also be used as an insulator. For example, a graphene compound sheet may be used as a sheet-like insulator. Graphene oxide, for example, has a higher insulation property than a graphene compound that is not oxidized, in some cases. A graphene compound modified with an atomic group may have an improved insulation property, depending on the type of the modifying atomic group.

A graphene compound in this specification and the like may include a precursor of graphene. The precursor of graphene refers to a substance used for forming graphene. The precursor of graphene may contain the above-described graphene oxide, graphite oxide, or the like.

Graphene containing an alkali metal or an element other than carbon, such as oxygen, is referred to as a graphene analog in some cases. In this specification and the like, graphene compounds include graphene analogs.

A graphene compound in this specification and the like may include an atom, an atomic group, and ions of them between the layers. The physical properties, such as electric conductivity and ion conductivity, of a graphene compound sometimes change when an atom, an atomic group, and ions of them exist between layers of the compound. For example, by mixing a lithium salt with a graphene compound, the ion conductivity of the graphene compound can be increased. As the lithium salt, one or more of $LiPF_6$, $LiClO_4$, $LiAsF_6$, $LiBF_4$, $LiAlCl_4$, $LiSCN$, $LiBr$, $LiI$, $Li_2SO_4$, $Li_2B_{12}Cl_{12}$, $LiCF_3SO_3$, $LiC_4F_9SO_3$, $LiC(CF_3SO_2)_3$, $LiC(C_2F_5SO_2)_3$, $LiN(CF_3SO_2)_2$, $LiN(C_4F_9SO_2)(CF_3SO_2)$, $LiN(C_2F_5SO_2)_2$, and the like can be used. In addition, a distance between the layers is increased in some cases.

A graphene compound has excellent electrical characteristics of high conductivity and excellent physical properties of high flexibility and high mechanical strength in some cases. A modified graphene compound can have extremely low conductivity and serve as an insulator depending on the type of the modification. A graphene compound has a planar shape. A Graphene compound enables low-resistance surface contact.

[3. Positive Electrode]

The positive electrode 101 includes, for example, a positive electrode current collector 101a and a positive electrode active material layer 101b formed on the positive electrode current collector 101a. In this embodiment, an example of providing the positive electrode active material layer 101b on one surface of the positive electrode current collector 101a having a sheet shape (or a strip-like shape) is given. However, this embodiment is not limited thereto; the positive electrode active material layer 101b may be provided on both surfaces of the positive electrode current collector 101a. Providing the positive electrode active material layer 101b on both surfaces of the positive electrode current collector 101a allows the lithium-ion storage battery 100 to have high capacity. Furthermore, in this embodiment, the positive electrode active material layer 101b is provided on the whole positive electrode current collector 101a. However, this embodiment is not limited thereto; the positive electrode active material layer 101b may be provided on a part of the positive electrode current collector 101a. For example, the positive electrode active material layer 101b is not provided on a portion of the positive electrode current collector 101a which is to be electrically in contact with the positive electrode lead 104 (hereinafter, the portion is also referred to as a "positive electrode tab").

The positive electrode current collector 101a can be formed using a material that has high conductivity and is not alloyed with a carrier ion of lithium or the like, such as stainless steel, gold, platinum, zinc, iron, copper, aluminum, or titanium, an alloy thereof, or the like. Alternatively, an aluminum alloy to which an element which improves heat resistance, such as silicon, titanium, neodymium, scandium, or molybdenum, is added can be used. Still alternatively, a metal element which forms silicide by reacting with silicon can be used. Examples of the metal element which forms silicide by reacting with silicon include zirconium, titanium, hafnium, vanadium, niobium, tantalum, chromium, molybdenum, tungsten, cobalt, nickel, and the like. The positive electrode current collector 101a can have a foil-like shape, a plate-like shape (sheet-like shape), a net-like shape, a punching-metal shape, an expanded-metal shape, or the like as appropriate. The positive electrode current collector 101a preferably has a thickness greater than or equal to 5 μm and less than or equal to 30 μm. The surface of the positive electrode current collector 101a may be provided with an undercoat using graphite or the like.

The positive electrode active material layer 101b may further include a binder for increasing adhesion of positive electrode active materials, a conductive additive for increasing the conductivity of the positive electrode active material layer 101b, and the like in addition to the positive electrode active material.

Examples of a positive electrode active material used for the positive electrode active material layer 101b include a composite oxide with an olivine crystal structure, a composite oxide with a layered rock-salt crystal structure, and a composite oxide with a spinel crystal structure. As the positive electrode active material, a compound such as $LiFeO_2$, $LiCoO_2$, $LiNiO_2$, $LiMn_2O_4$, $V_2O_5$, $Cr_2O_5$, and $MnO_2$ is used.

$LiCoO_2$ is particularly preferable because it has high capacity, stability in the air higher than that of $LiNiO_2$, and thermal stability higher than that of $LiNiO_2$, for example.

It is preferable to add a small amount of lithium nickel oxide ($LiNiO_2$ or $LiNi_{1-x}M_xO_2$ ($0<x<1$, M=Co, Al, or the like)) to a lithium-containing material with a spinel crystal structure which contains manganese such as $LiMn_2O_4$ because the dissolution of manganese and the decomposition of an electrolyte solution can be suppressed, for example.

Alternatively, a complex material ($LiMPO_4$ (general formula) (M is one or more of Fe(II), Mn(II), Co(II), and Ni(II))) can be used. Typical examples of the general formula $LiMPO_4$ are lithium compounds such as $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNiaCo_bPO_4$, $LiNi_aMn_bPO_4$ ($a+b\leq1$, $0<a<1$, and $0<b<1$), $LiFe_cNi_dCo_ePO_4$, $LiFe_cNi_dMn_ePO_4$, $LiNi_cCo_dMn_ePO_4$ ($c+d+e\leq1$, $0<c<1$, $0<d<1$, and $0<e<1$), and $LiFe_fNi_gCo_hMn_iPO_4$ ($f+g+h+i\leq1$, $0<f<1$, $0<g<1$, $0<h<1$, and $0<i<1$).

$LiFePO_4$ is particularly preferable because it properly satisfies conditions necessary for the positive electrode active material, such as safety, stability, high capacity density, high potential, and the existence of lithium ions which can be extracted in initial oxidation (charging).

Alternatively, a complex material such as $Li_{(2-j)}MSiO_4$ (general formula) (M is one or more of Fe(II), Mn(II), Co(II), and Ni(II); $0\leq j\leq 2$) may be used. Typical examples of the general formula $Li_{(2-j)}MSiO_4$ are lithium compounds such as $Li_{(2-j)}FeSiO_4$, $Li_{(2-j)}NiSiO_4$, $Li_{(2-j)}CoSiO_4$, $Li_{(2-j)}MnSiO_4$, $Li_{(2-j)}Fe_kNi_lSiO_4$, $Li_{(2-j)}Fe_kCo_lSiO_4$, $Li_{(2-j)}Fe_kMn_lSiO_4$, $Li_{(2-j)}Ni_kCo_nSiO_4$, $Li_{(2-j)}Ni_kMn_lSiO_4$ ($k+l<1$, $0<k<1$, and $0<l<1$), $Li_{(2-j)}Fe_mNi_nCo_gSiO_4$, $Li_{(2-j)}Fe_mNi_nMn_qSiO_4$, $Li_{(2-j)}Ni_mCo_nMn_qSiO_4$ ($m+n+q\leq1$, $0<m<1$, $0<n<1$, and $0<q<1$), and $Li_{(2-j)}Fe_rNi_sCo_tMn_uSiO_4$ ($r+s+t+u\leq1$, $0<r<1$, $0<s<1$, $0<t<1$, and $0<u<1$).

Still alternatively, a nasicon compound expressed by $A_xM_2(XO_4)_3$ (general formula) (A=Li, Na, or Mg, M=Fe, Mn, Ti, V, Nb, or Al, X=S, P, Mo, W, As, or Si) can be used as the positive electrode active material. Examples of the nasicon compound are $Fe_2(MnO_4)_3$, $Fe_2(SO_4)_3$, and $Li_3Fe_2(PO_4)_3$. Still further alternatively, compounds represented by a general formula, $Li_2MPO_4F$, $Li_2MP_2O_7$, and $Li_5MO_4$ (M=Fe or Mn), a perovskite fluoride such as $NaFeF_3$ and $FeF_3$, a metal chalcogenide (a sulfide, a selenide, and a telluride) such as $TiS_2$ and $MoS_2$, an oxide with an inverse spinel crystal structure such as $LiMVO_4$, a vanadium oxide (e.g., $V_2O_5$, $V_6O_{13}$, and $LiV_3O_8$), a manganese oxide, and an organic sulfur compound can be used as the positive electrode active material, for example.

In the case where carrier ions are alkali metal ions other than lithium ions or alkaline-earth metal ions, the positive electrode active material may contain, instead of lithium, an alkali metal (e.g., sodium or potassium) or an alkaline-earth metal (e.g., calcium, strontium, barium, beryllium, or magnesium). For example, the positive electrode active material may be a layered oxide containing sodium such as $NaFeO_2$ or $Na_{2/3}[Fe_{1/2}Mn_{1/2}]O_2$.

Further alternatively, any of the aforementioned materials may be combined to be used as the positive electrode active material. For example, the positive electrode active material may be a solid solution containing any of the aforementioned materials, e.g., a solid solution containing $LiCo_{1/3}Mn_{1/3}N_{1/3}O_2$ and $Li_2MnO_3$.

Note that although not shown, a conductive material such as a carbon layer may be provided on a surface of the positive electrode active material layer 101b. With the conductive material such as the carbon layer, conductivity of the electrode can be increased. For example, the positive electrode active material layer 101b can be coated with the carbon layer by mixing a carbohydrate such as glucose at the time of baking the positive electrode active material.

The average particle diameter of the primary particle of the positive electrode active material layer 101b is preferably greater than or equal to 50 nm and less than or equal to 100 μm.

Examples of the conductive additive include acetylene black (AB), graphite (black lead) particles, carbon nanotubes, a graphene compound, and fullerene.

A network for electron conduction can be formed in the positive electrode 101 by the conductive additive. The conductive additive also allows maintaining of a path for electric conduction between the particles of the positive electrode active material layer 101b. The addition of the conductive additive to the positive electrode active material layer 101b increases the electron conductivity of the positive electrode active material layer 101b.

As the binder, instead of polyvinylidene fluoride (PVDF) as a typical one, polyimide, polytetrafluoroethylene, polyvinyl chloride, ethylene-propylene-diene polymer, styrene-butadiene rubber, acrylonitrile-butadiene rubber, fluorine rubber, polyvinyl acetate, polymethyl methacrylate, polyethylene, nitrocellulose or the like can be used.

The content of the binder in the positive electrode active material layer 101b is preferably greater than or equal to 1 wt % and less than or equal to 10 wt %, more preferably greater than or equal to 2 wt % and less than or equal to 8 wt %, and still more preferably greater than or equal to 3 wt % and less than or equal to 5 wt %. The content of the conductive additive in the positive electrode active material layer 101b is preferably greater than or equal to 1 wt % and less than or equal to 10 wt %, more preferably greater than or equal to 1 wt % and less than or equal to 5 wt %.

In the case where the positive electrode active material layer 101b is formed by a coating method, the positive electrode active material, the binder, and the conductive additive are mixed to form a positive electrode paste (slurry), and the positive electrode paste is applied to the positive electrode current collector 101a and dried.

The positive electrode active material layer 101b may be formed by a sputtering method.

In the case where the positive electrode is wrapped in the graphene oxide film 103, the graphene oxide film 103 for wrapping the positive electrode may be formed by a cast method. Schematic cross-sectional views of the positive electrode and the graphene oxide film that are formed in this manner are similar to FIGS. 30A to 30C, i.e., schematic cross-sectional views illustrating the case where the negative electrode is wrapped in the graphene oxide film.

[4. Negative Electrode]

The negative electrode 102 includes, for example, a negative electrode current collector 102a and a negative electrode active material layer 102b formed on the negative electrode current collector 102a. In this embodiment, an example of providing the negative electrode active material layer 102b on one surface of the negative electrode current collector 102a having a sheet shape (or a strip-like shape) is given. However, this embodiment is not limited thereto; the negative electrode active material layer 102b may be provided on both surfaces of the negative electrode current collector 102a. Providing the negative electrode active material layer 102b on both surfaces of the negative electrode current collector 102a allows the lithium-ion storage battery 100 to have high capacity. Furthermore, in this embodiment, the negative electrode active material layer 102b is provided on the whole negative electrode current collector 102a. However, this embodiment is not limited thereto; the negative electrode active material layer 102b may be provided on a part of the negative electrode current collector 102a. For example, the negative electrode active material layer 102b is not provided on a portion of the negative electrode current collector 102a which is to be electrically in contact with the negative electrode lead 105 (hereinafter, the portion is also referred to as a "negative electrode tab").

The negative electrode current collector 102a can be formed using a material that has high conductivity and is not alloyed with a carrier ion of lithium or the like, such as stainless steel, gold, platinum, zinc, iron, copper, titanium, an alloy thereof, or the like. Alternatively, a metal element which forms silicide by reacting with silicon can be used. Examples of the metal element which forms silicide by reacting with silicon include zirconium, titanium, hafnium, vanadium, niobium, tantalum, chromium, molybdenum, tungsten, cobalt, nickel, and the like. The negative electrode current collector 102a can have a foil-like shape, a plate-like shape (sheet-like shape), a net-like shape, a punching-metal shape, an expanded-metal shape, or the like as appropriate. The negative electrode current collector 102a preferably has a thickness greater than or equal to 5 μm and less than or equal to 30 μm. The surface of the negative electrode current collector 102a may be provided with an undercoat using graphite or the like.

The negative electrode active material layer 102b may further include a binder for increasing adhesion of negative electrode active materials, a conductive additive for increasing the conductivity of the negative electrode active material layer 102b, and the like in addition to the negative electrode active materials.

There is no particular limitation on the material of the negative electrode active material layer 102b as long as it is a material with which lithium can be dissolved and precipitated or a material into/from which lithium ions can be inserted and extracted. Other than a lithium metal or lithium titanate, a carbon-based material generally used in the field of power storage, or an alloy-based material can also be used as the negative electrode active material layer 102b.

The lithium metal is preferable because of its low redox potential (3.045 V lower than that of a standard hydrogen electrode) and high specific capacity per unit weight and per unit volume (3860 mAh/g and 2062 mAh/cm$^3$).

Examples of the carbon-based material include graphite, graphitizing carbon (soft carbon), non-graphitizing carbon (hard carbon), a carbon nanotube, a graphene compound, carbon black, and the like.

Examples of the graphite include artificial graphite such as meso-carbon microbeads (MCMB), coke-based artificial graphite, or pitch-based artificial graphite and natural graphite such as spherical natural graphite.

Graphite has a low potential substantially equal to that of a lithium metal (0.1 V to 0.3 V vs. Li/Li$^+$) when lithium ions are inserted into the graphite (when a lithium-graphite intercalation compound is formed). For this reason, a lithium ion battery can have a high operating voltage. In addition, graphite is preferable because of its advantages such as relatively high capacity per unit volume, small volume expansion, low cost, and safety greater than that of a lithium metal.

For the negative electrode active material, an alloy-based material which enables charge-discharge reaction by an alloying reaction and a dealloying reaction with lithium can be used. In the case where lithium ions are carrier ions, the alloy-based material is, for example, a material containing at least one of Al, Si, Ge, Sn, Pb, Sb, Bi, Ag, Zn, Cd, In, Ga, and the like. Such elements have higher capacity than carbon. In particular, silicon has a theoretical capacity of 4200 mAh/g, which is significantly high. For this reason, silicon is preferably used as the negative electrode active material. Examples of the alloy-based material using such elements include $Mg_2Si$, $Mg_2Ge$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, SbSn, and the like.

Alternatively, as the negative electrode active material layer 102b, oxide such as SiO, SnO, $SnO_2$, titanium oxide ($TiO_2$), lithium titanium oxide ($Li_4Ti_5O_{12}$), lithium-graphite intercalation compound ($Li_xC_6$), niobium oxide ($Nb_2O_5$), tungsten oxide ($WO_2$), molybdenum oxide ($MoO_2$), or the like can be used.

Still alternatively, as the negative electrode active material layer 102b, (M=Co, Ni, or Cu) with a $Li_3N$ structure, which is a nitride containing lithium and a transition metal, can be used. For example, $Li_{2.6}Co_{0.4}N_3$ is preferable because of high charge and discharge capacity (900 mAh/g and 1890 mAh/cm$^3$).

A nitride containing lithium and a transition metal is preferably used, in which case lithium ions are contained in the negative electrode active material and thus the negative electrode active material can be used in combination with a material for a positive electrode active material which does not contain lithium ions, such as $V_2O_5$ or $Cr_3O_8$. Note that in the case of using a material containing lithium ions as a positive electrode active material, the nitride containing lithium and a transition metal can be used as the negative electrode active material by extracting the lithium ions contained in the positive electrode active material in advance.

Still further alternatively, as the negative electrode active material layer 102b, a material which causes conversion reaction can be used. For example, a transition metal oxide with which an alloying reaction with lithium is not caused, such as cobalt oxide (CoO), nickel oxide (NiO), or iron oxide (FeO), may be used for the negative electrode active material. Other examples of the material which causes a conversion reaction include oxides such as $Fe_2O_3$, CuO, $Cu_2O$, $RuO_2$, and $Cr_2O_3$, sulfides such as $CoS_{0.89}$, NiS, or CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$. Note that any of the fluorides can be used as the negative electrode active material layer 102b because of its high potential.

In the case where the negative electrode active material layer 102b is formed by a coating method, the negative electrode active material and the binder are mixed to form a negative electrode paste (slurry), and the negative electrode paste is applied to the negative electrode current collector 102a and dried. Note that a conductive additive may be added to the negative electrode paste. The negative electrode active material layer 102b may be formed by a sputtering method.

Then, the graphene oxide film 103 that wraps the negative electrode active material layer may be formed by a cast method. Examples of a cross-sectional structure of the negative electrode and the graphene oxide film in that case are shown in FIGS. 30A to 30C.

A graphene compound may be formed on a surface of the negative electrode active material layer 102b. For example, in the case of using silicon as the negative electrode active material layer 102b, the volume of silicon is greatly changed due to occlusion and release of carrier ions in charge-discharge cycles. Thus, adhesion between the negative electrode current collector 102a and the negative electrode active material layer 102b is decreased, resulting in degradation of battery characteristics caused by charge and discharge. In view of this, a graphene compound is preferably formed on a surface of the negative electrode active material layer 102b containing silicon because even when the volume of silicon is changed in charge-discharge cycles, separation between the negative electrode current collector 102a and the negative electrode active material layer 102b can be prevented, which makes it possible to reduce degradation of battery characteristics.

Further, a coating film of oxide or the like may be formed on the surface of the negative electrode active material layer 102b. A coating film formed by decomposition or the like of an electrolyte solution or the like in charging cannot release electric charges used at the formation, and therefore forms irreversible capacity. In contrast, the film of an oxide or the like provided on the surface of the negative electrode active material layer 102b in advance can reduce or prevent generation of irreversible capacity.

As the coating film coating the negative electrode active material layer 102b, an oxide film of any one of niobium, titanium, vanadium, tantalum, tungsten, zirconium, molybdenum, hafnium, chromium, aluminum, and silicon or an oxide film containing any one of these elements and lithium can be used. Such a film is denser than a conventional film formed on a surface of a negative electrode due to a decomposition product of an electrolyte solution.

For example, niobium pentoxide ($Nb_2O_5$) has a low electric conductivity of $10^{-9}$ S/cm and a high insulating property. For this reason, a niobium oxide film inhibits electrochemical decomposition reaction between the negative electrode active material and the electrolyte solution. On the other hand, niobium oxide has a lithium diffusion coefficient of $10^{-9}$ cm$^2$/sec and high lithium ion conductivity. Therefore, niobium oxide can transmit lithium ions. Alternatively, silicon oxide or aluminum oxide may be used.

A sol-gel method can be used to coat the negative electrode active material layer 102b with the coating film, for example. The sol-gel method is a method for forming a thin film in such a manner that a solution of metal alkoxide, a metal salt, or the like is changed into a gel, which has lost its fluidity, by hydrolysis reaction and polycondensation reaction and the gel is baked. Since a thin film is formed from a liquid phase in the sol-gel method, raw materials can be mixed uniformly on the molecular scale. For this reason, by adding a negative electrode active material such as graphite to a raw material of the metal oxide film which is a solvent, the active material can be easily dispersed into the gel. In such a manner, the coating film can be formed on the surface of the negative electrode active material layer 102*b*. A decrease in the capacity of the storage battery can be prevented by using the coating film.

[5. Electrolyte Solution]

As a solvent of the electrolyte solution 106 used for the storage battery 100, an aprotic organic solvent is preferably used. For example, one of ethylene carbonate (EC), propylene carbonate (PC), butylene carbonate, chloroethylene carbonate, vinylene carbonate, γ-butyrolactone, γ-valerolactone, dimethyl carbonate (DMC), diethyl carbonate (DEC), ethyl methyl carbonate (EMC), methyl formate, methyl acetate, methyl butyrate, 1,3-dioxane, 1,4-dioxane, dimethoxyethane (DME), dimethyl sulfoxide, diethyl ether, methyl diglyme, acetonitrile, benzonitrile, tetrahydrofuran, sulfolane, and sultone can be used, or two or more of these solvents can be used in an appropriate combination in an appropriate ratio.

When a gelled high-molecular material is used as the solvent for the electrolyte solution, safety against liquid leakage and the like is improved. Further, a secondary battery can be thinner and more lightweight. Typical examples of the gelled high-molecular material include a silicone gel, an acrylic gel, an acrylonitrile gel, a poly(ethylene oxide)-based gel, a poly(propylene oxide)-based gel, a gel of a fluorine-based polymer, and the like.

Alternatively, the use of one or more ionic liquids (room temperature molten salts) which are less likely to burn and volatilize as the solvent of the electrolyte solution can prevent the storage battery from exploding or catching fire even when the storage battery internally shorts out or the internal temperature increases due to overcharging or the like.

In the case of using a lithium ion as a carrier ion, as an electrolyte dissolved in the above-described solvent, one of lithium salts such as $LiPF_6$, $LiClO_4$, $LiAsF_6$, $LiBF_4$, $LiAlCl_4$, LiSCN, LiBr, LiI, $Li_2SO_4$, $Li_2B_{10}Cl_{10}$, $Li_2B_{12}Cl_{12}$, $LiCF_3SO_3$, $LiC_4F_9SO_3$, $LiC(CF_3SO_2)_3$, $LiC(C_2F_5SO_2)_3$, $LiN(CF_3SO_2)_2$, $LiN(C_4F_9SO_2)(CF_3SO_2)$, and $LiN(C_2F_5SO_2)_2$ can be used, or two or more of these lithium salts can be used in an appropriate combination in an appropriate ratio.

The electrolyte solution used for the storage battery preferably contains a small amount of dust particles and elements other than the constituent elements of the electrolyte solution (hereinafter, also simply referred to as impurities) so as to be highly purified. Specifically, the weight ratio of impurities to the electrolyte solution is less than or equal to 1%, preferably less than or equal to 0.1%, and more preferably less than or equal to 0.01%. An additive agent such as vinylene carbonate may be added to the electrolyte solution.

[6. Exterior Body]

The secondary battery can have any of a variety of structures. In this embodiment, a film is used for the exterior body 107. Note that the film used for the exterior body 107 is a single-layer film selected from a metal film (e.g., an aluminum film, a stainless steel film, and a nickel steel film), a plastic film made of an organic material, a hybrid material film including an organic material (e.g., an organic resin or fiber) and an inorganic material (e.g., ceramic), and a carbon-containing inorganic film (e.g., a carbon film or a graphite film); or a stacked-layer film including two or more of the above films. A metal film is easily embossed. Forming a depression or a projection on a surface of a metal film by embossing increases the surface area of the exterior body 107 exposed to outside air, achieving efficient heat dissipations.

In the case where the lithium-ion storage battery 100 is changed in form by externally applying force, bending stress is externally applied to the exterior body 107 of the lithium-ion storage battery 100. This might partly deform or damage the exterior body 107. The depression or projection formed on the surface of the exterior body 107 can relieve a strain caused by stress applied to the exterior body 107. Therefore, the lithium-ion storage battery 100 can have high reliability. Note that a "strain" is the scale of change in form indicating the displacement of a point of an object relative to the reference (initial) length of the object. The depression or the projection formed on the surface of the exterior body 107 can reduce the influence of a strain caused by application of external force to the lithium-ion storage battery to an acceptable level. Thus, the lithium-ion storage battery having high reliability can be provided.

[7. Separator]

In this embodiment, the separator 109 may be provided between the positive electrode 101 and the negative electrode 102 as shown in FIG. 1A, FIG. 2A, and FIG. 3A, for example.

As the separator 109, paper, nonwoven fabric, a glass fiber, a synthetic fiber such as nylon (polyamide), vinylon (also called vinalon) (a polyvinyl alcohol based fiber), polyester, acrylic, polyolefin, or polyurethane, or the like may be used. The above-described graphene compound may be used as well. However, a material which does not dissolve in an electrolyte solution should be selected.

More specific examples of materials of the separator 109 are high-molecular compounds based on fluorine-based polymer, polyether such as polyethylene oxide and polypropylene oxide, polyolefin such as polyethylene and polypropylene, polyacrylonitrile, polyvinylidene chloride, polymethyl methacrylate, polymethylacrylate, polyvinyl alcohol, polymethacrylonitrile, polyvinyl acetate, polyvinylpyrrolidone, polyethyleneimine, polybutadiene, polystyrene, polyisoprene, and a polyurethane-based polymer, derivatives thereof, cellulose, paper, and nonwoven fabric, which can be used either alone or in combination.

In the case where the graphene oxide film 103 can have a function of a separator, the separator 109 need not be provided additionally, but one embodiment of the present invention is not limited thereto. When the separator 109 is provided additionally, the lithium-ion storage battery of one embodiment of the present invention including the separator 109 can be driven more safely in some cases.

[8. Assembly of Storage Battery and Aging]

The above-described components are combined and sealed in the exterior body 107. Thus, as shown in FIGS. 1A and 1B, FIGS. 2A and 2B, and FIGS. 3A and 3B, the positive electrode 101, the negative electrode 102, and the graphene oxide film 103 are stacked and sealed in the exterior body 107 together with the electrolyte solution 106. FIGS. 6A and 6B show a process of storing the components in the exterior body 107. In the case where the separator 109 (not shown in FIGS. 6A and 6B) is used, the separator 109 is placed between the positive electrode 101 and the negative electrode 102.

Note that a sealing portion may have a shape with a curve, a shape with a wavy line, a shape with an arch, or a shape with a plurality of inflection points along the shape of an inner structure of the storage battery. In the case where the shape of the sealing portion is determined according to the shape of the inner structure, even when the storage battery is deformed and different stresses are applied to the exterior body and the inner structure, an unintentionally large amount of sliding of the inner structure can be prevented. However, the shape of the sealing portion is not limited thereto.

Then, an aging step is performed. First, the environmental temperature is kept at about room temperature for example, and constant current charge is performed to a predetermined voltage at a low rate. Next, a gas generated in a region inside the exterior body by charging is released outside the exterior body, and then charge is performed at a rate higher than that of the initial charge.

After that, the storage battery is preserved at relatively high temperatures for a long time. For example, the storage battery is kept at higher than or equal to 40° C. for longer than or equal to 24 hours. It may be preserved at higher than or equal to 70° C., for example. It may be preserved at higher than or equal to 80° C. It may be preserved at higher than or equal to 90° C. It may be preserved at higher than or equal to 100° C. It may be preserved for longer than or equal to 36 hours. It may be preserved for longer than or equal to 48 hours. It may be preserved for longer than or equal to 72 hours. Keeping the storage battery at an environmental temperature that is high but not so high as to cause danger can sufficiently serve as an aging step and contribute to less degradation of the storage battery in some cases. Also in the case where the preservation time is long but not so long as to cause danger, keeping the storage battery can sufficiently serve as an aging step and contribute to less degradation of the storage battery in some cases.

After the storage battery is preserved at relatively high temperatures for a long time, gases generated in a region inside the exterior body is released again. Furthermore, at room temperature, the storage battery is discharged at a rate of 0.2 C, charged at the same rate, discharged at the same rate again, and further charged at the same rate. Then, discharge is performed at the same rate, which terminates the aging step.

In the aforementioned manner, the lithium-ion storage battery of one embodiment of the present invention can be fabricated.

This embodiment can be implemented in appropriate combination with the other embodiments.

Note that in the case where at least one specific example is described in a diagram or a text described in one embodiment in this specification and the like, it will be readily appreciated by those skilled in the art that a broader concept of the specific example can be derived. Therefore, in the diagram or the text described in one embodiment, in the case where at least one specific example is described, a broader concept of the specific example is disclosed as one embodiment of the invention, and one embodiment of the invention can be constituted. The embodiment of the present invention is clear.

Note that in this specification and the like, what is illustrated in at least a diagram (which may be part of the diagram) is disclosed as one embodiment of the invention, and one embodiment of the invention can be constituted. Therefore, when certain contents are described in a diagram, the contents are disclosed as one embodiment of the invention even when the contents are not described with text, and one embodiment of the invention can be constituted. In a similar manner, part of a diagram, which is taken out from the diagram, is disclosed as one embodiment of the invention, and one embodiment of the invention can be constituted. The embodiment of the present invention is clear.

In Embodiment 1, one embodiment of the present invention has been described. Other embodiments of the present invention are described in Embodiments 2 to 4. Note that one embodiment of the present invention is not limited thereto. In other words, various embodiments of the invention are described in this embodiment and the other embodiments, and one embodiment of the present invention is not limited to a particular embodiment. For example, although an example in which one embodiment of the present invention is applied to a lithium-ion storage battery is described, one embodiment of the present invention is not limited thereto. Depending on circumstances or conditions, application of one embodiment of the present invention to a variety of secondary batteries such as a lead storage battery, a lithium-ion polymer secondary battery, a nickel-hydrogen storage battery, a nickel-cadmium storage battery, a nickel-iron storage battery, a nickel-zinc storage battery, a silver oxide-zinc storage battery, a solid-state battery, and an air battery; a primary battery; a capacitor such as an electric double layer capacitor, an ultracapacitor, a supercapacitor, and a lithium ion capacitor; and the like is also possible. Furthermore, depending on circumstances or conditions, the graphene oxide film 103 is not necessarily used in one embodiment of the present invention.

Embodiment 2

In this embodiment, a flexible lithium-ion storage battery is described.

<<Flexible Storage Battery>>

When a flexible material is selected from materials of the members described in this embodiment and used, a flexible lithium-ion storage battery can be fabricated. Deformable devices are currently under active research and development. For such devices, flexible storage batteries are demanded.

Figure 7A:
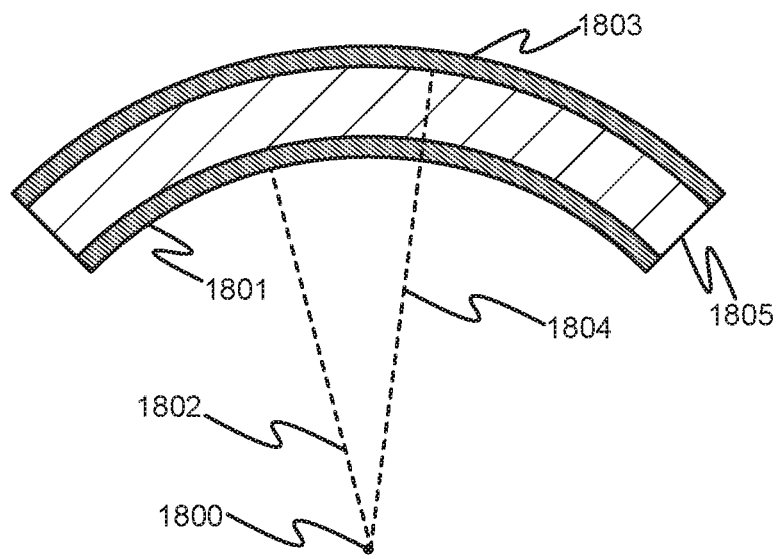
FIGS. 7A to 7D illustrate the radius of curvature.
Figure 7B:
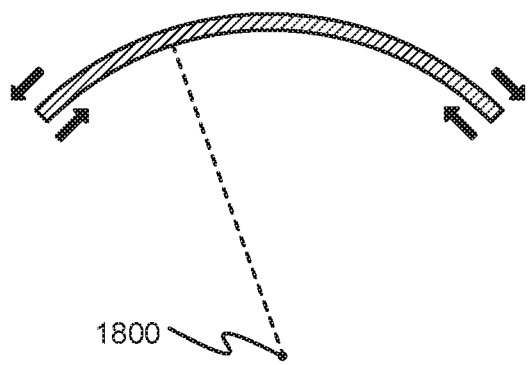

Deformation of a storage battery is described with reference to FIGS. 7A to 7D. In the case of bending a storage battery in which a battery material 1805 including electrodes and an electrolyte solution is sandwiched between two films as exterior bodies, a radius 1802 of curvature of a film 1801 closer to a center 1800 of curvature of the storage battery is smaller than a radius 1804 of curvature of a film 1803 far from the center 1800 of curvature (FIG. 7A). When the storage battery is curved and has an arc-shaped cross section, compressive stress is applied to a surface of the film on the side closer to the center 1800 of curvature and tensile stress is applied to a surface of the film on the side farther from the center 1800 of curvature (FIG. 7B).

When a flexible lithium-ion storage battery is deformed, strong stress is applied to the exterior bodies. However, even with the compressive stress and tensile stress due to the deformation of the storage battery, the influence of a strain can be reduced by forming a pattern including projections or depressions on surfaces of the exterior bodies. For this reason, the storage battery can change its form in such a range that the exterior body on the side closer to the center of curvature has a curvature radius of 50 mm or less, or a curvature radius of 30 mm or less.

Figure 8A:
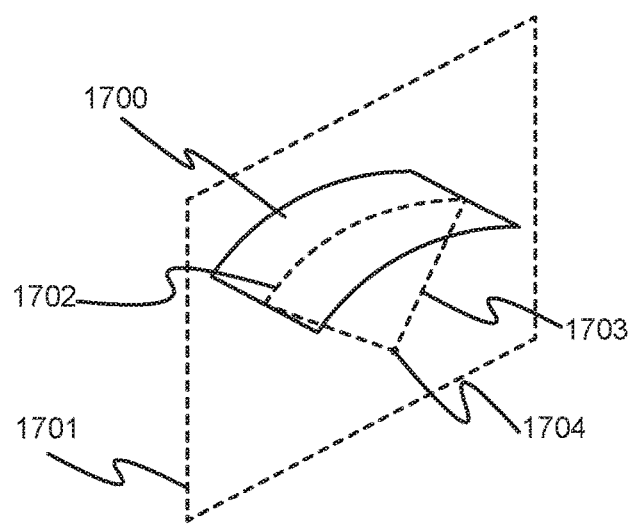
FIGS. 8A to 8C illustrate the radius of curvature.
Figure 8B:
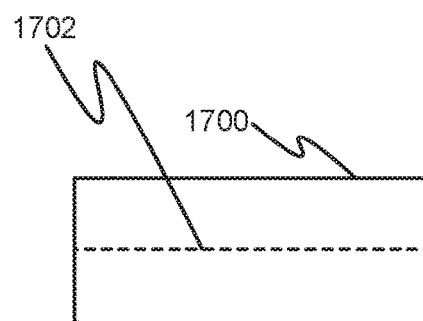
Figure 8C:
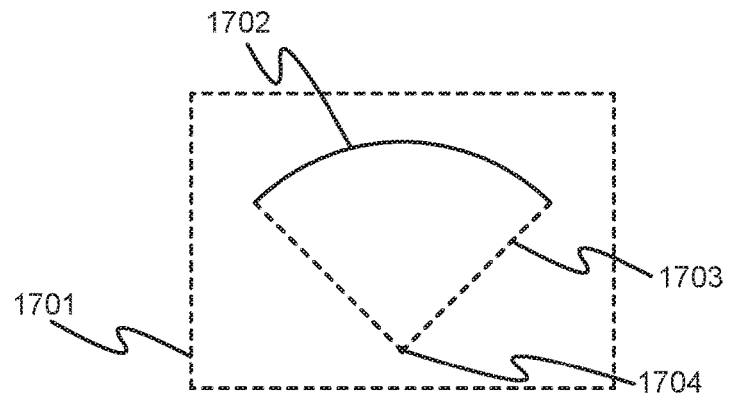

The radius of curvature of a surface is described with reference to drawings. In FIG. 8A, on a plane 1701 along which a curved surface 1700 is cut, part of a curve 1702 forming the curved surface 1700 is approximate to an arc of a circle; the radius of the circle is referred to as a radius of curvature 1703 and the center of the circle is referred to as a center of curvature 1704. FIG. 8B is a top view of the curved surface 1700. FIG. 8C is a cross-sectional view of the curved surface 1700 taken along the plane 1701. When a curved surface is cut by a plane, the radius of curvature of a curve in a cross section differs depending on the angle between the curved surface and the plane or on the cut position, and the smallest radius of curvature is defined as the radius of curvature of a surface in this specification and the like.

Figure 7C:
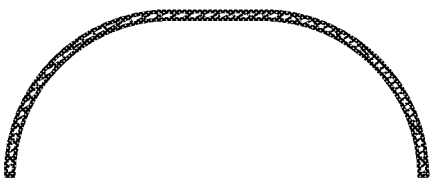
Figure 7D:
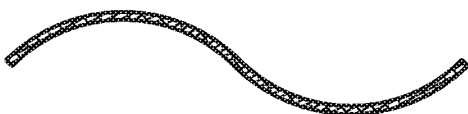

Note that the cross-sectional shape of the storage battery is not limited to a simple arc shape, and the cross section can be partly arc-shaped; for example, a shape illustrated in FIG. 7C, a wavy shape illustrated in FIG. 7D, or an S shape can be used.

When the curved surface of the storage battery has a shape with a plurality of centers of curvature, the storage battery can change its form in such a range that a curved surface with the smallest radius of curvature among radii of curvature with respect to the plurality of centers of curvature, which is a surface of the exterior body on the side closer to the center of curvature, can have a curvature radius of 50 mm, or a curvature radius of 30 mm in some cases.

This embodiment can be implemented in appropriate combination with the other embodiments.

Embodiment 3

In this embodiment, structures of a storage battery of one embodiment of the present invention are described with reference to FIGS. 9A to 9C, FIGS. 10A and 10B, and FIGS. 11A and 11B.

<<Coin-Type Storage Battery>>

Figure 9A:
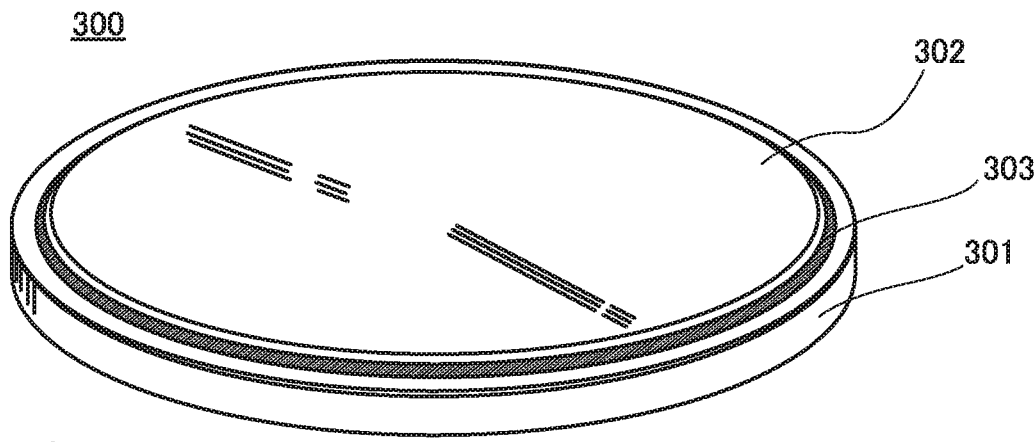
FIGS. 9A to 9C illustrate a coin-type storage battery.
Figure 9B:
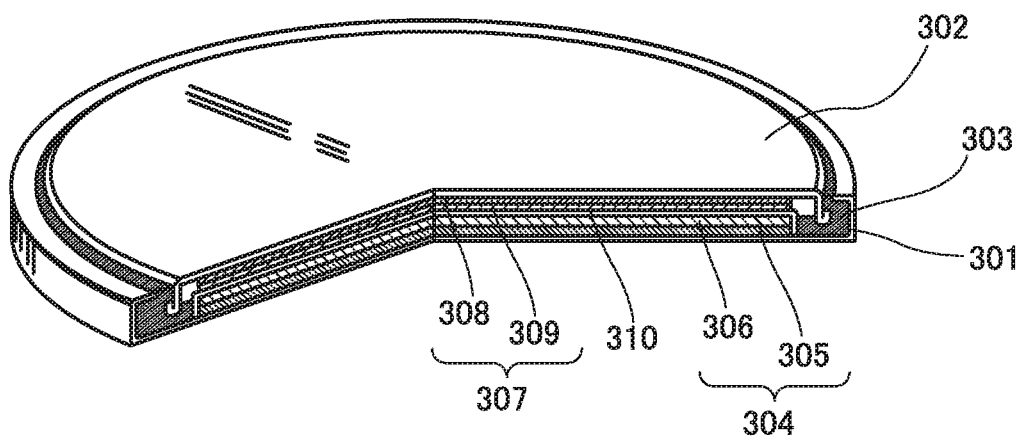

FIG. 9A is an external view of a coin-type (single-layer flat type) storage battery, and FIG. 9B is a cross-sectional view thereof.

In a coin-type storage battery 300, a positive electrode can 301 doubling as a positive electrode terminal and a negative electrode can 302 doubling as a negative electrode terminal are insulated from each other and sealed by a gasket 303 made of polypropylene or the like. A positive electrode 304 includes a positive electrode current collector 305 and a positive electrode active material layer 306 provided in contact with the positive electrode current collector 305. The positive electrode active material layer 306 may further include a binder for increasing adhesion of positive electrode active materials, a conductive additive for increasing the conductivity of the positive electrode active material layer, and the like in addition to the positive electrode active materials.

A negative electrode 307 includes a negative electrode current collector 308 and a negative electrode active material layer 309 provided in contact with the negative electrode current collector 308. The negative electrode active material layer 309 may further include a binder for increasing adhesion of negative electrode active materials, a conductive additive for increasing the conductivity of the negative electrode active material layer, and the like in addition to the negative electrode active materials. A separator 310 and an electrolyte (not illustrated) are provided between the positive electrode active material layer 306 and the negative electrode active material layer 309. At least one of the positive electrode 304 and the negative electrode 307 is wrapped in a graphene oxide film (not illustrated).

The materials described in Embodiment 1 can be used for the components.

For the positive electrode can 301 and the negative electrode can 302, a metal having a corrosion-resistant property to an electrolyte solution, such as nickel or titanium, an alloy of such a metal, or an alloy of such a metal and another metal (e.g., stainless steel or the like) can be used. Alternatively, the positive electrode can 301 and the negative electrode can 302 are preferably covered with nickel or the like in order to inhibit corrosion due to the electrolyte solution. The positive electrode can 301 and the negative electrode can 302 are electrically connected to the positive electrode 304 and the negative electrode 307, respectively.

The negative electrode 307, the positive electrode 304, and the separator 310 are immersed in the electrolyte. Then, as illustrated in FIG. 9B, the positive electrode 304, the separator 310, the negative electrode 307, and the negative electrode can 302 are stacked in this order with the positive electrode can 301 positioned at the bottom, and the positive electrode can 301 and the negative electrode can 302 are subjected to pressure bonding with the gasket 303 interposed therebetween. In such a manner, the coin-type storage battery 300 can be fabricated.

Here, a current flow in charging a storage battery will be described with reference to FIG. 9C. When a storage battery using lithium is regarded as a closed circuit, lithium ions transfer and a current flows in the same direction. Note that in the storage battery using lithium, an anode and a cathode change places in charge and discharge, and an oxidation reaction and a reduction reaction occur on the corresponding sides; hence, an electrode with a high redox potential is called a positive electrode and an electrode with a low redox potential is called a negative electrode. For this reason, in this specification, the positive electrode is referred to as a "positive electrode" or a "plus electrode" and the negative electrode is referred to as a "negative electrode" or a "minus electrode" in all the cases where charge is performed, discharge is performed, a reverse pulse current is supplied, and a charging current is supplied. The use of the terms "anode" and "cathode" related to an oxidation reaction and a reduction reaction might cause confusion because the anode and the cathode change places at the time of charging and discharging. Thus, the terms "anode" and "cathode" are not used in this specification. If the term "anode" or "cathode" is used, it should be mentioned that the anode or the cathode is which of the one at the time of charging or the one at the time of discharging and corresponds to which of a positive electrode or a negative electrode.

Figure 9C:
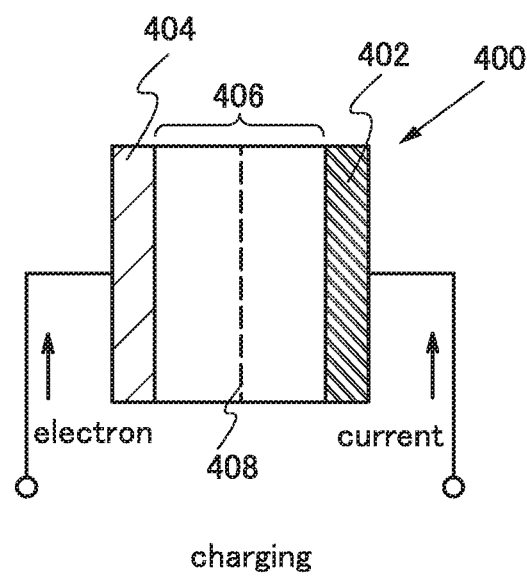

Two terminals shown in FIG. 9C are connected to a charger, and a storage battery 400 is charged. As the charge of the storage battery 400 proceeds, a potential difference between electrodes increases. The positive direction in FIG. 9C is the direction in which a current flows from one terminal (a tab electrode) outside the storage battery 400 to a positive electrode 402, flows from the positive electrode 402 to a negative electrode 404 through an electrolyte solution 406 in the storage battery 400 and a separator 408 in the electrolyte solution 406, and flows from the negative electrode to the other terminal (a tab electrode) outside the storage battery 400. In other words, a direction in which a charging current flows is regarded as a direction of a current.

<<Cylindrical Storage Battery>>

Figure 10A:
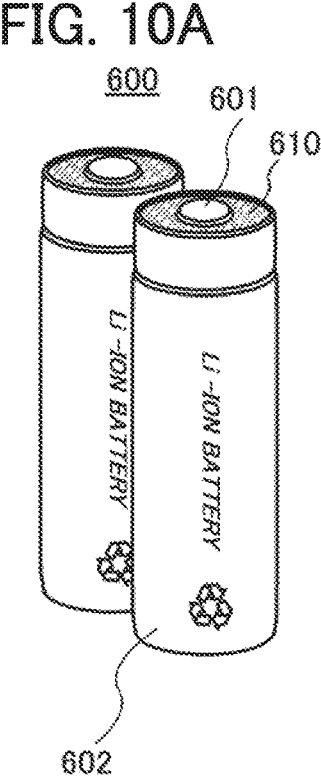
FIGS. 10A and 10B illustrate a cylindrical storage battery.

Next, an example of a cylindrical storage battery will be described with reference to FIGS. 10A and 10B. As illustrated in FIG. 10A, a cylindrical storage battery 600 includes a positive electrode cap (battery cap) 601 on the top surface and a battery can (outer can) 602 on the side surface and bottom surface. The positive electrode cap and the battery can 602 are insulated from each other by a gasket (insulating gasket) 610.

Figure 10B:
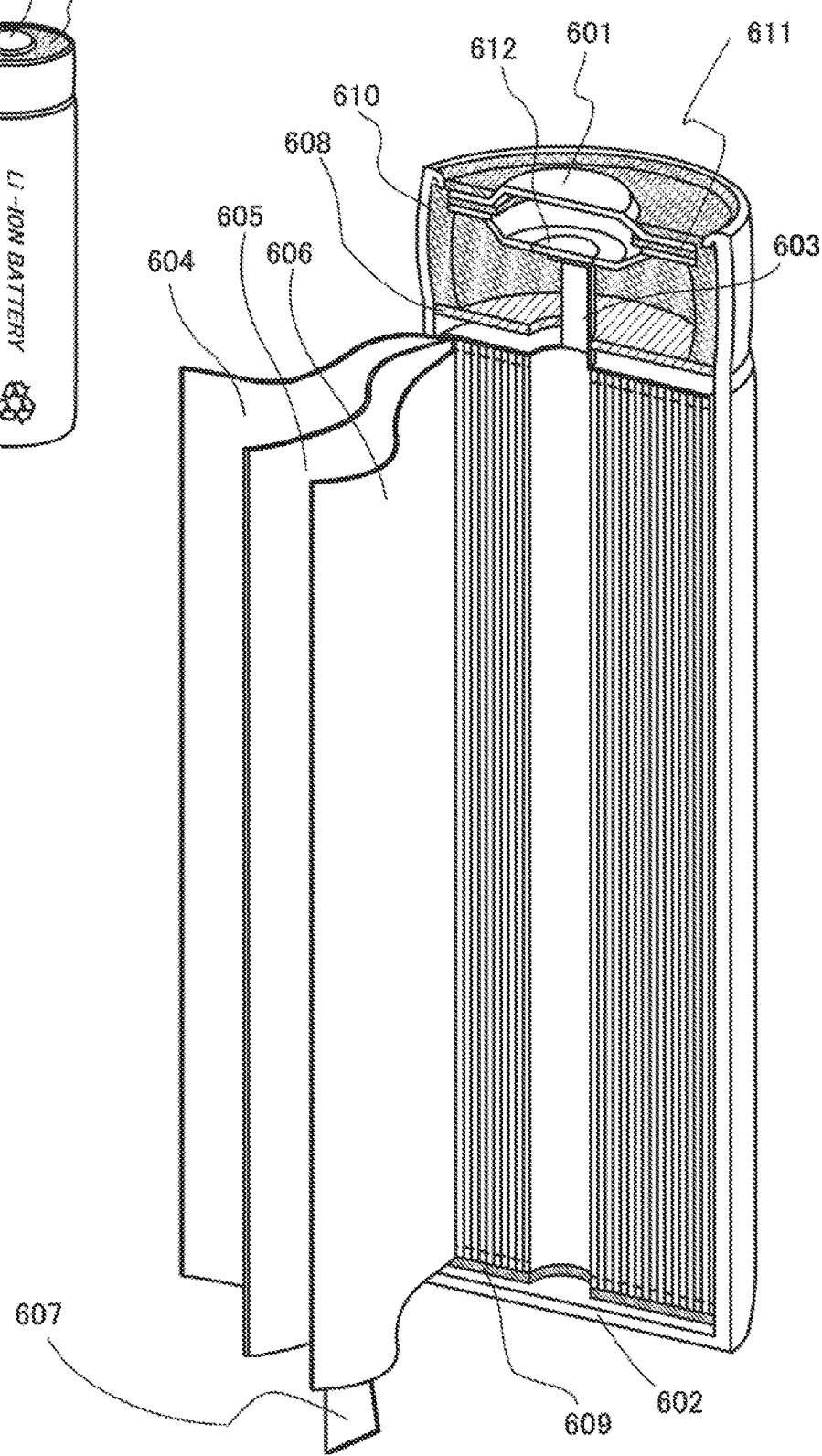

FIG. 10B is a diagram schematically illustrating a cross section of the cylindrical storage battery. Inside the battery can 602 having a hollow cylindrical shape, a battery element in which a strip-like positive electrode 604 and a strip-like negative electrode 606 are wound with a stripe-like separator 605 interposed therebetween is provided. Although not illustrated, the battery element is wound around a center pin. One end of the battery can 602 is close and the other end thereof is open. For the battery can 602, a metal having a corrosion-resistant property to an electrolyte solution, such as nickel or titanium, an alloy of such a metal, or an alloy of such a metal and another metal (e.g., stainless steel or the like) can be used. Alternatively, the battery can 602 is preferably covered with nickel or the like in order to inhibit corrosion due to the electrolyte solution. Inside the battery can 602, the battery element in which the positive electrode, the negative electrode, and the separator are wound is provided between a pair of insulating plates 608 and 609 which face each other. Furthermore, a nonaqueous electrolyte solution (not illustrated) is injected inside the battery can 602 provided with the battery element. As the nonaqueous electrolyte solution, a nonaqueous electrolyte solution that is similar to that of the coin-type storage battery can be used.

Although the positive electrode 604 and the negative electrode 606 can be formed in a manner similar to that of the positive electrode and the negative electrode of the coin-type storage battery described above, the difference lies in that, since the positive electrode and the negative electrode of the cylindrical storage battery are wound, active materials are formed on both sides of the current collectors. At least one of the positive electrode 604 and the negative electrode 606 is wrapped in a graphene oxide film (not illustrated). In the storage battery including wound inner structures, the graphene oxide film can reduce friction generated between the structures and relieve stress generated therebetween. A positive electrode terminal (positive electrode tab electrode) 603 is connected to the positive electrode 604, and a negative electrode terminal (negative electrode tab) 607 is connected to the negative electrode 606. Both the positive electrode terminal 603 and the negative electrode terminal 607 can be formed using a metal material such as aluminum. The positive electrode terminal 603 and the negative electrode terminal 607 are resistance-welded to a safety valve mechanism 612 and the bottom of the battery can 602, respectively. The safety valve mechanism 612 is electrically connected to the positive electrode cap 601 through a positive temperature coefficient (PTC) element 611. The safety valve mechanism 612 cuts off electrical connection between the positive electrode cap 601 and the positive electrode 604 when the internal pressure of the battery exceeds a predetermined threshold value. The PTC element 611, which serves as a thermally sensitive resistor whose resistance increases as the temperature rises, limits the amount of current by increasing the resistance, in order to inhibit abnormal heat generation. Note that barium titanate ($BaTiO_3$)-based semiconductor ceramic can be used for the PTC element.

<<Laminated Storage Battery>>

Next, an example of a laminated storage battery will be described with reference to FIG. 11A. When a flexible laminated storage battery is used in an electronic device at least part of which is flexible, the storage battery can be bent as the electronic device is bent.

Figure 11A:
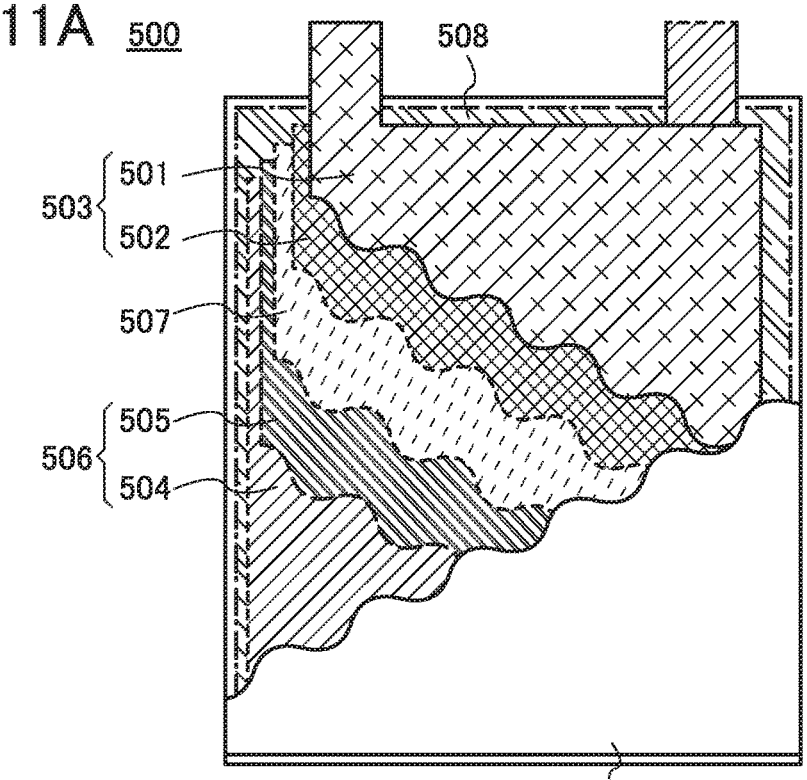
FIGS. 11A and 11B illustrate a laminated storage battery.

A laminated storage battery 500 illustrated in FIG. 11A includes a positive electrode 503 including a positive electrode current collector 501 and a positive electrode active material layer 502, a negative electrode 506 including a negative electrode current collector 504 and a negative electrode active material layer 505, a separator 507, an electrolyte solution 508, and an exterior body 509. The separator 507 is provided between the positive electrode 503 and the negative electrode 506 in the exterior body 509. The electrolyte solution 508 is included in the exterior body 509. The electrolyte solution described in Embodiment 1 can be used for the electrolyte solution 508. At least one of the positive electrode 503 and the negative electrode 506 is wrapped in a graphene oxide film (not illustrated in FIGS. 11A and 11B).

In the laminated storage battery 500 illustrated in FIG. 11A, the positive electrode current collector 501 and the negative electrode current collector 504 also serve as terminals for an electrical contact with an external portion. For this reason, each of the positive electrode current collector 501 and the negative electrode current collector 504 may be arranged so that part of the positive electrode current collector 501 and part of the negative electrode current collector 504 are exposed to the outside of the exterior body 509. Alternatively, a tab electrode and the positive electrode current collector 501 or the negative electrode current collector 504 may be bonded to each other by ultrasonic welding, and instead of the positive electrode current collector 501 and the negative electrode current collector 504, the tab electrode may be exposed to the outside of the exterior body 509.

As the exterior body 509 in the laminated storage battery 500, for example, a laminate film having a three-layer structure in which a highly flexible metal thin film of aluminum, stainless steel, copper, nickel, or the like is provided over a film formed of a material such as polyethylene, polypropylene, polycarbonate, ionomer, or polyamide, and an insulating synthetic resin film of a polyamide-based resin, a polyester-based resin, or the like is provided as the outer surface of the exterior body over the metal thin film can be used.

Figure 11B:
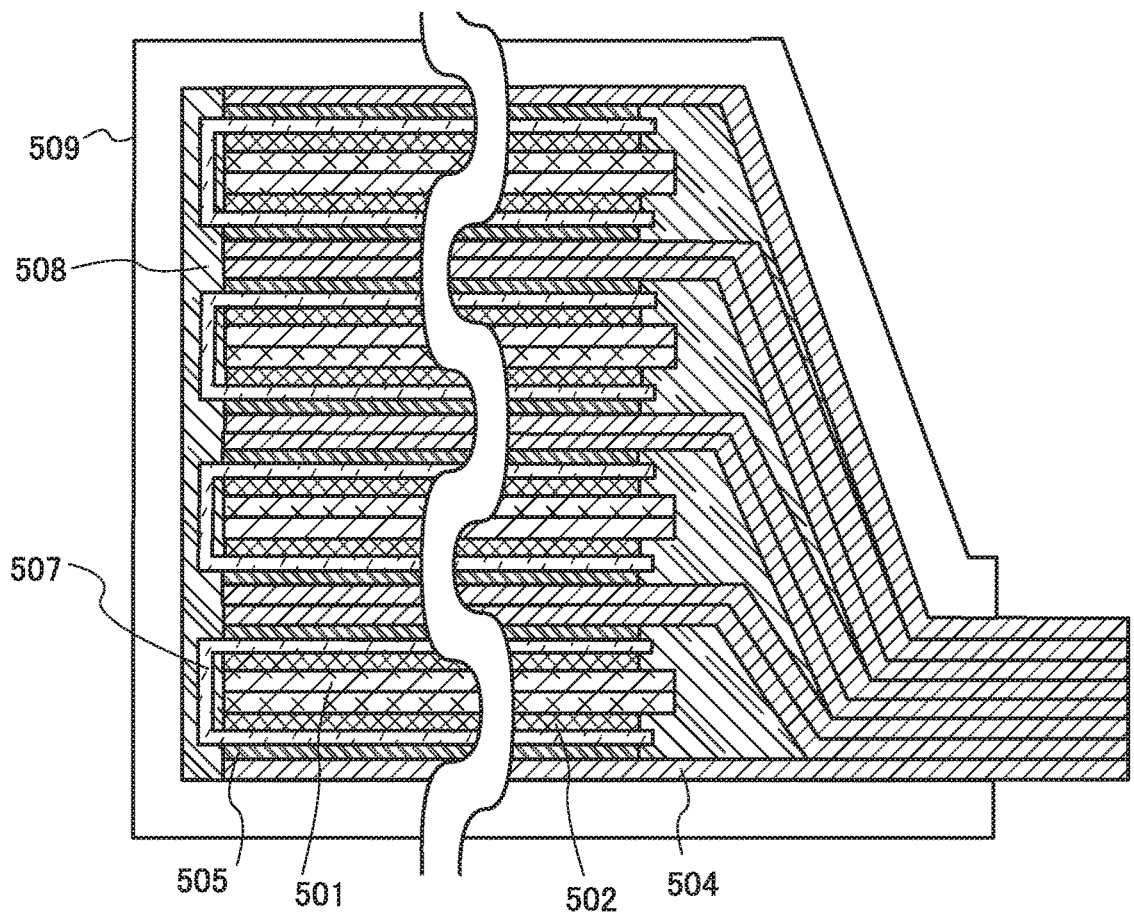

FIG. 11B illustrates an example of a cross-sectional structure of the laminated storage battery 500. FIG. 11A illustrates an example of including two electrodes for simplicity, and the actual battery includes a plurality of electrodes.

The example in FIG. 11B includes 16 electrodes. The laminated storage battery 500 has flexibility even though including 16 electrodes. In FIG. 11B, 8 negative electrodes 506 and 8 positive electrodes 503 are included. Note that FIG. 11B illustrates a cross section of the lead portion of the negative electrode, and 8 negative electrode current collectors 504 are bonded to each other by ultrasonic welding.

It is needless to say that the number of electrodes is not limited to 16, and may be more than 16 or less than 16. In the case of using a large number of electrodes, the storage battery can have high capacity. In contrast, in the case of using a small number of electrodes, the storage battery can have a small thickness and high flexibility.

Figure 12:
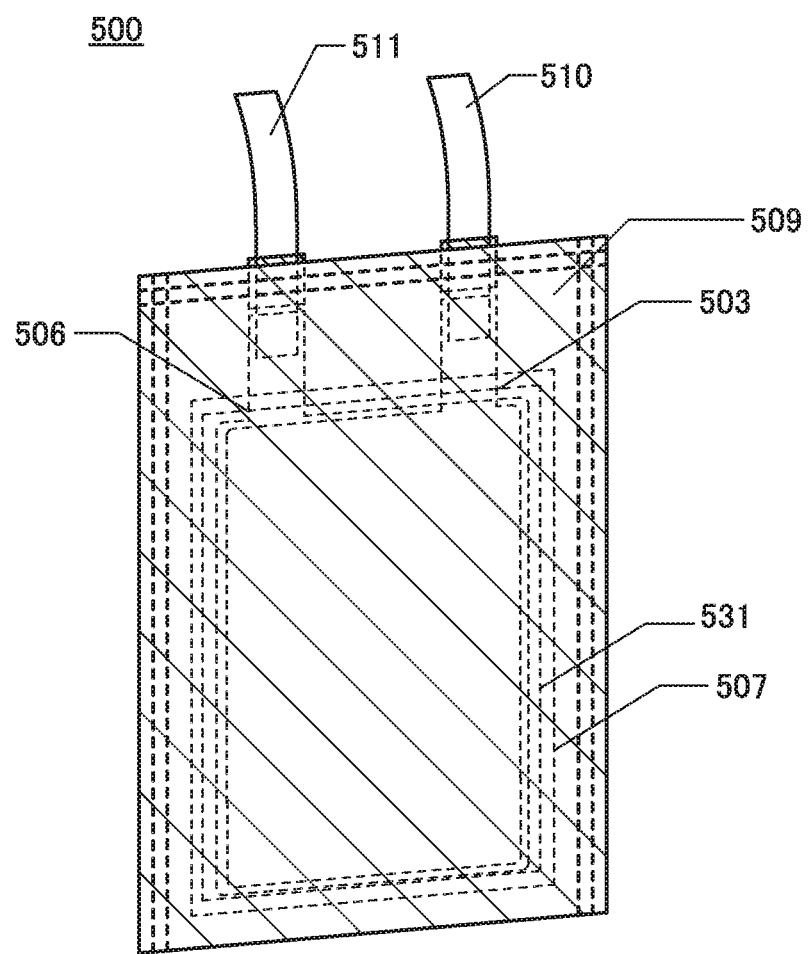
FIG. 12 is an external view of a storage battery.
Figure 13:
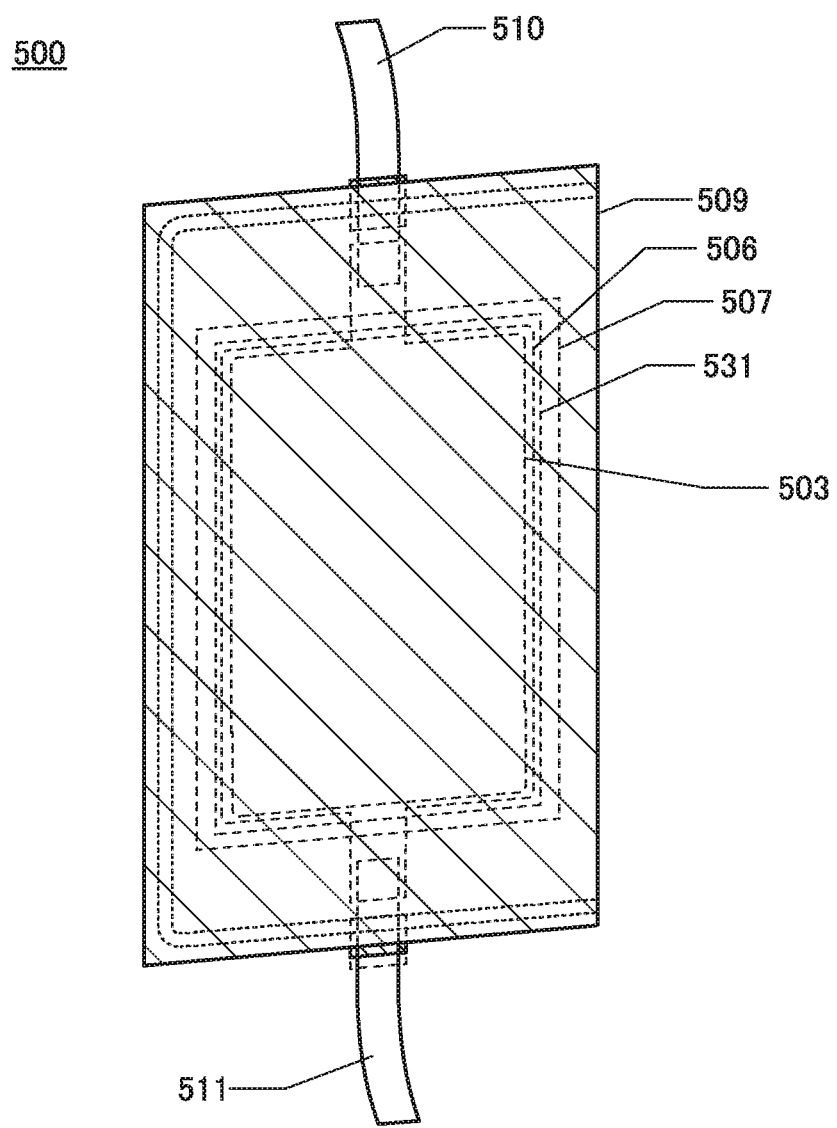
FIG. 13 is an external view of a storage battery.

FIG. 12 and FIG. 13 each illustrate an example of the external view of the laminated storage battery 500. In FIG. 12 and FIG. 13, the positive electrode 503, the negative electrode 506, the separator 507, the exterior body 509, a graphene oxide film 531, a positive electrode tab electrode 510, and a negative electrode tab electrode 511 are included. Note that although a plurality of negative electrodes 506 and a plurality of positive electrodes 503 are included in the laminated storage battery, one negative electrode 506 and one positive electrode 503 are shown in FIG. 12 and FIG. 13 for avoiding complexity.

Figure 14A:
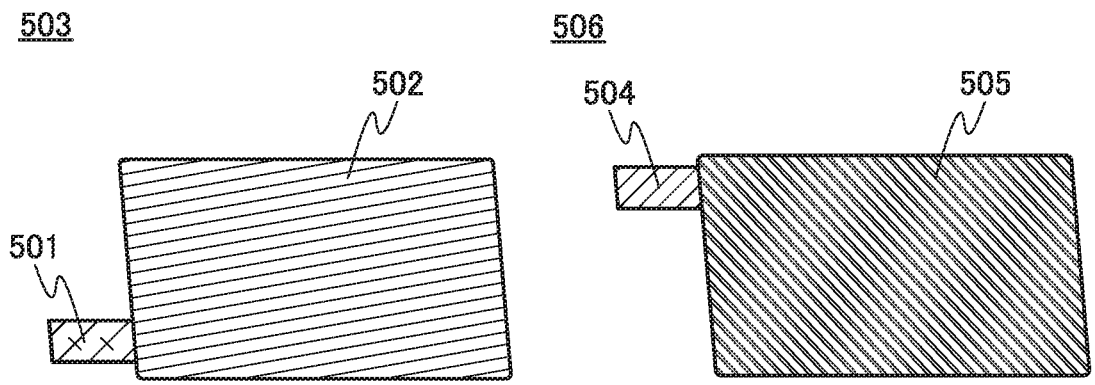
FIGS. 14A to 14C illustrate a method for fabricating a storage battery.

FIG. 14A illustrates the external views of the positive electrode 503 and the negative electrode 506. The positive electrode 503 includes the positive electrode current collector 501, and the positive electrode active material layer 502 is formed on a surface of the positive electrode current collector 501. The positive electrode 503 also includes an exposed region of the positive electrode current collector 501. The region is a region connected to the tab electrode or a region functioning as the tab electrode and is referred to as a tab region. The negative electrode 506 includes the negative electrode current collector 504, and the negative electrode active material layer 505 is formed on a surface of the negative electrode current collector 504. The negative electrode 506 also includes an exposed region of the negative electrode current collector 504, that is, a tab region. The areas and the shapes of the tab regions included in the positive electrode and the negative electrode are not limited to those illustrated in FIG. 14A. At least one of the negative electrode 506 and the positive electrode 503 is wrapped in a graphene oxide film.

<<Method for Fabricating Laminated Storage Battery>>

Figure 14B:
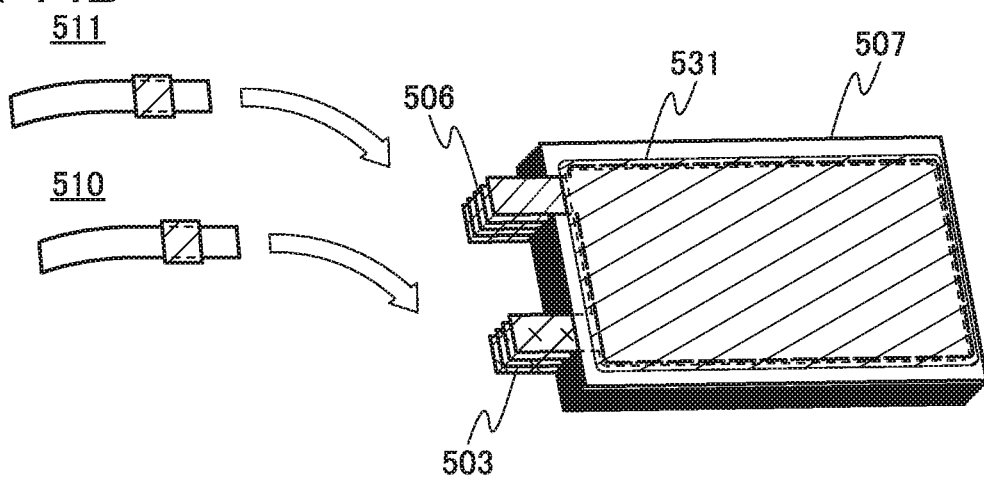

Here, an example of a method for fabricating the laminated storage battery whose external view is illustrated in FIG. 12 will be described with reference to FIGS. 14B and 14C.

First, the negative electrode 506, the separator 507, and the positive electrode 503 are stacked. FIG. 14B illustrates a stack including the negative electrode 506, the separator 507, and the positive electrode 503. The battery described here as an example includes 5 negative electrodes and 4 positive electrodes. Next, the tab regions of the positive electrodes 503 are bonded to each other, and the tab region of the positive electrode of the outermost surface and the positive electrode tab electrode 510 are bonded to each other. The bonding can be performed by ultrasonic welding, for example. In a similar manner, the tab regions of the negative electrodes 506 are bonded to each other, and the tab region of the negative electrode of the outermost surface and the negative electrode tab electrode 511 are bonded to each other. In this example, the negative electrode 506 is wrapped in the graphene oxide film 531.

After that, the negative electrode 506, the separator 507, and the positive electrode 503 are placed over the exterior body 509.

Figure 14C:
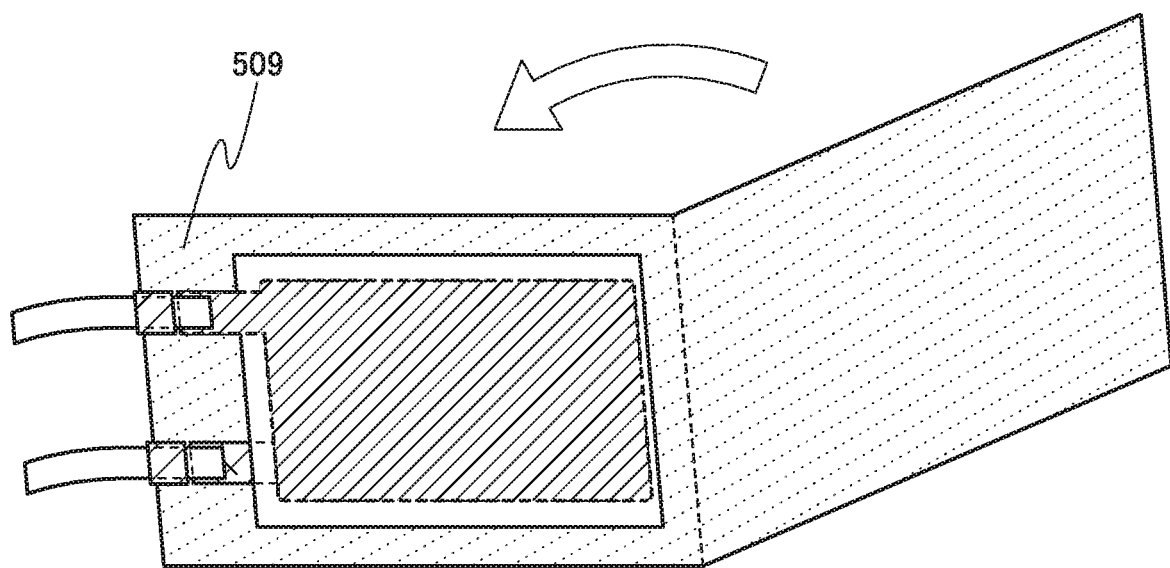

Subsequently, the exterior body 509 is folded along a dashed line as illustrated in FIG. 14C. Then, the outer edge of the exterior body 509 is bonded. The bonding can be performed by thermocompression, for example. At this time, a part (or one side) of the exterior body 509 is left unbonded (to provide an inlet) so that the electrolyte solution 508 can be introduced later.

Next, the electrolyte solution 508 is introduced into the exterior body 509 from the inlet of the exterior body 509. The electrolyte solution 508 is preferably introduced in a reduced pressure atmosphere or in an inert gas atmosphere. Lastly, the inlet is bonded. In the above manner, the laminated storage battery 500 can be fabricated.

Note that, in this embodiment, the coin-type storage battery, the laminated storage battery, and the cylindrical storage battery are given as examples of the storage battery; however, any of storage batteries with a variety of shapes, such as a sealed storage battery and a square-type storage battery, can be used. Furthermore, a structure in which a plurality of positive electrodes, a plurality of negative electrodes, and a plurality of separators are stacked or wound may be employed.

FIGS. 15A to 15E illustrate examples of electronic devices including laminated storage batteries. Examples of electronic devices each including a flexible storage battery include television devices (also referred to as televisions or television receivers), monitors of computers or the like, cameras such as digital cameras and digital video cameras, digital photo frames, mobile phones (also referred to as cellular phones or mobile phone devices), portable game machines, portable information terminals, audio reproducing devices, and large game machines such as pachinko machines.

In addition, a flexible storage battery can be incorporated along a curved inside/outside wall surface of a house or a building or a curved interior/exterior surface of an automobile.

FIG. 15A illustrates an example of a mobile phone. A mobile phone 7400 is provided with a display portion 7402 incorporated in a housing 7401, an operation button 7403, an external connection port 7404, a speaker 7405, a microphone 7406, and the like. Note that the mobile phone 7400 includes a storage battery 7407.

FIG. 15B illustrates the mobile phone 7400 that is bent. When the whole mobile phone 7400 is bent by the external force, the storage battery 7407 included in the mobile phone 7400 is also bent. FIG. 15C illustrates the bent storage battery 7407. The storage battery 7407 is a laminated storage battery.

FIG. 15D illustrates an example of a bangle display device. A portable display device 7100 includes a housing 7101, a display portion 7102, an operation button 7103, and a storage battery 7104. FIG. 15E illustrates the bent storage battery 7104.

<<Structural Examples of Storage Battery>>

Structural examples of a storage battery will be described with reference to FIGS. 16A and 16B, FIGS. 17A1, 17A2, 17B1, and 17B2, FIGS. 18A and 18B, FIGS. 19A and 19B, and FIG. 20. Note that in each of FIGS. 16A and 16B, FIGS. 17A1, 17A2, 17B1, and 17B2, FIGS. 18A and 18B, FIGS. 19A and 19B, and FIG. 20, a positive electrode or a negative electrode of the storage battery is wrapped in a graphene oxide film, though the graphene oxide film is not illustrated.

Figure 16A:
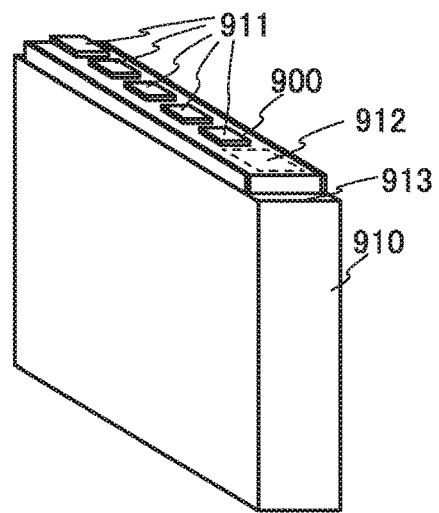
FIGS. 16A and 16B illustrate an example of a storage battery.
Figure 16B:
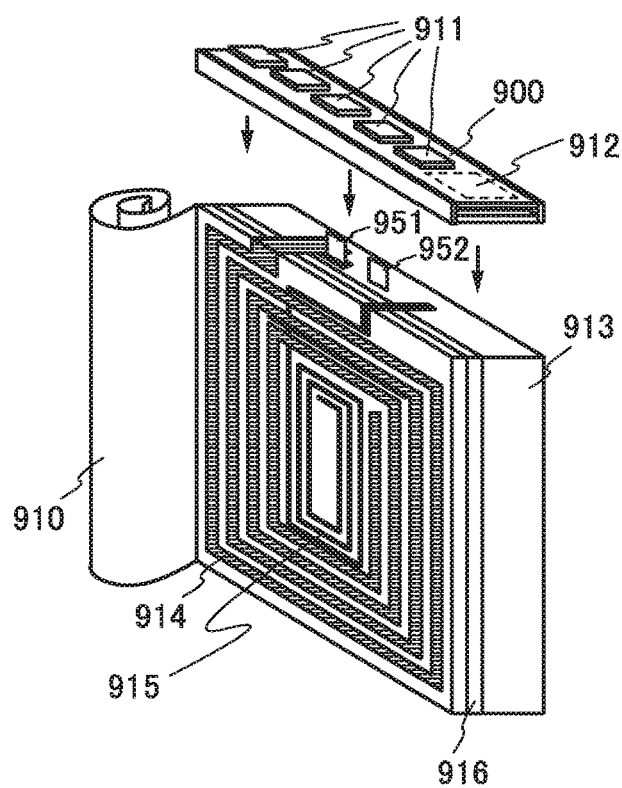

FIGS. 16A and 16B are external views of a storage battery. The storage battery includes a circuit board 900 and a storage battery 913. A label 910 is attached to the storage battery 913. As shown in FIG. 16B, the storage battery further includes a terminal 951, a terminal 952, an antenna 914, and an antenna 915.

The circuit board 900 includes terminals 911 and a circuit 912. The terminals 911 are connected to the terminals 951 and 952, the antennas 914 and 915, and the circuit 912. Note that a plurality of terminals 911 serving as a control signal input terminal, a power supply terminal, and the like may be provided.

The circuit 912 may be provided on the rear surface of the circuit board 900. The shape of each of the antennas 914 and 915 is not limited to a coil shape and may be a linear shape or a plate shape. Furthermore, a planar antenna, an aperture antenna, a traveling-wave antenna, an EH antenna, a magnetic-field antenna, a dielectric antenna, or the like may be used. Alternatively, the antenna 914 or the antenna 915 may be a flat-plate conductor. The flat-plate conductor can serve as one of conductors for electric field coupling. That is, the antenna 914 or the antenna 915 can serve as one of two conductors of a capacitor. Thus, electric power can be transmitted and received not only by an electromagnetic field or a magnetic field but also by an electric field.

The line width of the antenna 914 is preferably larger than that of the antenna 915. This makes it possible to increase the amount of electric power received by the antenna 914.

The storage battery includes a layer 916 between the storage battery 913 and the antennas 914 and 915. The layer 916 may have a function of inhibiting an adverse effect on an electromagnetic field by the storage battery 913. As the layer 916, for example, a magnetic body can be used.

Note that the structure of the storage battery is not limited to that shown in FIGS. 16A and 16B.

For example, as shown in FIGS. 17A1 and 17A2, two opposite surfaces of the storage battery 913 in FIGS. 16A and 16B may be provided with respective antennas.

FIG. 17A1 is an external view showing one side of the opposite surfaces, and FIG. 17A2 is an external view showing the other side of the opposite surfaces. For portions similar to those in FIGS. 16A and 16B, a description of the storage battery illustrated in FIGS. 16A and 16B can be referred to as appropriate.

As illustrated in FIG. 17A1, the antenna 914 is provided on one of the opposite surfaces of the storage battery 913 with the layer 916 interposed therebetween, and as illustrated in FIG. 17A2, the antenna 915 is provided on the other of the opposite surfaces of the storage battery 913 with a layer 917 interposed therebetween. The layer 917 may have a function of inhibiting an adverse effect on an electromagnetic field by the storage battery 913, for example. As the layer 917, for example, a magnetic body can be used.

With the above structure, both of the antennas 914 and 915 can be increased in size.

Alternatively, as illustrated in FIGS. 17B1 and 17B2, two opposite surfaces of the storage battery 913 in FIGS. 16A and 16B may be provided with different types of antennas. FIG. 17B1 is an external view showing one side of the opposite surfaces, and FIG. 17B2 is an external view showing the other side of the opposite surfaces. For portions similar to those in FIGS. 16A and 16B, a description of the storage battery illustrated in FIGS. 16A and 16B can be referred to as appropriate.

As illustrated in FIG. 17B1, the antennas 914 and 915 are provided on one of the opposite surfaces of the storage battery 913 with the layer 916 interposed therebetween, and as illustrated in FIG. 17B2, an antenna 918 is provided on the other of the opposite surfaces of the storage battery 913 with the layer 917 interposed therebetween. The antenna 918 has a function of communicating data with an external device, for example. An antenna with a shape that can be applied to the antennas 914 and 915, for example, can be used as the antenna 918. As a system for communication using the antenna 918 between the storage battery and another device, a response method that can be used between the storage battery and another device, such as NFC, can be employed.

Figure 18A:
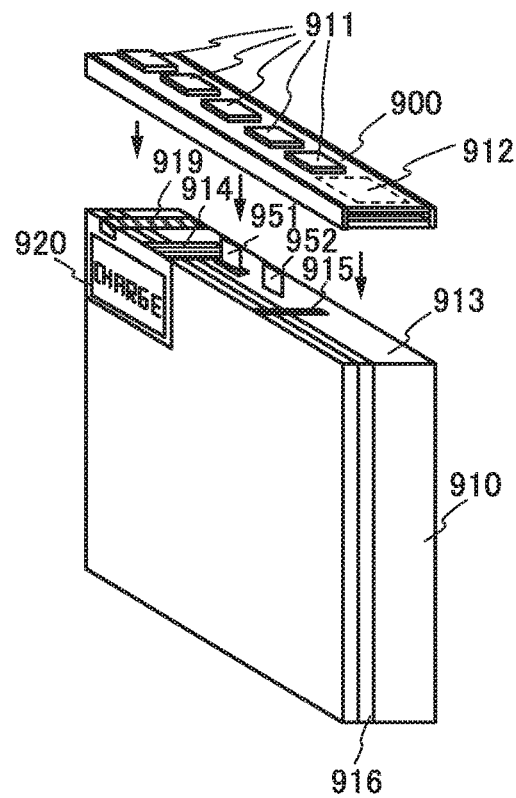
FIGS. 18A and 18B each illustrate an example of a storage battery.

Alternatively, as illustrated in FIG. 18A, the storage battery 913 in FIGS. 16A and 16B may be provided with a display device 920. The display device 920 is electrically connected to the terminal 911 via a terminal 919. It is possible that the label 910 is not provided in a portion where the display device 920 is provided. For portions similar to those in FIGS. 16A and 16B, a description of the storage battery illustrated in FIGS. 16A and 16B can be referred to as appropriate.

The display device 920 can display, for example, an image showing whether charge is being carried out, an image showing the amount of stored power, or the like. As the display device 920, electronic paper, a liquid crystal display device, an electroluminescent (EL) display device, or the like can be used. For example, the use of electronic paper can reduce power consumption of the display device 920.

Figure 18B:
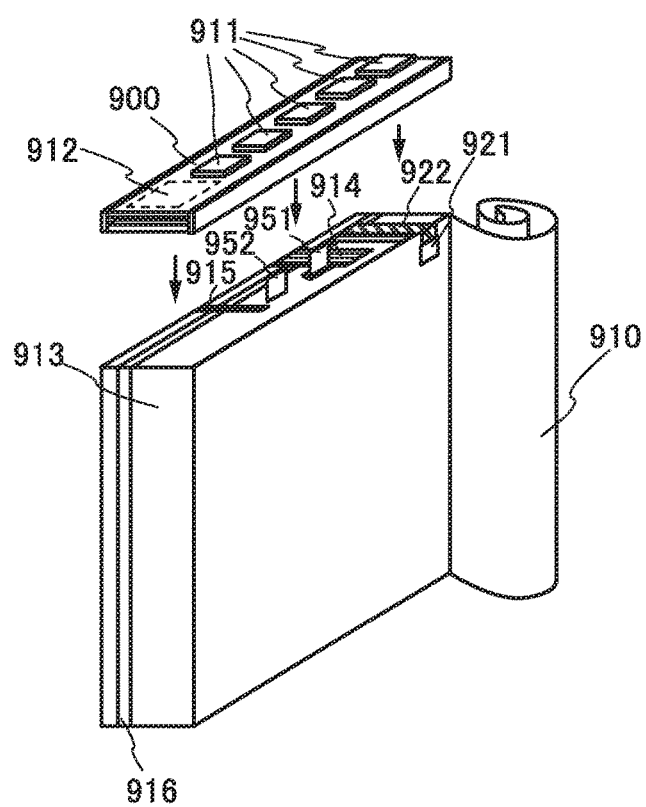

Alternatively, as illustrated in FIG. 18B, the storage battery 913 illustrated in FIGS. 16A and 16B may be provided with a sensor 921. The sensor 921 is electrically connected to the terminal 911 via a terminal 922. For portions similar to those in FIGS. 16A and 16B, a description of the storage battery illustrated in FIGS. 16A and 16B can be referred to as appropriate.

The sensor 921 has a function of measuring, for example, displacement, position, speed, acceleration, angular velocity, rotational frequency, distance, light, liquid, magnetism, temperature, chemical substance, sound, time, hardness, electric field, electric current, voltage, electric power, radiation, flow rate, humidity, gradient, oscillation, odor, or infrared rays. With the sensor 921, for example, data on an environment (e.g., temperature) where the storage battery is placed can be determined and stored in a memory inside the circuit 912.

Furthermore, structural examples of the storage battery 913 will be described with reference to FIGS. 19A and 19B and FIG. 20.

Figure 19A:
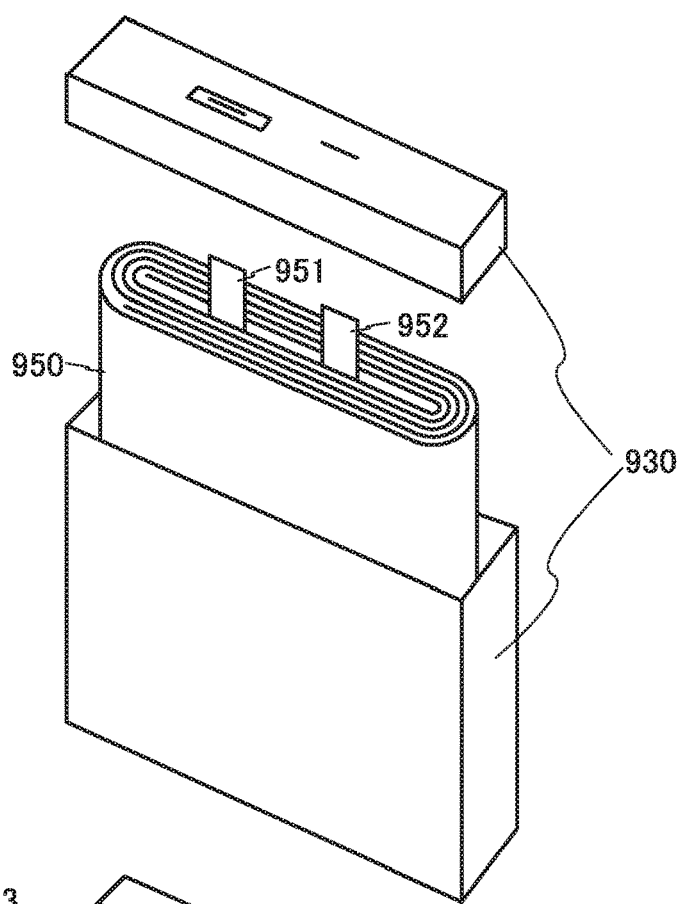
FIGS. 19A and 19B each illustrate an example of a storage battery.

The storage battery 913 illustrated in FIG. 19A includes a wound body 950 provided with the terminals 951 and 952 inside a housing 930. The wound body 950 is soaked in an electrolyte solution inside the housing 930. The terminal 952 is in contact with the housing 930. An insulator or the like inhibits contact between the terminal 951 and the housing 930. Note that in FIG. 19A, the housing 930 divided into two pieces is illustrated for convenience; however, in the actual structure, the wound body 950 is covered with the housing 930 and the terminals 951 and 952 extend to the outside of the housing 930. For the housing 930, a metal material or a resin material can be used.

Figure 19B:
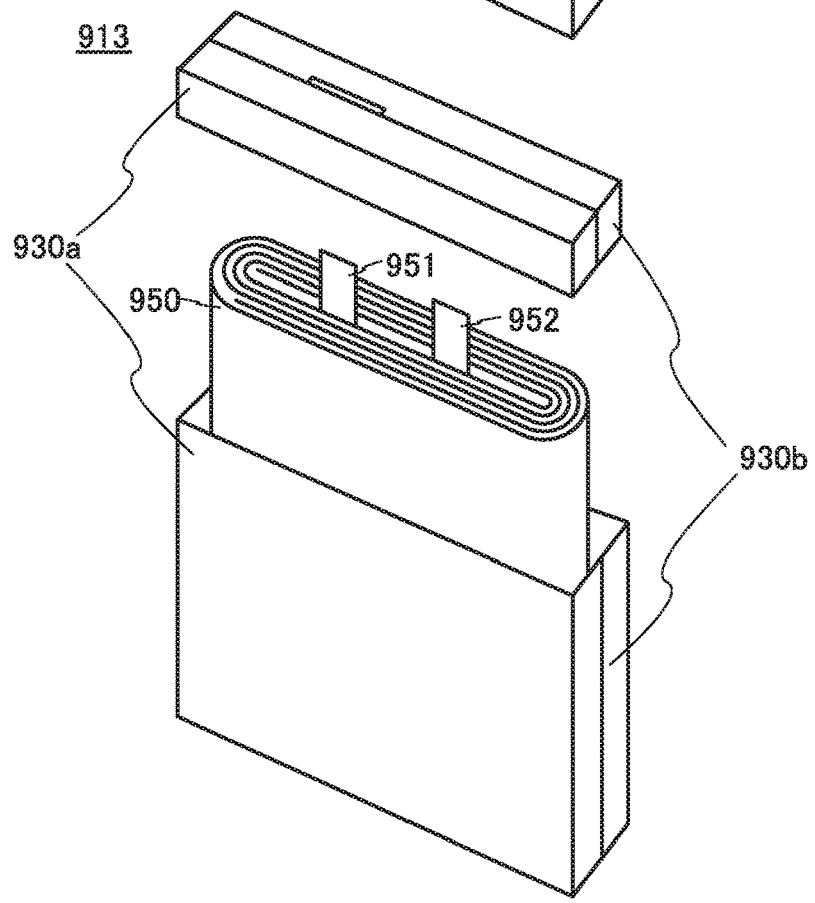

Note that as illustrated in FIG. 19B, the housing 930 in FIG. 19A may be formed using a plurality of materials. For example, in the storage battery 913 in FIG. 19B, a housing 930a and a housing 930b are bonded to each other and the wound body 950 is provided in a region surrounded by the housing 930a and the housing 930b.

For the housing 930a, an insulating material such as an organic resin can be used. In particular, when a material such as an organic resin is used for the side on which an antenna is formed, blocking of an electric field by the storage battery 913 can be inhibited. When an electric field is not significantly blocked by the housing 930a, an antenna such as the antennas 914 and 915 may be provided inside the housing 930a. For the housing 930b, a metal material can be used, for example.

Figure 20:
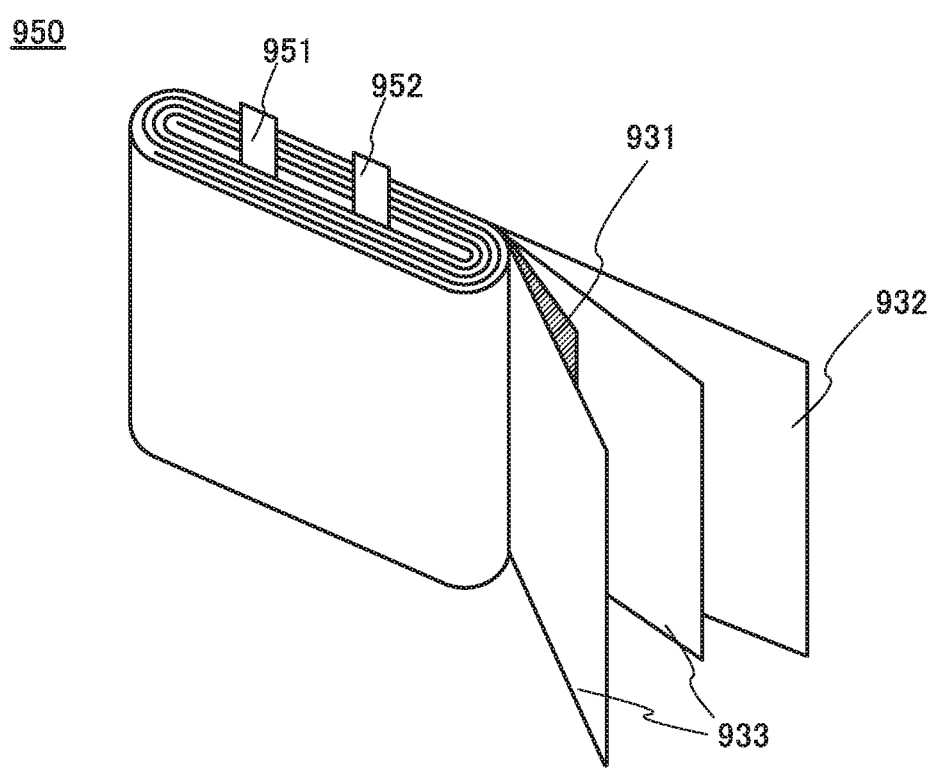
FIG. 20 illustrates an example of a storage battery.

FIG. 20 illustrates the structure of the wound body 950. The wound body 950 includes a negative electrode 931, a positive electrode 932, and separators 933. The wound body 950 is obtained by winding a sheet of a stack in which the negative electrode 931 overlaps with the positive electrode 932 with the separator 933 provided therebetween. Note that a plurality of stacks of the negative electrode 931, the positive electrode 932, and the separator 933 may be stacked.

The negative electrode 931 is connected to the terminal 911 in FIGS. 16A and 16B via one of the terminals 951 and 952. The positive electrode 932 is connected to the terminal 911 in FIGS. 16A and 16B via the other of the terminals 951 and 952.

<<Examples of Electrical Devices: Vehicles>>

Next, examples where a storage battery is used in a vehicle will be described. The use of storage batteries in vehicles enables production of next-generation clean energy vehicles such as hybrid electric vehicles (HEV), electric vehicles (EV), and plug-in hybrid electric vehicles (PHEV).

Figure 21A:
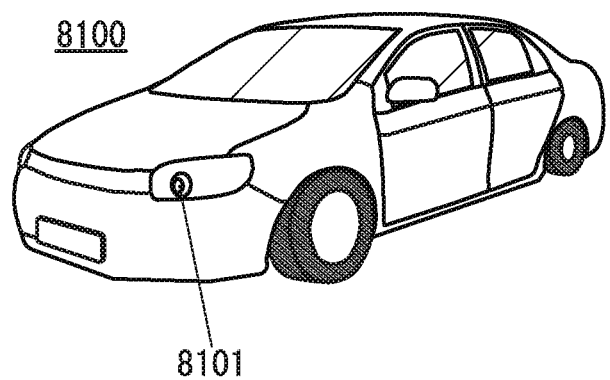
FIGS. 21A and 21B each illustrate an application mode of a storage battery.
Figure 21B:
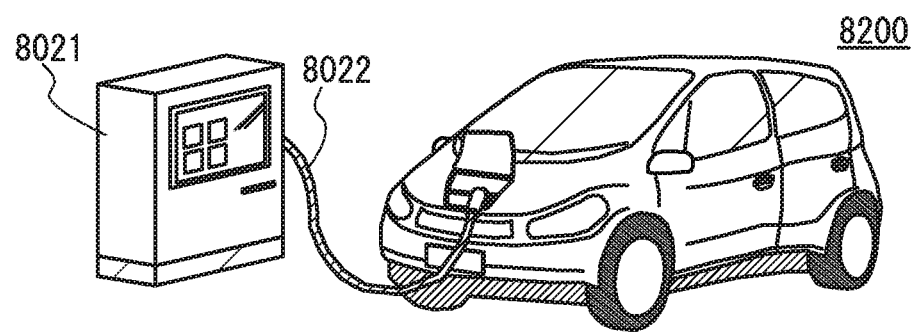

FIGS. 21A and 21B each illustrate an example of a vehicle using one embodiment of the present invention. An automobile 8100 illustrated in FIG. 21A is an electric vehicle that runs on the power of an electric motor. Alternatively, the automobile 8100 is a hybrid electric vehicle capable of driving appropriately using either the electric motor or the engine. One embodiment of the present invention can provide a vehicle which can be repeatedly charged and discharged. The automobile 8100 includes the storage battery. The storage battery is used not only for driving the electric motor, but also for supplying electric power to a light-emitting device such as a headlight 8101 or an interior light (not illustrated).

The storage battery can also supply electric power to a display device of a speedometer, a tachometer, or the like included in the automobile 8100. Furthermore, the storage battery can supply electric power to a semiconductor device included in the automobile 8100, such as a navigation system.

FIG. 21B illustrates an automobile 8200 including the storage battery. The automobile 8200 can be charged when the storage battery is supplied with electric power through external charging equipment by a plug-in system, a contactless power feeding system, or the like. In FIG. 21B, the storage battery included in the automobile 8200 is charged with the use of a ground-based charging apparatus 8021 through a cable 8022. In charging, a given method may be employed as a charging method, the standard of a connector, or the like as appropriate. The charging apparatus 8021 may be a charging station provided in a commerce facility or a power source in a house. For example, with the use of a plug-in technique, the storage battery included in the automobile 8200 can be charged by being supplied with electric power from outside. The charging can be performed by converting AC electric power into DC electric power through a converter such as an AC-DC converter.

Furthermore, although not illustrated, the vehicle may include a power receiving device so that it can be charged by being supplied with electric power from an above-ground power transmitting device in a contactless manner. In the case of the contactless power feeding system, by fitting a power transmitting device in a road or an exterior wall, charging can be performed not only when the electric vehicle is stopped but also when driven. In addition, the contactless power feeding system may be utilized to perform transmission and reception of electric power between vehicles. Furthermore, a solar cell may be provided in the exterior of the automobile to charge the storage battery when the automobile stops or moves. To supply electric power in such a contactless manner, an electromagnetic induction method or a magnetic resonance method can be used.

According to one embodiment of the present invention, the storage battery can have improved cycle life and reliability. Furthermore, according to one embodiment of the present invention, the storage battery itself can be made more compact and lightweight as a result of improved characteristics of the storage battery. The compact and lightweight storage battery contributes to a reduction in the weight of a vehicle, and thus increases the mileage. Furthermore, the storage battery included in the vehicle can be used as a power source for supplying electric power to products other than the vehicle. In such a case, the use of a commercial power source can be avoided at peak time of electric power demand.

Embodiment 4

A battery management unit (BMU) which can be combined with a battery cell including any of the storage batteries described in Embodiments 1 to 3 and a transistor suitable for a circuit included in the battery management unit are described with reference to FIG. 22, FIGS. 23A to 23C, FIG. 24, FIG. 25, FIGS. 26A to 26C, FIG. 27, and FIG. 28. In this embodiment, a battery management unit of a storage battery including battery cells that are connected in series is particularly described.

When a plurality of battery cells connected in series are charged and discharged repeatedly, each battery cell has different capacity (output voltage) from one another in accordance with the variation in performance among the battery cells. A discharge capacity of all of the battery cells connected in series depends on a battery cell with low capacity. The variation in capacities reduces the capacity of the battery cells at the time of discharging. Charging based on a battery cell with low capacity may cause insufficient charging. Charging based on a battery cell with high capacity may cause overcharge.

Thus, the battery management unit of the storage battery including battery cells connected in series has a function of reducing variation in capacities among the battery cells which causes insufficient charging or overcharge. Although circuit structures for reducing variation in capacities among the battery cells include a resistive type, a capacitor type, and an inductor type, a circuit structure which can reduce variation in capacities among the battery cells using transistors with a low off-state current is explained here as an example.

A transistor including an oxide semiconductor in its channel formation region (an OS transistor) is preferably used as the transistor with a low off-state current. When an OS transistor with a low off-state current is used in the circuit of the battery management unit of the storage battery, the amount of electric charge leaking from a battery can be reduced, and reduction in capacity over time can be suppressed.

As the oxide semiconductor used in the channel formation region, an In-M-Zn oxide (M is Ga, Sn, Y, Zr, La, Ce, or Nd) is used. In the case where the atomic ratio of the metal elements of a target for forming an oxide semiconductor film is In:M:Zn=$x_1$:$y_1$:$z_1$, $x_1/y_1$ is preferably greater than or equal to ⅓ and less than or equal to 6, further preferably greater than or equal to 1 and less than or equal to 6, and $z_1/y_1$ is preferably greater than or equal to ⅓ and less than or equal to 6, further preferably greater than or equal to 1 and less than or equal to 6. Note that when $z_1/y_1$ is greater than or equal to 1 and less than or equal to 6, a CAAC-OS film as the oxide semiconductor film is easily formed.

Here, the details of the CAAC-OS film are described.

The CAAC-OS film is one of oxide semiconductor films having a plurality of c-axis aligned crystal parts.

In a combined analysis image (also referred to as a high-resolution TEM image) of a bright-field image and a diffraction pattern of a CAAC-OS film, which is obtained using a transmission electron microscope (TEM), a plurality of crystal parts can be observed. However, in the high-resolution TEM image, a boundary between crystal parts, that is, a grain boundary is not clearly observed. Thus, in the CAAC-OS film, a reduction in electron mobility due to the grain boundary is less likely to occur.

According to the high-resolution cross-sectional TEM image of the CAAC-OS film observed in a direction substantially parallel to a sample surface, metal atoms are arranged in a layered manner in the crystal parts. Each metal atom layer has a morphology reflecting unevenness of a surface over which the CAAC-OS film is formed (hereinafter, a surface over which the CAAC-OS film is formed is referred to as a formation surface) or of a top surface of the CAAC-OS film, and is arranged parallel to the formation surface or the top surface of the CAAC-OS film.

On the other hand, according to the high-resolution planar TEM image of the CAAC-OS film observed in a direction substantially perpendicular to the sample surface, metal atoms are arranged in a triangular or hexagonal configuration in the crystal parts. However, there is no regularity of arrangement of metal atoms between different crystal parts.

A CAAC-OS film is subjected to structural analysis with an X-ray diffraction (XRD) apparatus. For example, when the CAAC-OS film including an $InGaZnO_4$ crystal is analyzed by an out-of-plane method, a peak appears frequently when the diffraction angle (2θ) is around 31°. This peak is derived from the (009) plane of the $InGaZnO_4$ crystal, which indicates that crystals in the CAAC-OS film have c-axis alignment, and that the c-axes are aligned in a direction substantially perpendicular to the formation surface or the top surface of the CAAC-OS film.

Note that when the CAAC-OS film with an $InGaZnO_4$ crystal is analyzed by an out-of-plane method, a peak of 2θ may also be observed at around 36°, in addition to the peak of 2θ at around 31°. The peak of 2θ at around 36° indicates that a crystal having no c-axis alignment is included in a part of the CAAC-OS film. It is preferable that in the CAAC-OS film, a peak of 2θ appear at around 31° and a peak of 2θ not appear at around 36°.

The CAAC-OS film is an oxide semiconductor film having low impurity concentration. The impurity is an element other than the main components of the oxide semiconductor film, such as hydrogen, carbon, silicon, or a transition metal element. In particular, an element that has higher bonding strength to oxygen than a metal element included in the oxide semiconductor film, such as silicon, disturbs the atomic arrangement of the oxide semiconductor film by depriving the oxide semiconductor film of oxygen and causes a decrease in crystallinity. Further, a heavy metal such as iron or nickel, argon, carbon dioxide, or the like has a large atomic radius (molecular radius), and thus disturbs the atomic arrangement of the oxide semiconductor film and causes a decrease in crystallinity when it is contained in the oxide semiconductor film. Note that the impurity contained in the oxide semiconductor film might serve as a carrier trap or a carrier generation source.

The CAAC-OS film is an oxide semiconductor film having a low density of defect states. In some cases, oxygen vacancies in the oxide semiconductor film serve as carrier traps or serve as carrier generation sources when hydrogen is captured therein.

The state in which impurity concentration is low and density of defect states is low (the number of oxygen vacancies is small) is referred to as a "highly purified intrinsic" or "substantially highly purified intrinsic" state. A highly purified intrinsic or substantially highly purified intrinsic oxide semiconductor film has few carrier generation sources, and thus can have a low carrier density. Thus, a transistor including the oxide semiconductor film rarely has negative threshold voltage (is rarely normally on). The highly purified intrinsic or substantially highly purified intrinsic oxide semiconductor film has few carrier traps. Accordingly, the transistor including the oxide semiconductor film has little variation in electrical characteristics and high reliability. Electric charge trapped by the carrier traps in the oxide semiconductor film takes a long time to be released, and might behave like fixed electric charge. Thus, the transistor which includes the oxide semiconductor film having high impurity concentration and a high density of defect states has unstable electrical characteristics in some cases.

With the use of the CAAC-OS film in a transistor, variation in the electrical characteristics of the transistor due to irradiation with visible light or ultraviolet light is small.

Since the OS transistor has a wider band gap than a transistor including silicon in its channel formation region (a Si transistor), dielectric breakdown is unlikely to occur when a high voltage is applied. Although a voltage of several hundreds of volts is generated when battery cells are connected in series, the above-described OS transistor is suitable for a circuit of a battery management unit which is used for such battery cells in the storage battery.

Figure 22:
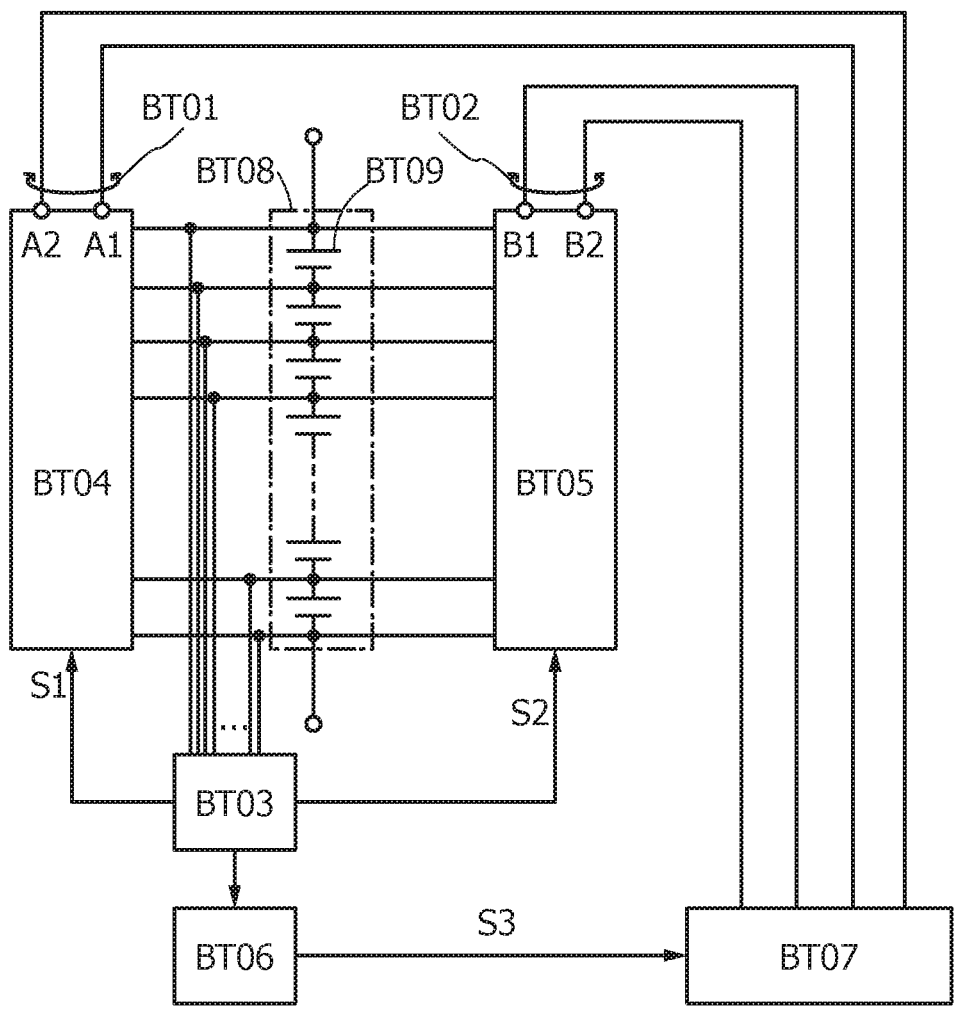
FIG. 22 is a block diagram illustrating one embodiment of the present invention.

FIG. 22 is an example of a block diagram of the storage battery. A storage battery BT00 illustrated in FIG. 22 includes a terminal pair BT01, a terminal pair BT02, a switching control circuit BT03, a switching circuit BT04, a switching circuit BT05, a voltage transformation control circuit BT06, a voltage transformer circuit BT07, and a battery portion BTO8 including a plurality of battery cells BT09 connected in series.

In the storage battery BT00 illustrated in FIG. 22, a portion including the terminal pair BT01, the terminal pair BT02, the switching control circuit BT03, the switching circuit BT04, the switching circuit BT05, the voltage transformation control circuit BT06, and the voltage transformer circuit BT07 can be referred to as a battery management unit.

The switching control circuit BT03 controls operations of the switching circuits BT04 and BT05. Specifically, the switching control circuit BT03 selects battery cells to be discharged (a discharge battery cell group) and battery cells to be charged (a charge battery cell group) in accordance with voltage measured for every battery cell BT09.

Furthermore, the switching control circuit BT03 outputs a control signal S1 and a control signal S2 on the basis of the selected discharge battery cell group and the selected charge battery cell group. The control signal S1 is output to the switching circuit BT04. The control signal S1 controls the switching circuit BT04 so that the terminal pair BT01 and the discharge battery cell group are connected. In addition, the control signal S2 is output to the switching circuit BT05. The control signal S2 controls the switching circuit BT05 so that the terminal pair BT02 and the charge battery cell group are connected.

The switching control circuit BT03 generates the control signal S1 and the control signal S2 on the basis of connection relation of the switching circuit BT04, the switching circuit BT05, and the voltage transformer circuit BT07 so that terminals having the same polarity are connected with each other in the terminal pair BT02 and the charge battery cell group.

An operation of the switching control circuit BT03 is described in detail.

First, the switching control circuit BT03 measures the voltage of each of the plurality of battery cells BT09. Then, the switching control circuit BT03 determines that the battery cell BT09 having a voltage higher than a predetermined threshold value is a high-voltage battery cell (high-voltage cell) and that the battery cell BT09 having a voltage lower than the predetermined threshold value is a low-voltage battery cell (low-voltage cell), for example.

As a method to determine whether a battery cell is a high-voltage cell or a low-voltage cell, any of various methods can be employed. For example, the switching control circuit BT03 may determine whether each battery cell BT09 is a high-voltage cell or a low-voltage cell on the basis of the voltage of a battery cell BT09 having a highest voltage or a lowest voltage among the plurality of battery cells BT09. In this case, the switching control circuit BT03 can determine whether each battery cell BT09 is a high-voltage cell or a low-voltage cell by determining whether or not a ratio of a voltage of each battery cell BT09 to the reference voltage is the predetermined value or more. Then, the switching control circuit BT03 determines a charge battery cell group and a discharge battery cell group on the basis of the determination result.

Note that high-voltage cells and low-voltage cells are mixed in various states in the plurality of battery cells BT09. For example, the switching control circuit BT03 selects a portion having the largest number of high-voltage cells connected in series as the discharge battery cell group of mixed high-voltage cells and low-voltage cells. Furthermore, the switching control circuit BT03 selects a portion having the largest number of low-voltage cells connected in series as the charge battery cell group. In addition, the switching control circuit BT03 may preferentially select battery cells BT09 which are near overcharged or overdischarged as the discharge battery cell group or the charge battery cell group.

Figure 23A:
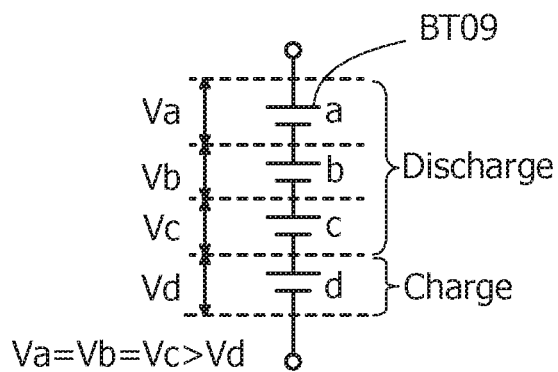
FIGS. 23A to 23C are each a conceptual diagram illustrating one embodiment of the present invention.
Figure 23B:
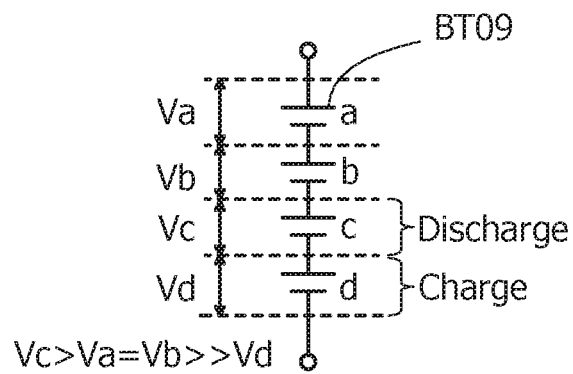
Figure 23C:
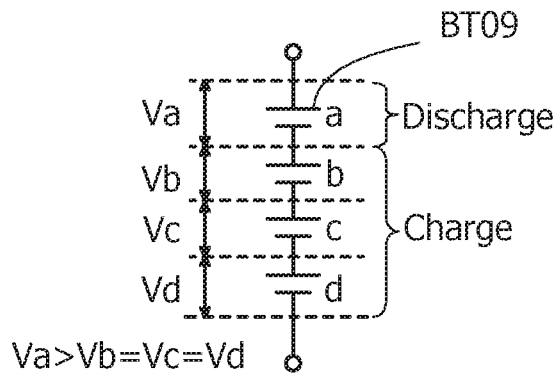

Here, operation examples of the switching control circuit BT03 in this embodiment are described with reference to FIGS. 23A to 23C. FIGS. 23A to 23C illustrate operation examples of the switching control circuit BT03. Note that FIGS. 23A to 23C each illustrate the case where four battery cells BT09 are connected in series as an example for convenience of explanation.

FIG. 23A shows the case where the relation of voltages Va, Vb, Vc, and Vd is Va=Vb=Vc>Vd where the voltages Va, Vb, Vc, and Vd are voltages of a battery cell a, a battery cell b, a battery cell c, and a battery cell d, respectively. That is, a series of three high-voltage cells a to c and one low-voltage cell d are connected in series. In that case, the switching control circuit BT03 selects the series of three high-voltage cells a to c as the discharge battery cell group. In addition, the switching control circuit BT03 selects the low-voltage cell d as the charge battery cell group.

Next, FIG. 23B shows the case where the relation of the voltages is Vc>Va=Vb>>Vd. That is, a series of two low-voltage cells a and b, one high-voltage cell c, and one low-voltage cell d which is close to overdischarge are connected in series. In that case, the switching control circuit BT03 selects the high-voltage cell c as the discharge battery cell group. Since the low-voltage cell d is close to overdischarge, the switching control circuit BT03 preferentially selects the low-voltage cell d as the charge battery cell group instead of the series of two low-voltage cells a and b.

Lastly, FIG. 23C shows the case where the relation of the voltages is Va>Vb=Vc=Vd. That is, one high-voltage cell a and a series of three low-voltage cells b to d are connected in series. In that case, the switching control circuit BT03 selects the high-voltage cell a as the discharge battery cell group. In addition, the switching control circuit BT03 selects the series of three low-voltage cells b to d as the charge battery cell group.

On the basis of the determination result shown in the examples of FIGS. 23A to 23C, the switching control circuit BT03 outputs the control signal S1 and the control signal S2 to the switching circuit BT04 and the switching circuit BT05, respectively. Information showing the discharge battery cell group being the connection destination of the switching circuit BT04 is set in the control signal S1. Information showing the charge battery cell group being a connection destination of the switching circuit BT05 is set in the control signal S2.

The above is the detailed description of the operation of the switching control circuit BT03.

The switching circuit BT04 sets the discharge battery cell group selected by the switching control circuit BT03 as the connection destination of the terminal pair BT01 in response to the control signal S1 output from the switching control circuit BT03.

The terminal pair BT01 includes a pair of terminals A1 and A2. The switching circuit BT04 sets the connection destination of the terminal pair BT01 by connecting one of the pair of terminals A1 and A2 to a positive electrode terminal of a battery cell BT09 positioned on the most upstream side (on the high potential side) of the discharge battery cell group, and the other to a negative electrode terminal of a battery cell BT09 positioned on the most downstream side (on the low potential side) of the discharge battery cell group. Note that the switching circuit BT04 can recognize the position of the discharge battery cell group on the basis of the information set in the control signal S1.

The switching circuit BT05 sets the charge battery cell group selected by the switching control circuit BT03 as the connection destination of the terminal pair BT02 in response to the control signal S2 output from the switching control circuit BT03.

The terminal pair BT02 includes a pair of terminals B1 and B2. The switching circuit BT05 sets the connection destination of the terminal pair BT02 by connecting one of the pair of terminals B1 and B2 to a positive electrode terminal of a battery cell BT09 positioned on the most upstream side (on the high potential side) of the charge battery cell group, and the other to a negative electrode terminal of a battery cell BT09 positioned on the most downstream side (on the low potential side) of the charge battery cell group. Note that the switching circuit BT05 can recognize the position of the charge battery cell group on the basis of the information set in the control signal S2.

Figure 24:
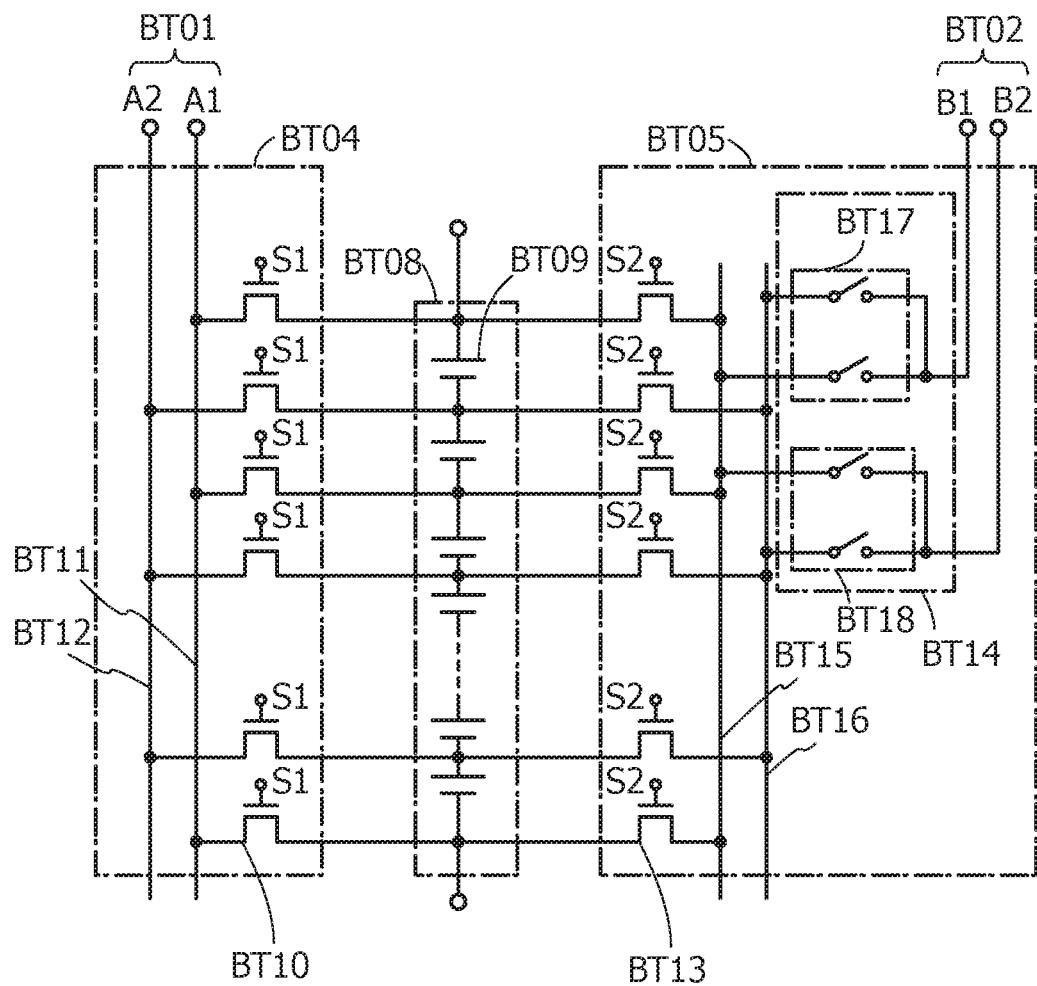
FIG. 24 is a circuit diagram illustrating one embodiment of the present invention.
Figure 25:
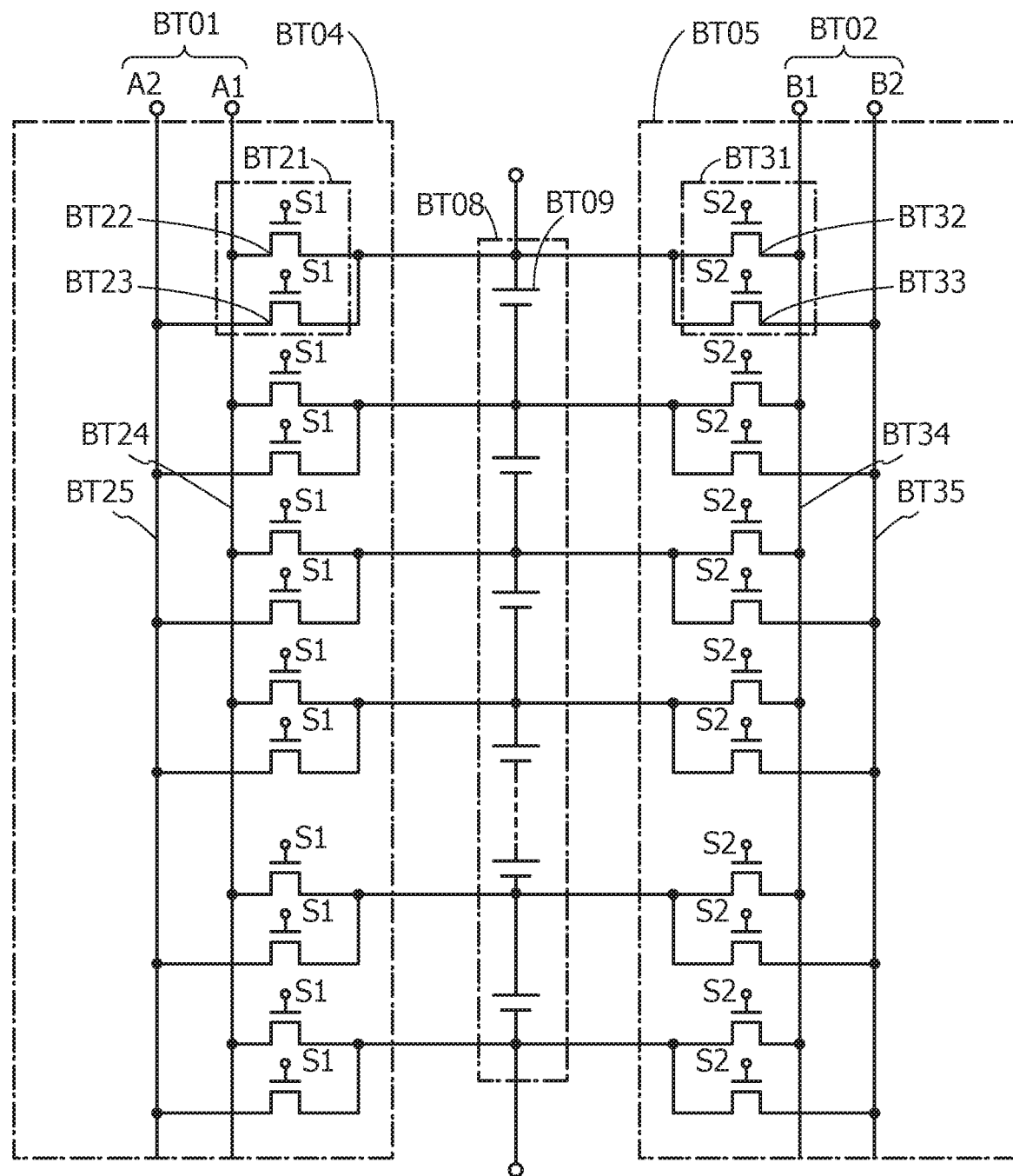
FIG. 25 is a circuit diagram illustrating one embodiment of the present invention.

FIG. 24 and FIG. 25 are circuit diagrams showing configuration examples of the switching circuits BT04 and BT05.

In FIG. 24, the switching circuit BT04 includes a plurality of transistors BT10, a bus BT11, and a bus BT12. The bus BT11 is connected to the terminal A1. The bus BT12 is connected to the terminal A2. Sources or drains of the plurality of transistors BT10 are connected alternately to the bus BT11 and the bus BT12. Sources or drains which are not connected to the bus BT11 and the bus BT12 of the plurality of transistors BT10 are each connected between two adjacent battery cells BT09.

A source or a drain of a transistor BT10 which is not connected to the bus BT11 on the most upstream side of the plurality of transistors BT10 is connected to a positive electrode terminal of a battery cell BT09 on the most upstream side of the battery portion BT08. A source or a drain of a transistor BT10 which is not connected to the bus BT11 on the most downstream side of the plurality of transistors BT10 is connected to a negative electrode terminal of a battery cell BT09 on the most downstream side of the battery portion BT08.

The switching circuit BT04 connects the discharge battery cell group to the terminal pair BT01 by bringing one of the plurality of the transistors BT10 which are connected to the bus BT11 and one of the plurality of transistors BT10 which are connected to the bus BT12 into an on state in response to the control signal S1 supplied to gates of the plurality of transistors BT10. Accordingly, the positive electrode terminal of the battery cell BT09 on the most upstream side of the discharge battery cell group is connected to one of the pair of terminals A1 and A2. In addition, the negative electrode terminal of the battery cell BT09 on the most downstream side of the discharge battery cell group is connected to the other of the pair of terminals A1 and A2 (i.e., a terminal which is not connected to the positive electrode terminal).

An OS transistor is preferably used as the transistor BT10. Since the off-state current of the OS transistor is low, the amount of electric charge leaking from battery cells which do not belong to the discharge battery cell group can be reduced, and reduction in capacity over time can be suppressed. In addition, dielectric breakdown is unlikely to occur in the OS transistor when a high voltage is applied. Therefore, the battery cell BT09 and the terminal pair BT01, which are connected to the transistor BT10 in an off state, can be insulated from each other even when an output voltage of the discharge battery cell group is high.

In FIG. 24, the switching circuit BT05 includes a plurality of transistors BT13, a current control switch BT14, a bus BT15, and a bus BT16. The bus BT15 and the bus BT16 are provided between the plurality of transistors BT13 and the current control switch BT14. Sources or drains of the plurality of transistors BT13 are connected alternately to the bus BT15 and the bus BT16. Sources or drains which are not connected to the bus BT15 and the bus BT16 of the plurality of transistors BT13 are each connected between two adjacent battery cells BT09.

A source or a drain of a transistor BT13 on the most upstream side of the plurality of transistors BT13 is connected to a positive electrode terminal of the battery cell BT09 on the most upstream side of the battery portion BT08. A source or a drain of a transistor BT13 on the most downstream side of the plurality of transistors BT13 is connected to a negative electrode terminal of the battery cell BT09 on the most downstream side of the battery portion BT08.

OS transistors are preferably used as the transistors BT13 like the transistors BT10. Since the off-state current of the OS transistor is low, the amount of electric charge leaking from the battery cells which do not belong to the charge battery cell group can be reduced, and reduction in capacity over time can be suppressed. In addition, dielectric breakdown is unlikely to occur in the OS transistor when a high voltage is applied. Therefore, the battery cell BT09 and the terminal pair BT02, which are connected to the transistor BT13 in an off state, can be insulated from each other even when a voltage for charging the charge battery cell group is high.

The current control switch BT14 includes a switch pair BT17 and a switch pair BT18. One end of the switch pair BT17 is connected to the terminal B1. The other ends of the switch pair BT17 extend from respective switches of the switch pair BT17. One switch is connected to the bus BT15, and the other switch is connected to the bus BT16. One end of the switch pair BT18 is connected to the terminal B2. The other ends of the switch pair BT18 extend from two switches of the switch pair BT18. One switch is connected to the bus BT15, and the other switch is connected to the bus BT16.

OS transistors are preferably used for the switches included in the switch pair BT17 and the switch pair BT18 like the transistors BT10 and BT13.

The switching circuit BT05 connects the charge battery cell group and the terminal pair BT02 by controlling the combination of on and off states of the transistors BT13 and the current control switch BT14 in response to the control signal S2.

For example, the switching circuit BT05 connects the charge battery cell group and the terminal pair BT02 in the following manner.

The switching circuit BT05 brings a transistor BT13 connected to a positive electrode terminal of a battery cell BT09 on the most upstream side of the charge battery cell group into an on state in response to the control signal S2 supplied to gates of the plurality of the transistors BT13. In addition, the switching circuit BT05 brings a transistor BT13 connected to a negative electrode terminal of a battery cell BT09 on the most downstream side of the charge battery cell group into an on state in response to the control signal S2 supplied to the gates of the plurality of the transistors BT13.

The polarities of voltages applied to the terminal pair BT02 can vary in accordance with the connection structures of the voltage transformer circuit BT07 and the discharge battery cell group connected to the terminal pair BT01. In order to supply current in a direction for charging the charge battery cell group, terminals with the same polarity of the terminal pair BT02 and the charge battery cell group are required to be connected. In view of this, the current control switch BT14 is controlled by the control signal S2 so that the connection destination of the switch pair BT17 and that of the switch pair BT18 are changed in accordance with the polarities of the voltages applied to the terminal pair BT02.

The state where voltages are applied to the terminal pair BT02 so as to make the terminal B1 a positive electrode and the terminal B2 a negative electrode is described as an example. Here, in the case where the battery cell BT09 positioned on the most downstream side of the battery portion BT08 is in the charge battery cell group, the switch pair BT17 is controlled to be connected to the positive electrode terminal of the battery cell BT09 in response to the control signal S2. That is, the switch of the switch pair BT17 connected to the bus BT16 is turned on, and the switch of the switch pair BT17 connected to the bus BT15 is turned off. In contrast, the switch pair BT18 is controlled to be connected to the negative electrode terminal of the battery cell BT09 positioned on the most downstream side of the battery portion BTO8 in response to the control signal S2. That is, the switch of the switch pair BT18 connected to the bus BT15 is turned on, and the switch of the switch pair BT18 connected to the bus BT16 is turned off. In this manner, terminals with the same polarity of the terminal pair BTO2 and the charge battery cell group are connected to each other. In addition, the current which flows from the terminal pair BT02 is controlled to be supplied in a direction so as to charge the charge battery cell group.

In addition, instead of the switching circuit BT05, the switching circuit BT04 may include the current control switch BT14.

FIG. 25 is a circuit diagram illustrating structure examples of the switching circuit BT04 and the switching circuit BT05 which are different from those of FIG. 24.

In FIG. 25, the switching circuit BT04 includes a plurality of transistor pairs BT21, a bus BT24, and a bus BT25. The bus BT24 is connected to the terminal A1. The bus BT25 is connected to the terminal A2. One end of each of the plurality of transistor pairs BT21 extends from a transistor BT22 and a transistor BT23. A source or drain of the transistor BT22 is connected to the bus BT24. A source or drain of the transistor BT23 is connected to the bus BT25. In addition, the other end of each of the transistor pairs is connected between two adjacent battery cells BT09. The other end of the transistor pair BT21 on the most upstream side of the plurality of transistor pairs BT21 is connected to the positive electrode terminal of the battery cell BT09 on the most upstream side of the battery portion BT08. The other end of the transistor pair BT21 on the most downstream side of the plurality of transistor pairs BT21 is connected to the negative electrode terminal of the battery cell BT09 on the most downstream side of the battery portion BT08.

The switching circuit BT04 switches the connection destination of the transistor pair BT21 to one of the terminal A1 and the terminal A2 by turning on or off the transistors BT22 and BT23 in response to the control signal S1. Specifically, when the transistor BT22 is turned on, the transistor BT23 is turned off, so that the connection destination of the transistor pair BT21 is the terminal A1. On the other hand, when the transistor BT23 is turned on, the transistor BT22 is turned off, so that the connection destination of the transistor pair BT21 is the terminal A2. Which of the transistors BT22 and BT23 is turned on is determined by the control signal S1.

Two transistor pairs BT21 are used to connect the terminal pair BT01 and the discharge battery cell group. Specifically, the connection destinations of the two transistor pairs BT21 are determined on the basis of the control signal S1, and the discharge battery cell group and the terminal pair BT01 are connected. The connection destinations of the two transistor pairs BT21 are controlled by the control signal S1 so that one of the connection destinations is the terminal Al and the other is the terminal A2.

The switching circuit BT05 includes a plurality of transistor pairs BT31, a bus BT34, and a bus BT35. The bus BT34 is connected to the terminal B1. The bus BT35 is connected to the terminal B2. One ends of the transistor pairs BT31 extend from a transistor BT32 and a transistor BT33. One end extending from the transistor BT32 is connected to the bus BT34. One end extending from the transistor BT33 is connected to the bus BT35. The other end of each of the transistor pairs BT31 is connected between two adjacent battery cells BT09. The other end of the transistor pair BT31 on the most upstream side of the plurality of transistor pairs BT31 is connected to the positive electrode terminal of the battery cell BT09 on the most upstream side of the battery portion BT08. The other end of the transistor pair BT31 on the most downstream side of the plurality of transistor pairs BT31 is connected to the negative electrode terminal of the battery cell BT09 on the most downstream side of the battery portion BT08.

The switching circuit BT05 switches the connection destination of the transistor pair BT31 to one of the terminal B1 and the terminal B2 by turning on or off the transistors BT32 and BT33 in response to the control signal S2. Specifically, when the transistor BT32 is turned on, the transistor BT33 is turned off, so that the connection destination of the transistor pair BT31 is the terminal B1. On the other hand, when the transistor BT33 is turned on, the transistor BT32 is turned off, so that the connection destination of the transistor pair BT31 is the terminal B2. Which of the transistors BT32 and BT33 is turned on is determined by the control signal S2.

Two transistor pairs BT31 are used to connect the terminal pair BT02 and the charge battery cell group. Specifically, the connection destinations of the two transistor pairs BT31 are determined on the basis of the control signal S2, and the charge battery cell group and the terminal pair BT02 are connected. The connection destinations of the two transistor pairs BT31 are controlled by the control signal S2 so that one of the connection destinations is the terminal B1 and the other is the terminal B2.

The connection destinations of the two transistor pairs BT31 are determined by the polarities of the voltages applied to the terminal pair BT02. Specifically, in the case where voltages which make the terminal B1 a positive electrode and the terminal B2 a negative electrode are applied to the terminal pair BT02, the transistor pair BT31 on the upstream side is controlled by the control signal S2 so that the transistor BT32 is turned on and the transistor BT33 is turned off. In contrast, the transistor pair BT31 on the downstream side is controlled by the control signal S2 so that the transistor BT33 is turned on and the transistor BT32 is turned off. In the case where voltages which make the terminal B1 a negative electrode and the terminal B2 a positive electrode are applied to the terminal pair BT02, the transistor pair BT31 on the upstream side is controlled by the control signal S2 so that the transistor BT33 is turned on and the transistor BT32 is turned off. In contrast, the transistor pair BT31 on the downstream side is controlled by the control signal S2 so that the transistor BT32 is turned on and the transistor BT33 is turned off. In this manner, terminals with the same polarity of the terminal pair BT02 and the charge battery cell group are connected to each other. In addition, the current which flows from the terminal pair BT02 is controlled to be supplied in a direction for charging the charge battery cell group.

The voltage transformation control circuit BT06 controls operation of the voltage transformer circuit BT07. The voltage transformation control circuit BT06 generates a voltage transformation signal S3 for controlling the operation of the voltage transformer circuit BT07 on the basis of the number of the battery cells BT09 included in the discharge battery cell group and the number of the battery cells BT09 included in the charge battery cell group and outputs the voltage transformation signal S3 to the voltage transformer circuit BT07.

In the case where the number of the battery cells BT09 included in the discharge battery cell group is larger than that included in the charge battery cell group, it is necessary to inhibit a charging voltage which is too high from being applied to the charge battery cell group. Thus, the voltage transformation control circuit BT06 outputs the voltage transformation signal S3 for controlling the voltage transformer circuit BT07 so that a discharging voltage (Vdis) is lowered within a range where the charge battery cell group can be charged.

In the case where the number of the battery cells BT09 included in the discharge battery cell group is less than or equal to that included in the charge battery cell group, a voltage necessary for charging the charge battery cell group needs to be secured. Therefore, the voltage transformation control circuit BT06 outputs the voltage transformation signal S3 for controlling the voltage transformer circuit BT07 so that the discharging voltage (Vdis) is raised within a range where a charging voltage which is too high is not applied to the charge battery cell group.

The voltage value of the charging voltage which is too high is determined in the light of product specifications and the like of the battery cell BT09 used in the battery portion BT08. The voltage which is raised or lowered by the voltage transformer circuit BT07 is applied as a charging voltage (Vcha) to the terminal pair BT02.

Figure 26A:
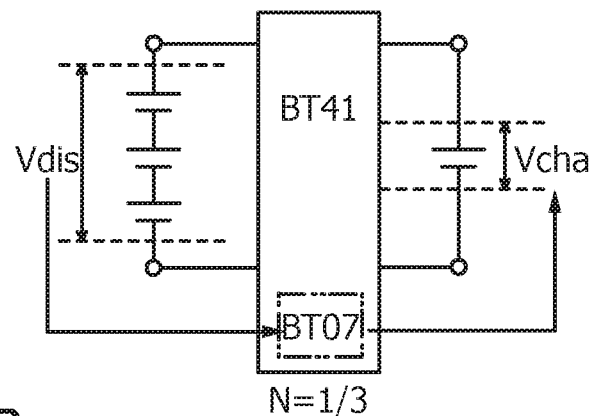
FIGS. 26A to 26C are each a conceptual diagram illustrating one embodiment of the present invention.
Figure 26B:
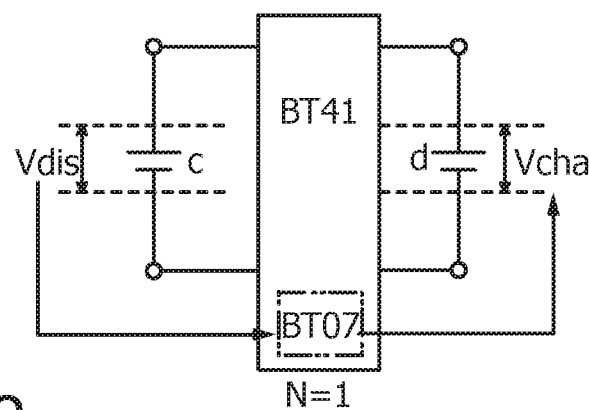
Figure 26C:
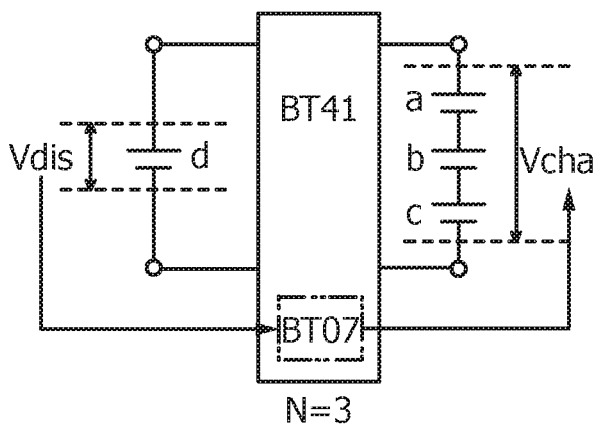

Here, operation examples of the voltage transformation control circuit BT06 in this embodiment are described with reference to FIGS. 26A to 26C. FIGS. 26A to 26C are conceptual diagrams for explaining the operation examples of the voltage transformation control circuits BT06 for the discharge battery cell groups and the charge battery cell groups described in FIGS. 23A to 23C. FIGS. 26A to 26C each illustrate a battery management unit BT41. The battery management unit BT41 includes the terminal pair BT01, the terminal pair BT02, the switching control circuit BT03, the switching circuit BT04, the switching circuit BT05, the voltage transformation control circuit BT06, and the voltage transformer circuit BT07.

In an example illustrated in FIG. 26A, the series of three high-voltage cells a to c and one low-voltage cell d are connected in series as described in FIG. 23A. In that case, as described using FIG. 23A, the switching control circuit BT03 selects the high-voltage cells a to c as the discharge battery cell group, and selects the low-voltage cell d as the charge battery cell group. The voltage transformation control circuit BT06 calculates a conversion ratio N for converting the discharging voltage (Vdis) to the charging voltage (Vcha) on the basis of the ratio of the number of the battery cells BT09 included in the charge battery cell group to the number of the battery cells BT09 included in the discharge battery cell group.

In the case where the number of the battery cells BT09 included in the discharge battery cell group is larger than that included in the charge battery cell group, when a discharging voltage is applied to the terminal pair BT02 without transforming the voltage, overvoltage may be applied to the battery cells BT09 included in the charge battery cell group through the terminal pair BT02. Thus, in the case of FIG. 26A, it is necessary that a charging voltage (Vcha) applied to the terminal pair BT02 be lowered than the discharging voltage. In addition, in order to charge the charge battery cell group, it is necessary that the charging voltage be higher than the total voltage of the battery cells BT09 included in the charge battery cell group. Thus, the transformation control circuit BT06 sets the conversion ratio N larger than the ratio of the number of the battery cells BT09 included in the charge battery cell group to the number of the battery cells BT09 included in the discharge battery cell group.

Thus, the voltage transformation control circuit BT06 preferably sets the conversion ratio N larger than the ratio of the number of the battery cells BT09 included in the charge battery cell group to the number of the battery cells BT09 included in the discharge battery cell group by about 1% to 10%. Here, the charging voltage is made higher than the voltage of the charge battery cell group, but the charging voltage is equal to the voltage of the charge battery cell group in reality. Note that the voltage transformation control circuit BT06 feeds a current for charging the charge battery cell group in accordance with the conversion ratio N in order to make the voltage of the charge battery cell group equal to the charging voltage. The value of the current is set by the voltage transformation control circuit BT06.

In the example illustrated in FIG. 26A, since the number of the battery cells BT09 included in the discharge battery cell group is three and the number of the battery cells BT09 included in the charge battery cell group is one, the voltage transformation control circuit BT06 calculates a value which is slightly larger than ⅓ as the conversion ratio N. Then, the voltage transformation control circuit BT06 outputs the voltage transformation signal S3, which lowers the discharging voltage in accordance with the conversion ratio N and converts the voltage into a charging voltage, to the voltage transformer circuit BT07. The voltage transformer circuit BT07 applies the charging voltage which is transformed in response to the voltage transformation signal S3 to the terminal pair BT02. Then, the battery cells BT09 included in the charge battery cell group are charged with the charging voltage applied to the terminal pair BT02.

In each of examples illustrated in FIGS. 26B and 26C, the conversion ratio N is calculated in a manner similar to that of FIG. 26A. In each of the examples illustrated in FIGS. 26B and 26C, since the number of the battery cells BT09 included in the discharge battery cell group is less than or equal to the number of the battery cells BT09 included in the charge battery cell group, the conversion ratio N is 1 or more. Therefore, in this case, the voltage transformation control circuit BT06 outputs the voltage transformation signal S3 for raising the discharging voltage and converting the voltage into the charging voltage.

The voltage transformer circuit BT07 converts the discharging voltage applied to the terminal pair BT01 into a charging voltage on the basis of the voltage transformation signal S3. The voltage transformer circuit BT07 applies the converted charging voltage to the terminal pair BT02. Here, the voltage transformer circuit BT07 electrically insulates the terminal pair BT01 from the terminal pair BT02. Accordingly, the voltage transformer circuit BT07 inhibits a short-circuit due to a difference between the absolute voltage of the negative electrode terminal of the battery cell BT09 on the most downstream side of the discharge battery cell group and the absolute voltage of the negative electrode terminal of the battery cell BT09 on the most downstream side of the charge battery cell group. Furthermore, the voltage transformer circuit BT07 converts the discharging voltage, which is the total voltage of the discharge battery cell group, into the charging voltage on the basis of the voltage transformation signal S3 as described above.

An insulated direct current (DC)-DC converter or the like can be used in the voltage transformer circuit BT07. In that case, the voltage transformation control circuit BT06 controls the charging voltage converted by the voltage transformer circuit BT07 by outputting a signal for controlling the on/off ratio (the duty ratio) of the insulated DC-DC converter as the voltage transformation signal S3.

Examples of the insulated DC-DC converter include a flyback converter, a forward converter, a ringing choke converter (RCC), a push-pull converter, a half-bridge converter, and a full-bridge converter, and a suitable converter is selected in accordance with the value of the intended output voltage.

Figure 27:
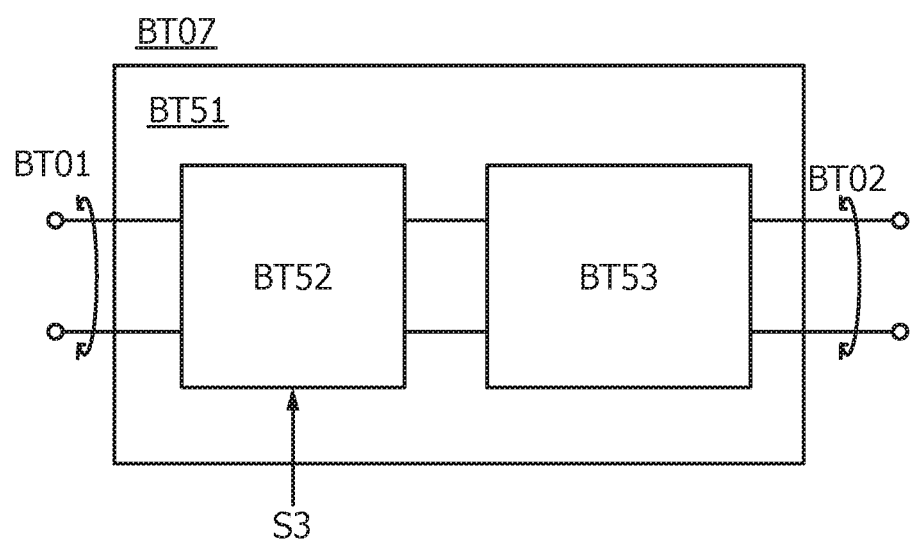
FIG. 27 is a block diagram illustrating one embodiment of the present invention.

The structure of the voltage transformer circuit BT07 including the insulated DC-DC converter is illustrated in FIG. 27. An insulated DC-DC converter BT51 includes a switch portion BT52 and a transformer BT53. The switch portion BT52 is a switch for switching on/off of the operation of the insulated DC-DC converter, and a metal oxide semiconductor field-effect transistor (MOSFET), a bipolar transistor, or the like is used as the switch portion BT52. The switch portion BT52 periodically turns on and off the insulated DC-DC converter BT51 in accordance with the voltage transformation signal S3 controlling the on/off ratio which is output from the voltage transformation control circuit BT06. The switch portion BT52 can have any of various structures in accordance with the type of the insulated DC-DC converter which is used. The transformer BT53 converts the discharging voltage applied from the terminal pair BT01 into the charging voltage. In detail, the transformer BT53 operates in conjunction with the on/off state of the switch portion BT52 and converts the discharging voltage into the charging voltage in accordance with the on/off ratio. As the time during which the switch portion BT52 is on becomes longer in its switching period, the charging voltage is increased. On the other hand, as the time during which the switch portion BT52 is on becomes shorter in its switching period, the charging voltage is decreased. In the case where the insulated DC-DC converter is used, the terminal pair BT01 and the terminal pair BT02 can be insulated from each other inside the transformer BT53.

Figure 28:
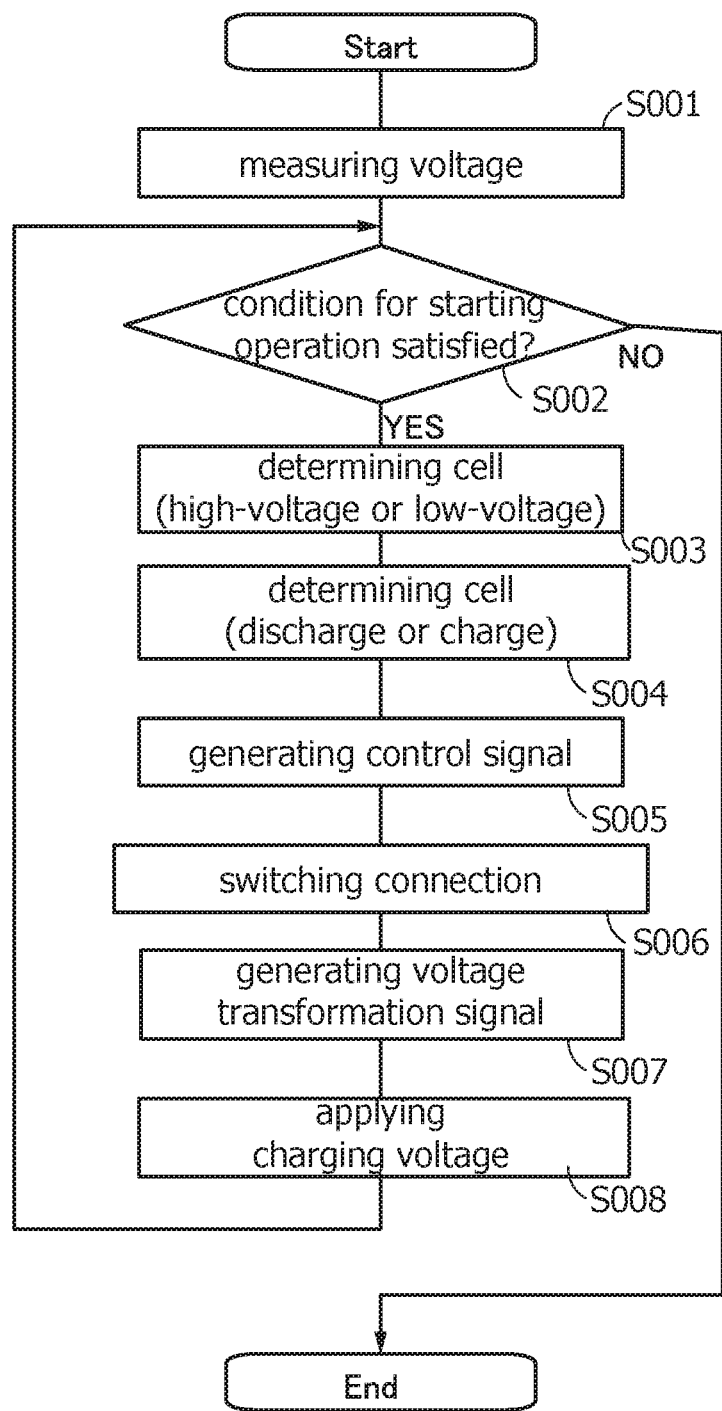
FIG. 28 is a flow chart showing one embodiment of the present invention.

A flow of operation of the storage battery BT00 in this embodiment is described with reference to FIG. 28. FIG. 28 is a flow chart illustrating the flow of the operation of the storage battery BT00.

First, the storage battery BT00 obtains a voltage measured for each of the plurality of battery cells BT09 (step S001). Then, the storage battery BT00 determines whether or not the condition for starting the operation of reducing variation in voltages of the plurality of the battery cells BT09 is satisfied (step S002). An example of the starting condition can be that the difference between the maximum value and the minimum value of the voltage measured for each of the plurality of the battery cells BT09 is higher than or equal to the predetermined threshold value. In the case where the starting condition is not satisfied (step S002: NO), the storage battery BT00 does not perform the following operation because voltages of the battery cells BT09 are well balanced. In contrast, in the case where the condition is satisfied (step S002: YES), the storage battery BT00 performs the operation of reducing variation in the voltages of the battery cells BT09. In this operation, the storage battery BT00 determines whether each battery cell BT09 is a high-voltage cell or a low-voltage cell on the basis of the measured voltage of each cell (step S003). Then, the storage battery BT00 determines a discharge battery cell group and a charge battery cell group on the basis of the determination result (step S004). In addition, the storage battery BT00 generates the control signal S1 for setting the determined discharge battery cell group as the connection destination of the terminal pair BT01, and the control signal S2 for setting the determined charge battery cell group as the connection destination of the terminal pair BT02 (step S005). The storage battery BT00 outputs the generated control signals S1 and S2 to the switching circuit BT04 and the switching circuit BT05, respectively. Then, the switching circuit BT04 connects the terminal pair BT01 and the discharge battery cell group, and the switching circuit BT05 connects the terminal pair BT02 and the discharge battery cell group (step S006). The storage battery BT00 generates the voltage transformation signal S3 based on the number of the battery cells BT09 included in the discharge battery cell group and the number of the battery cells BT09 included in the charge battery cell group (step S007). Then, the storage battery BT00 converts the discharging voltage applied to the terminal pair BT01 into a charging voltage based on the voltage transformation signal S3 and applies the charging voltage to the terminal pair BT02 (step S008). In this way, electric charge of the discharge battery cell group is transferred to the charge battery cell group.

Although the plurality of steps are shown in order in the flow chart of FIG. 28, the order of performing the steps is not limited to the order.

According to the above embodiment, when an electric charge is transferred from the discharge battery cell group to the charge battery cell group, a structure where an electric charge from the discharge battery cell group is temporarily stored, and the stored electric charge is sent to the charge battery cell group is unnecessary, unlike in the a capacitor type circuit. Accordingly, the charge transfer efficiency per unit time can be increased. In addition, the switching circuit BT04 and the switching circuit BT05 determine which battery cell in the discharge battery cell group and the charge battery cell group to be connected to the voltage transformer circuit.

Furthermore, the voltage transformer circuit BT07 converts the discharging voltage applied to the terminal pair BT01 into the charging voltage based on the number of the battery cells BT09 included in the discharge battery cell group and the number of the battery cells BT09 included in the charge battery cell group, and applies the charging voltage to the terminal pair BT02. Thus, even when any battery cell BT09 is selected as the discharge battery cell group and the charge battery cell group, an electric charge can be transferred without any problems.

Furthermore, the use of OS transistors as the transistor BT10 and the transistor BT13 can reduce the amount of electric charge leaking from the battery cells BT09 which do not belong to the charge battery cell group or the discharge battery cell group. Accordingly, a decrease in capacity of the battery cells BT09 which do not contribute to charging or discharging can be suppressed. In addition, the variation in characteristics of the OS transistor due to heat is smaller than that of an Si transistor. Accordingly, even when the temperature of the battery cells BT09 is increased, an operation such as turning on or off the transistors in response to the control signals S1 and S2 can be performed normally.

Note that this embodiment can be implemented by being combined with other embodiments as appropriate.

This application is based on Japanese Patent Application serial no. 2015-134671 filed with Japan Patent Office on Jul. 3, 2015, the entire contents of which are hereby incorporated by reference.

What is claimed is:

1. A lithium-ion storage battery comprising:
   a positive electrode comprising a positive electrode current collector and a positive electrode active material layer;
   a negative electrode comprising a negative electrode current collector and a negative electrode active material layer;
   a folded sheet; and
   an exterior body,
   wherein a material of the positive electrode current collector and a material of the positive electrode active material layer are different,
   wherein the positive electrode current collector and the positive electrode active material layer are sandwiched between the folded sheet,
   wherein the folded sheet comprises a graphene compound,
   wherein the positive electrode and the negative electrode are stored in the exterior body, and
   wherein the lithium-ion storage battery is flexible.

2. The lithium-ion storage battery according to claim 1, further comprising a separator between the positive electrode and the negative electrode, the separator being stored in the exterior body.

3. The lithium-ion storage battery according to claim 1, wherein the graphene compound comprises graphene and oxygen.

4. The lithium-ion storage battery according to claim 1,
wherein the folded sheet comprises a first region and a second region,
wherein the first region is between the positive electrode and the negative electrode, and the second region is not between the positive electrode and the negative electrode,
wherein, in the first region, the folded sheet comprises a first functional group,
wherein, in the second region, the folded sheet comprises a second functional group, and
wherein the first functional group is different from the second functional group.

5. A lithium-ion storage battery comprising:
a positive electrode comprising a positive electrode current collector and a positive electrode active material layer;
a negative electrode comprising a negative electrode current collector and a negative electrode active material layer;
a folded sheet; and
an exterior body,
wherein a material of the negative electrode current collector and a material of the negative electrode active material layer are different,
wherein the negative electrode current collector and the negative electrode active material layer are sandwiched between the folded sheet,
wherein the folded sheet comprises a graphene compound,
wherein the positive electrode and the negative electrode are stored in the exterior body, and
wherein the lithium-ion storage battery is flexible.

6. The lithium-ion storage battery according to claim 5, further comprising a separator between the positive electrode and the negative electrode, the separator being stored in the exterior body.

7. The lithium-ion storage battery according to claim 5, wherein the graphene compound comprises graphene and oxygen.

8. The lithium-ion storage battery according to claim 5,
wherein the folded sheet comprises a first region and a second region,
wherein the first region is between the positive electrode and the negative electrode, and the second region is not between the positive electrode and the negative electrode,
wherein, in the first region, the folded sheet comprises a first functional group,
wherein, in the second region, the folded sheet comprises a second functional group, and
wherein the first functional group is different from the second functional group.

9. A lithium-ion storage battery comprising:
a positive electrode comprising a positive electrode current collector and a positive electrode active material layer;
a negative electrode comprising a negative electrode current collector and a negative electrode active material layer;
a first folded sheet;
a second folded sheet; and
an exterior body,
wherein a material of the positive electrode current collector and a material of the positive electrode active material layer are different,
wherein a material of the negative electrode current collector and a material of the negative electrode active material layer are different,
wherein the positive electrode current collector and the positive electrode active material layer are sandwiched between the first folded sheet,
wherein the negative electrode current collector and the negative electrode active material layer are sandwiched between the second folded sheet,
wherein the first folded sheet comprises a graphene compound,
wherein the second folded sheet comprises a graphene compound,
wherein the positive electrode and the negative electrode are stored in the exterior body, and
wherein the lithium-ion storage battery is flexible.

10. The lithium-ion storage battery according to claim 9, further comprising a separator between the positive electrode and the negative electrode, the separator being stored in the exterior body.

11. The lithium-ion storage battery according to claim 9,
wherein the graphene compound of the first folded sheet comprises graphene and oxygen, and
wherein the graphene compound of the second folded sheet comprises graphene and oxygen.

12. The lithium-ion storage battery according to claim 9,
wherein the first folded sheet comprises a first region and a second region,
wherein the first region is between the positive electrode and the negative electrode, and the second region is not between the positive electrode and the negative electrode,
wherein, in the first region, the first folded sheet comprises a first functional group,
wherein, in the second region, the first folded sheet comprises a second functional group, and
wherein the first functional group is different from the second functional group.

13. The lithium-ion storage battery according to claim 12,
wherein the second folded sheet comprises a third region and a fourth region,
wherein the third region is between the positive electrode and the negative electrode, and the fourth region is not between the positive electrode and the negative electrode,
wherein, in the third region, the second folded sheet comprises a third functional group,
wherein, in the fourth region, the second folded sheet comprises a fourth functional group, and
wherein the third functional group is different from the fourth functional group.

* * * * *